US007227861B2

(12) United States Patent
Tomonaga et al.

(10) Patent No.: US 7,227,861 B2
(45) Date of Patent: Jun. 5, 2007

(54) PACKET SWITCH DEVICE

(75) Inventors: Hiroshi Tomonaga, Kawasaki (JP); Masakatsu Nagata, Kawasaki (JP); Kenichi Kawarai, Kawasaki (JP); Naoki Matsuoka, Kawasaki (JP); Kenichi Okabe, Kawasaki (JP); Shiro Uriu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 09/805,545

(22) Filed: Mar. 13, 2001

(65) Prior Publication Data

US 2002/0024949 A1 Feb. 28, 2002

(30) Foreign Application Priority Data

Aug. 31, 2000 (JP) ............................ 2000-262058

(51) Int. Cl.
*H04L 12/56* (2006.01)

(52) U.S. Cl. ...................................................... 370/386

(58) Field of Classification Search ................ 370/389, 370/386, 387, 388, 412, 415; 710/316, 317
See application file for complete search history.

(56) References Cited

U.S. PATENT DOCUMENTS

| | | | | |
|---|---|---|---|---|
| 5,253,251 A * | 10/1993 | Aramaki | ..................... | 370/394 |
| 5,293,378 A * | 3/1994 | Shimizu | ..................... | 370/474 |
| 6,507,584 B1 * | 1/2003 | Moriwaki et al. | .......... | 370/398 |
| 2002/0131442 A1 * | 9/2002 | Garg et al. | ................. | 370/442 |

FOREIGN PATENT DOCUMENTS

| | | |
|---|---|---|
| EP | 0 918 419 A2 | 5/1999 |
| JP | 07327036 | 12/1995 |
| JP | 11-154954 | 6/1999 |

* cited by examiner

*Primary Examiner*—Derrick W. Ferris
(74) *Attorney, Agent, or Firm*—Katten Muchin Rosenman LLP

(57) ABSTRACT

Packets input from input HWs #0 to #3 to a packet switch device are buried in time slots A through D. The packet switch device alternately switches the input packets in units of time slots, and inputs the packets to two 4×4 switches. The 4×4 switches make normal switching, and distribute the packets to respective output ports. Then, the packets output from the two 4×4 switches after being switched are alternately multiplexed, and output to output HWs #0 through #3. By making switching in units of packets as described above, a process overhead is prevented from being increased, and also expansion can be easily made. Besides, hardware scale can be made small.

17 Claims, 93 Drawing Sheets

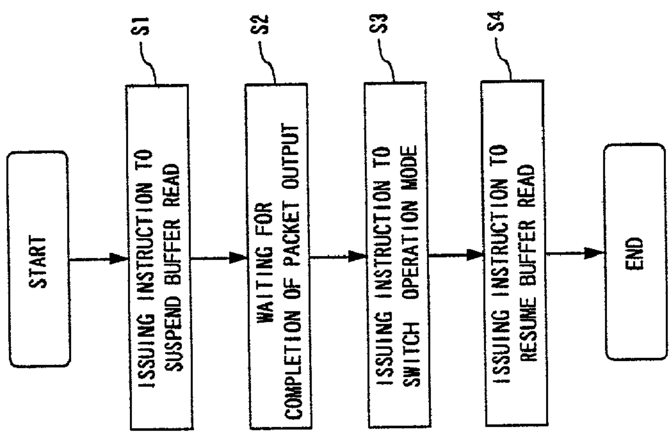
F I G. 1 7

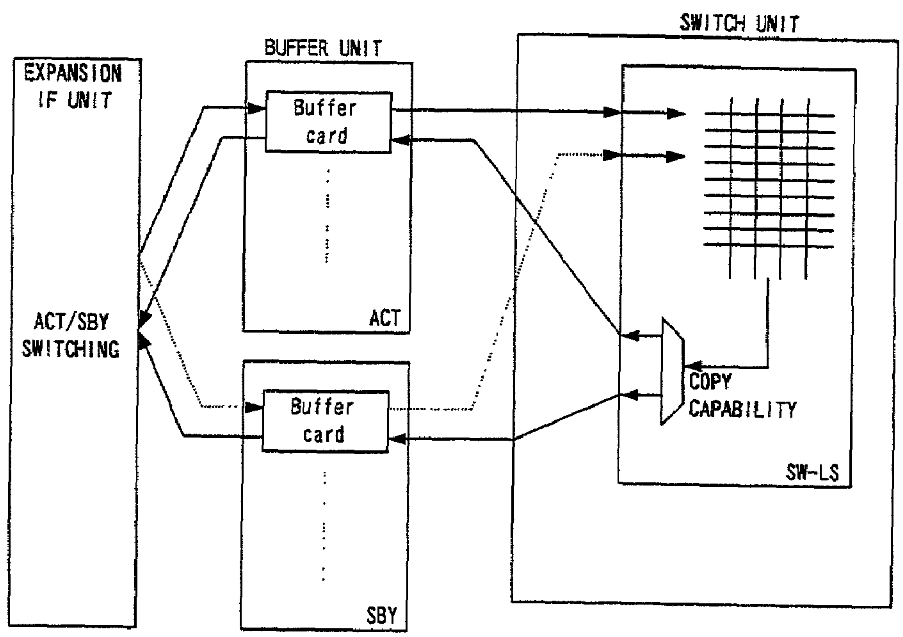
F I G. 2 6

(ONLY FIRST SLICE IS SHOWN)

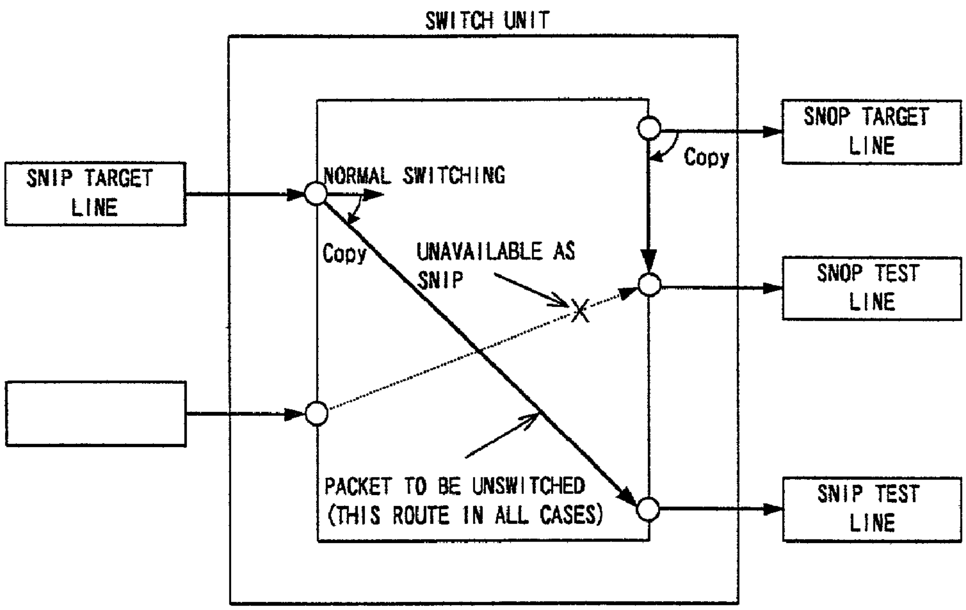
F I G. 3 5

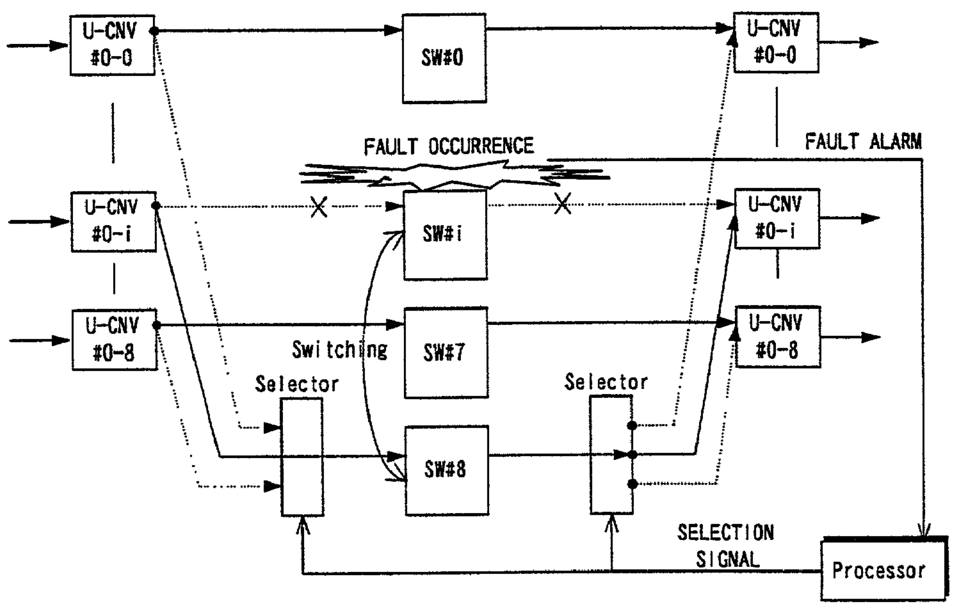
F I G. 3 7

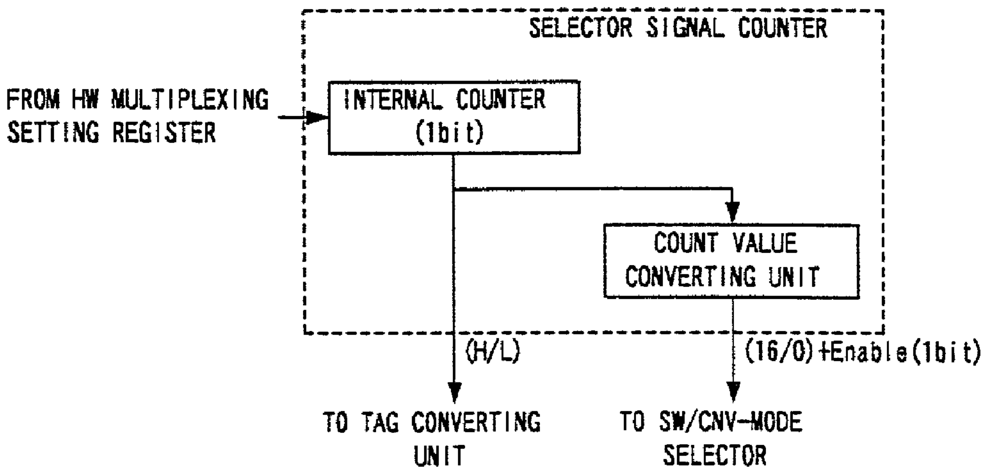
F I G. 4 2

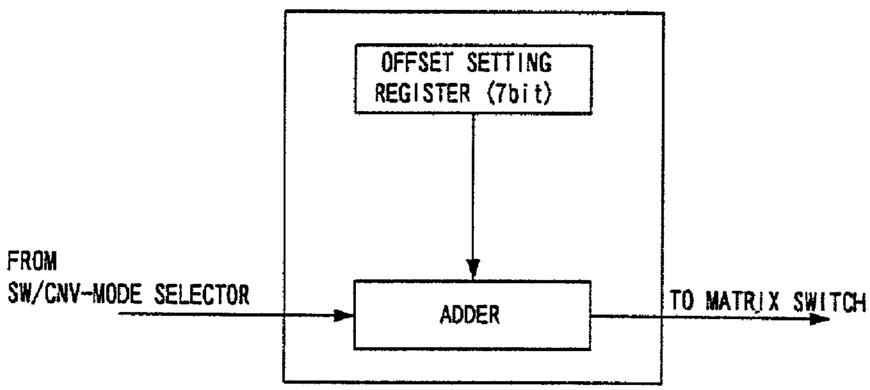
F I G. 4 3

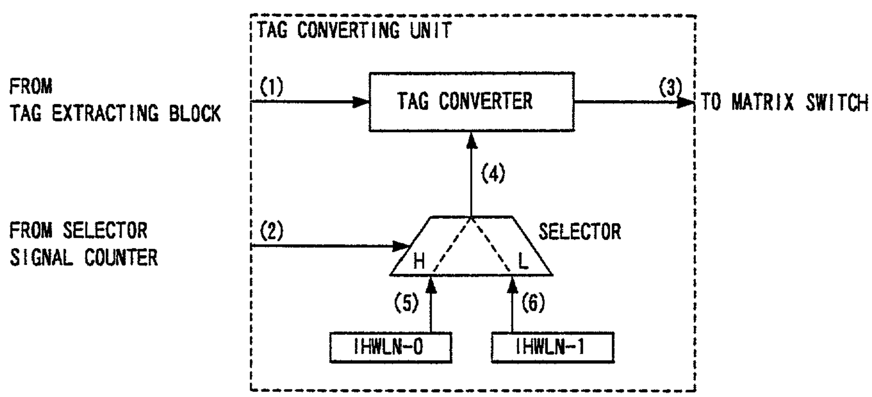
F I G. 4 4

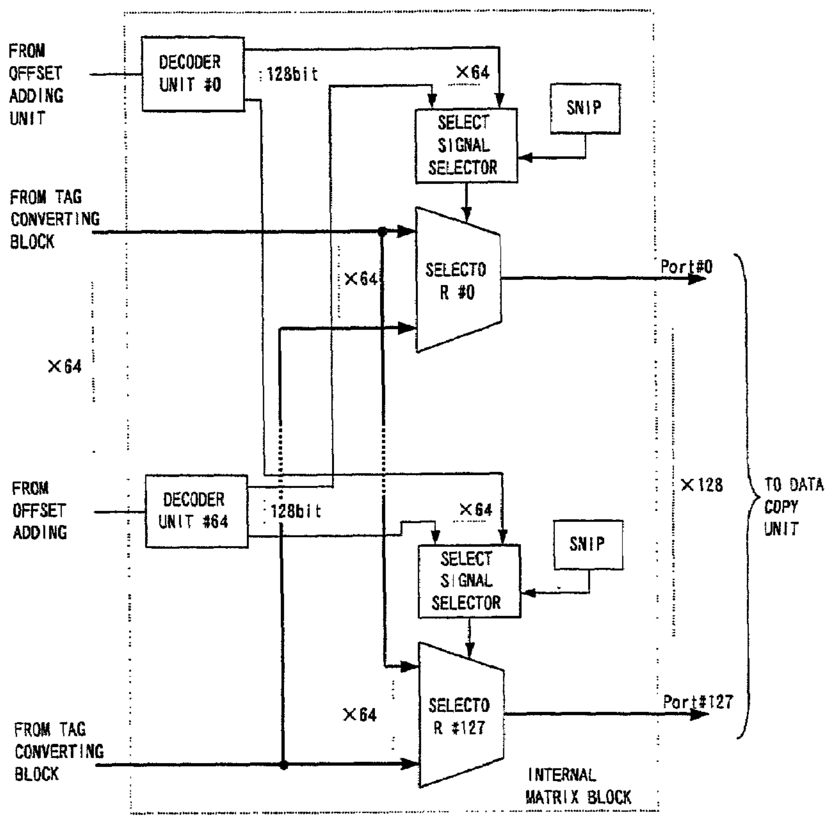
F I G. 4 5

TABLE 1 SW-CARD CONFIGURATION BY SWITCH CAPACITY

| MAXIMUM SWITCH CAPACITY (bps) | NUMBER OF SWITCH CARDS (EXCLUDING REDUNDANT SYSTEM) | |
|---|---|---|
| 2.56T | 8 | |
| 1.28T | 4 | |
| 640G | 2 | |
| 320G | 1 | |

FIG. 54A

TABLE 2 BUFFER CARD TYPE

| Buffer-Card CAPACITY (bps) | NUMBER OF ACCOMMODATED LINES | NUMBER OF TRSW-LSIs (DNV-mode) |
|---|---|---|
| 160G | 8 | 2 |
| 80G | 4 | 2 |
| 40G | 2 | 1 |
| 20G | 1 | 1 |

FIG. 54B

TABLE 3 SW-CARD CONFIGURATION AND BUFFER CARD ALLOWED

| SW-CARD CONFIGURATION (NUMBER OF CARDS) | BUFFER CARD ALLOWED | |
|---|---|---|
| 8 | 160G, 80G, 40G, 20G | |
| 4 | 80G, 40G, 20G | |
| 2 | 40G, 20G | |
| 1 | 20G | |

FIG. 54C

TABLE 4 CNV EXTERNAL TERMINAL CONNECTION CONFIGURATION

| EXTERNAL TERMINAL No. (DAT#) | CONNECTION DESTINATION | | |
|---|---|---|---|
| | Card (TYPE, No.) | LSI No. | EXTERNAL TERMINAL No. |
| 00 | SW#0 | 0 | 4n[4n+2] |
| 01 | SW#1 | 0 | 4n[4n+2] |
| 02 | SW#2 | 0 | 4n[4n+2] |
| 03 | SW#3 | 0 | 4n[4n+2] |
| 04 | SW#4 | 0 | 4n[4n+2] |
| 05 | SW#5 | 0 | 4n[4n+2] |
| 06 | SW#6 | 0 | 4n[4n+2] |
| 07 | SW#7 | 0 | 4n[4n+2] |
| 08 | SW#0 | 1 | 4n[4n+2] |
| 09 | SW#1 | 1 | 4n[4n+2] |
| 10 | SW#2 | 1 | 4n[4n+2] |
| 11 | SW#3 | 1 | 4n[4n+2] |
| 12 | SW#4 | 1 | 4n[4n+2] |

FIG. 57

| EXTERNAL TERMINAL No. (DAT#) | CONNECTION DESTINATION | | |
|---|---|---|---|
| | Card (TYPE, No.) | LSI No. | EXTERNAL TERMINAL No. |
| 13 | SW#5 | 1 | 4n[4n+2] |
| 14 | SW#6 | 1 | 4n[4n+2] |
| 15 | SW#7 | 1 | 4n[4n+2] |
| 16 | SW#0 | 0 | 4n+1[4n+3] |
| 17 | SW#1 | 0 | 4n+1[4n+3] |
| 18 | SW#2 | 0 | 4n+1[4n+3] |
| 19 | SW#3 | 0 | 4n+1[4n+3] |
| 20 | SW#4 | 0 | 4n+1[4n+3] |
| 21 | SW#5 | 0 | 4n+1[4n+3] |
| 22 | SW#6 | 0 | 4n+1[4n+3] |
| 23 | SW#7 | 0 | 4n+1[4n+3] |
| 24 | SW#0 | 1 | 4n+1[4n+3] |
| 25 | SW#1 | 1 | 4n+1[4n+3] |
| 26 | SW#2 | 1 | 4n+1[4n+3] |
| 27 | SW#3 | 1 | 4n+1[4n+3] |
| 28 | SW#4 | 1 | 4n+1[4n+3] |
| 29 | SW#5 | 1 | 4n+1[4n+3] |
| 30 | SW#6 | 1 | 4n+1[4n+3] |
| 31 | SW#7 | 1 | 4n+1[4n+3] |
| 32 | BUF#n | 8n[8n+4] | 0 |
| 33 | BUF#n | 8n[8n+4] | 1 |
| 34 | BUF#n | 8n[8n+4] | 2 |
| 35 | BUF#n | 8n[8n+4] | 3 |
| 36 | BUF#n | 8n[8n+4] | 4 |
| 37 | BUF#n | 8n[8n+4] | 5 |
| 38 | BUF#n | 8n[8n+4] | 6 |
| 39 | BUF#n | 8n[8n+4] | 7 |
| 40 | BUF#n | 8n+1[8n+5] | 0 |
| 41 | BUF#n | 8n+1[8n+5] | 1 |
| 42 | BUF#n | 8n+1[8n+5] | 2 |
| 43 | BUF#n | 8n+1[8n+5] | 3 |
| 44 | BUF#n | 8n+1[8n+5] | 4 |
| 45 | BUF#n | 8n+1[8n+5] | 5 |
| 46 | BUF#n | 8n+1[8n+5] | 6 |
| 47 | BUF#n | 8n+1[8n+5] | 7 |
| 48 | BUF#n | 8n+2[8n+6] | 0 |
| 49 | BUF#n | 8n+2[8n+6] | 1 |
| 50 | BUF#n | 8n+2[8n+6] | 2 |
| 51 | BUF#n | 8n+2[8n+6] | 3 |
| 52 | BUF#n | 8n+2[8n+6] | 4 |
| 53 | BUF#n | 8n+2[8n+6] | 5 |
| 54 | BUF#n | 8n+2[8n+6] | 6 |
| 55 | BUF#n | 8n+2[8n+6] | 7 |
| 56 | BUF#n | 8n+3[8n+7] | 0 |
| 57 | BUF#n | 8n+3[8n+7] | 1 |
| 58 | BUF#n | 8n+3[8n+7] | 2 |

FIG. 58

| EXTERNAL TERMINAL No. (DAT#) | CONNECTION DESTINATION | | |
|---|---|---|---|
| | Card (TYPE, No.) | LSI No. | EXTERNAL TERMINAL No. |
| 59 | BUF#n | 8n+3 [8n+7] | 3 |
| 60 | BUF#n | 8n+3 [8n+7] | 4 |
| 61 | BUF#n | 8n+3 [8n+7] | 5 |
| 62 | BUF#n | 8n+3 [8n+7] | 6 |
| 63 | BUF#n | 8n+3 [8n+7] | 7 |
| RDD 0 | SW#R | 0 | 4n [4n+2] |
| RDD 1 | SW#R | 1 | 4n [4n+2] |
| RDD 2 | SW#R | 0 | 4n+1 [4n+3] |
| RDD 3 | SW#R | 1 | 4n+1 [4n+3] |
| RDD 4 | – | – | – |
| RDD 5 | – | – | – |
| RDD 6 | – | – | – |
| RDD 7 | – | – | – |

(*) n; BUFFER CARD No. (0~7)
–; UNCONNECTED

FIG. 59

TABLE 5 CNV EXTERNAL TERMINAL CONNECTION CONFIGURATION
(CNV#0 INPUT AND CNV#1 OUTPUT)

| EXTERNAL TERMINAL No. (DAT#) | CONNECTION DESTINATION | | |
|---|---|---|---|
| | Card (TYPE, No.) | LSI No. | EXTERNAL TERMINAL No. |
| 00 | — | — | — |
| 01 | — | — | — |
| 02 | — | — | — |
| 03 | — | — | — |
| 04 | — | — | — |
| 05 | — | — | — |
| 06 | — | — | — |
| 07 | — | — | — |
| 08 | — | — | — |

F I G. 63

| EXTERNAL TERMINAL No. (DAT#) | CONNECTION DESTINATION | | |
|---|---|---|---|
| | Card (TYPE, No.) | LSI No. | EXTERNAL TERMINAL No. |
| 09 | — | — | — |
| 10 | — | — | — |
| 11 | — | — | — |
| 12 | — | — | — |
| 13 | — | — | — |
| 14 | — | — | — |
| 15 | — | — | — |
| 16 | — | — | — |
| 17 | — | — | — |
| 18 | — | — | — |
| 19 | — | — | — |
| 20 | — | — | — |
| 21 | — | — | — |
| 22 | — | — | — |
| 23 | — | — | — |
| 24 | — | — | — |
| 25 | — | — | — |
| 26 | — | — | — |
| 27 | — | — | — |
| 28 | — | — | — |
| 29 | — | — | — |
| 30 | — | — | — |
| 31 | — | — | — |
| 32 | BUF#n | 8n | 0 |
| 33 | BUF#n | 8n | 1 |
| 34 | BUF#n | 8n | 2 |
| 35 | BUF#n | 8n | 3 |
| 36 | BUF#n | 8n | 4 |
| 37 | BUF#n | 8n | 5 |
| 38 | BUF#n | 8n | 6 |
| 39 | BUF#n | 8n | 7 |
| 40 | BUF#n | 8n+1 | 0 |
| 41 | BUF#n | 8n+1 | 1 |
| 42 | BUF#n | 8n+1 | 2 |
| 43 | BUF#n | 8n+1 | 3 |
| 44 | BUF#n | 8n+1 | 4 |
| 45 | BUF#n | 8n+1 | 5 |
| 46 | BUF#n | 8n+1 | 6 |
| 47 | BUF#n | 8n+1 | 7 |
| 48 | BUF#n | 8n+2 | 0 |
| 49 | BUF#n | 8n+2 | 1 |
| 50 | BUF#n | 8n+2 | 2 |
| 51 | BUF#n | 8n+2 | 3 |
| 52 | BUF#n | 8n+2 | 4 |
| 53 | BUF#n | 8n+2 | 5 |
| 54 | BUF#n | 8n+2 | 6 |

FIG. 64

| EXTERNAL TERMINAL No. (DAT#) | CONNECTION DESTINATION | | |
|---|---|---|---|
| | Card (TYPE, No.) | LSI No. | EXTERNAL TERMINAL No. |
| 55 | BUF#n | 8n+2 | 7 |
| 56 | BUF#n | 8n+3 | 0 |
| 57 | BUF#n | 8n+3 | 1 |
| 58 | BUF#n | 8n+3 | 2 |
| 59 | BUF#n | 8n+3 | 3 |
| 60 | BUF#n | 8n+3 | 4 |
| 61 | BUF#n | 8n+3 | 5 |
| 62 | BUF#n | 8n+3 | 6 |
| 63 | BUF#n | 8n+3 | 7 |
| RDD 0 | – | – | – |
| RDD 1 | – | – | – |
| RDD 2 | – | – | – |
| RDD 3 | – | – | – |
| RDD 4 | – | – | – |
| RDD 5 | – | – | – |
| RDD 6 | – | – | – |
| RDD 7 | – | – | – |

(*) n; BUFFER CARD No. (0~7)
–; UNCONNECTED

TABLE 6 CNV EXTERNAL TERMINAL CONNECTION CONFIGURATION
(CNV#0 OUTPUT AND CNV#1 INPUT)

| EXTERNAL TERMINAL No. (DAT#) | CONNECTION DESTINATION | | |
|---|---|---|---|
| | Card (TYPE, No.) | LSI No. | EXTERNAL TERMINAL No. |
| 00 | SW#0 | 0 | 4n |
| 01 | SW#1 | 0 | 4n |
| 02 | SW#2 | 0 | 4n |
| 03 | SW#3 | 0 | 4n |
| 04 | SW#4 | 0 | 4n |
| 05 | SW#5 | 0 | 4n |
| 06 | SW#6 | 0 | 4n |
| 07 | SW#7 | 0 | 4n |
| 08 | SW#0 | 1 | 4n |
| 09 | SW#1 | 1 | 4n |
| 10 | SW#2 | 1 | 4n |
| 11 | SW#3 | 1 | 4n |
| 12 | SW#4 | 1 | 4n |
| 13 | SW#5 | 1 | 4n |
| 14 | SW#6 | 1 | 4n |
| 15 | SW#7 | 1 | 4n |
| 16 | SW#0 | 0 | 4n+1 |
| 17 | SW#1 | 0 | 4n+1 |
| 18 | SW#2 | 0 | 4n+1 |
| 19 | SW#3 | 0 | 4n+1 |
| 20 | SW#4 | 0 | 4n+1 |
| 21 | SW#5 | 0 | 4n+1 |

FIG. 65

| EXTERNAL TERMINAL No. (DAT#) | CONNECTION DESTINATION | | |
|---|---|---|---|
| | Card (TYPE, No.) | LSI No. | EXTERNAL TERMINAL No. |
| 22 | SW#6 | 0 | 4n+1 |
| 23 | SW#7 | 0 | 4n+1 |
| 24 | SW#0 | 1 | 4n+1 |
| 25 | SW#1 | 1 | 4n+1 |
| 26 | SW#2 | 1 | 4n+1 |
| 27 | SW#3 | 1 | 4n+1 |
| 28 | SW#4 | 1 | 4n+1 |
| 29 | SW#5 | 1 | 4n+1 |
| 30 | SW#6 | 1 | 4n+1 |
| 31 | SW#7 | 1 | 4n+1 |
| 32 | SW#0 | 0 | 4n+2 |
| 33 | SW#1 | 0 | 4n+2 |
| 34 | SW#2 | 0 | 4n+2 |
| 35 | SW#3 | 0 | 4n+2 |
| 36 | — | — | — |
| 37 | — | — | — |
| 38 | — | — | — |
| 39 | — | — | — |
| 40 | SW#0 | 1 | 4n+2 |
| 41 | SW#1 | 1 | 4n+2 |
| 42 | SW#2 | 1 | 4n+2 |
| 43 | SW#3 | 1 | 4n+2 |
| 44 | — | — | — |
| 45 | — | — | — |
| 46 | — | — | — |
| 47 | — | — | — |
| 48 | SW#0 | 0 | 4n+3 |
| 49 | SW#1 | 0 | 4n+3 |
| 50 | SW#2 | 0 | 4n+3 |
| 51 | SW#3 | 0 | 4n+3 |
| 52 | — | — | — |
| 53 | — | — | — |
| 54 | — | — | — |
| 55 | — | — | — |
| 56 | SW#0 | 1 | 4n+3 |
| 57 | SW#1 | 1 | 4n+3 |
| 58 | SW#2 | 1 | 4n+3 |
| 59 | SW#3 | 1 | 4n+3 |
| 60 | — | — | — |
| 61 | — | — | — |
| 62 | — | — | — |
| 63 | — | — | — |
| RDD 0 | SW#R | 0 | 4n |
| RDD 1 | SW#R | 1 | 4n |
| RDD 2 | SW#R | 0 | 4n+1 |
| RDD 3 | SW#R | 1 | 4n+1 |

FIG. 66

| EXTERNAL TERMINAL No. (DAT#) | CONNECTION DESTINATION | | |
|---|---|---|---|
| | Card (TYPE, No.) | LSI No. | EXTERNAL TERMINAL No. |
| RDD 4 | SW#R | 0 | 4n+2 |
| RDD 5 | SW#R | 1 | 4n+2 |
| RDD 6 | SW#R | 0 | 4n+3 |
| RDD 7 | SW#R | 1 | 4n+3 |

(*) n; BUFFER CARD No. (0~7)
-; UNCONNECTED

FIG. 67

TABLE 7 CNV EXTERNAL TERMINAL CONNECTION CONFIGURATION

| EXTERNAL TERMINAL No. (DAT#) | CONNECTION DESTINATION | | |
|---|---|---|---|
| | Card (TYPE, No.) | LSI No. | EXTERNAL TERMINAL No. |
| 00 | SW#0 | 0 | 4n |
| 01 | SW#1 | 0 | 4n |
| 02 | SW#2 | 0 | 4n |
| 03 | SW#3 | 0 | 4n |
| 04 | SW#4 | 0 | 4n |
| 05 | SW#5 | 0 | 4n |
| 06 | SW#6 | 0 | 4n |
| 07 | SW#7 | 0 | 4n |
| 08 | SW#0 | 1 | 4n |
| 09 | SW#1 | 1 | 4n |
| 10 | SW#2 | 1 | 4n |
| 11 | SW#3 | 1 | 4n |
| 12 | SW#4 | 1 | 4n |
| 13 | SW#5 | 1 | 4n |
| 14 | SW#6 | 1 | 4n |

F I G. 7 1

| EXTERNAL TERMINAL No. (DAT#) | CONNECTION DESTINATION | | |
|---|---|---|---|
| | Card (TYPE, No.) | LSI No. | EXTERNAL TERMINAL No. |
| 15 | SW#7 | 1 | 4n |
| 16 | SW#0 | 0 | 4n+1 |
| 17 | SW#1 | 0 | 4n+1 |
| 18 | SW#2 | 0 | 4n+1 |
| 19 | SW#3 | 0 | 4n+1 |
| 20 | — | — | — |
| 21 | — | — | — |
| 22 | — | — | — |
| 23 | — | — | — |
| 24 | SW#0 | 1 | 4n+1 |
| 25 | SW#1 | 1 | 4n+1 |
| 26 | SW#2 | 1 | 4n+1 |
| 27 | SW#3 | 1 | 4n+1 |
| 28 | — | — | — |
| 29 | — | — | — |
| 30 | — | — | — |
| 31 | — | — | — |
| 32 | SW#0 | 0 | 4n+2 |
| 33 | SW#1 | 0 | 4n+2 |
| 34 | — | — | — |
| 35 | — | — | — |
| 36 | BUF#n | 8n | 0 |
| 37 | BUF#n | 8n | 1 |
| 38 | BUF#n | 8n | 2 |
| 39 | BUF#n | 8n | 3 |
| 40 | SW#0 | 1 | 4n+2 |
| 41 | SW#1 | 1 | 4n+2 |
| 42 | — | — | — |
| 43 | — | — | — |
| 44 | BUF#n | 8n+1 | 0 |
| 45 | BUF#n | 8n+1 | 1 |
| 46 | BUF#n | 8n+1 | 2 |
| 47 | BUF#n | 8n+1 | 3 |
| 48 | SW#0 | 0 | 4n+3 |
| 49 | SW#1 | 0 | 4n+3 |
| 50 | — | — | — |
| 51 | — | — | — |
| 52 | BUF#n | 8n | 4 |
| 53 | BUF#n | 8n | 5 |
| 54 | BUF#n | 8n | 6 |
| 55 | BUF#n | 8n | 7 |
| 56 | SW#0 | 1 | 4n+3 |
| 57 | SW#1 | 1 | 4n+3 |
| 58 | — | — | — |
| 59 | — | — | — |
| 60 | BUF#n | 8n+1 | 4 |

FIG. 72

| EXTERNAL TERMINAL No. (DAT#) | CONNECTION DESTINATION | | |
|---|---|---|---|
| | Card (TYPE, No.) | LSI No. | EXTERNAL TERMINAL No. |
| 61 | BUF#n | 8n+1 | 5 |
| 62 | BUF#n | 8n+1 | 6 |
| 63 | BUF#n | 8n+1 | 7 |
| RDD 0 | SW#R | 0 | 4n |
| RDD 1 | SW#R | 1 | 4n |
| RDD 2 | SW#R | 0 | 4n+1 |
| RDD 3 | SW#R | 1 | 4n+1 |
| RDD 4 | SW#R | 0 | 4n+2 |
| RDD 5 | SW#R | 1 | 4n+2 |
| RDD 6 | SW#R | 0 | 4n+3 |
| RDD 7 | SW#R | 1 | 4n+3 |

(*) n; BUFFER CARD No. (0~7)
-; UNCONNECTED

FIG. 73

TABLE 8 CNV EXTERNAL TERMINAL CONNECTION CONFIGURATION

| EXTERNAL TERMINAL No. (DAT#) | CONNECTION DESTINATION | | |
|---|---|---|---|
| | Card (TYPE, No.) | LSI No. | EXTERNAL TERMINAL No. |
| 00 | SW#0 | 0 | 4n |
| 01 | SW#1 | 0 | 4n |
| 02 | SW#2 | 0 | 4n |
| 03 | SW#3 | 0 | 4n |
| 04 | SW#4 | 0 | 4n |
| 05 | SW#5 | 0 | 4n |
| 06 | SW#6 | 0 | 4n |
| 07 | SW#7 | 0 | 4n |
| 08 | SW#0 | 1 | 4n |
| 09 | SW#1 | 1 | 4n |
| 10 | SW#2 | 1 | 4n |
| 11 | SW#3 | 1 | 4n |
| 12 | SW#4 | 1 | 4n |
| 13 | SW#5 | 1 | 4n |
| 14 | SW#6 | 1 | 4n |

FIG. 77

| EXTERNAL TERMINAL No. (DAT#) | CONNECTION DESTINATION | | |
|---|---|---|---|
| | Card (TYPE, No.) | LSI No. | EXTERNAL TERMINAL No. |
| 15 | SW#7 | 1 | 4n |
| 16 | SW#0 | 0 | 4n+1 |
| 17 | — | — | — |
| 18 | — | — | — |
| 19 | — | — | — |
| 20 | — | — | — |
| 21 | — | — | — |
| 22 | — | — | — |
| 23 | — | — | — |
| 24 | SW#0 | 1 | 4n+1 |
| 25 | — | — | — |
| 26 | — | — | — |
| 27 | — | — | — |
| 28 | — | — | — |
| 29 | — | — | — |
| 30 | — | — | — |
| 31 | — | — | — |
| 32 | SW#0 | 0 | 4n+2 |
| 33 | SW#1 | 0 | 4n+2 |
| 34 | — | — | — |
| 35 | — | — | — |
| 36 | BUF#n | 8n | 0 |
| 37 | BUF#n | 8n | 1 |
| 38 | BUF#n | 8n | 2 |
| 39 | BUF#n | 8n | 3 |
| 40 | SW#0 | 1 | 4n+2 |
| 41 | SW#1 | 1 | 4n+2 |
| 42 | — | — | — |
| 43 | — | — | — |
| 44 | — | — | — |
| 45 | — | — | — |
| 46 | — | — | — |
| 47 | — | — | — |
| 48 | SW#0 | 0 | 4n+3 |
| 49 | — | — | — |
| 50 | — | — | — |
| 51 | — | — | — |
| 52 | BUF#n | 8n | 4 |
| 53 | BUF#n | 8n | 5 |
| 54 | BUF#n | 8n | 6 |
| 55 | BUF#n | 8n | 7 |
| 56 | SW#0 | 1 | 4n+3 |
| 57 | — | — | — |
| 58 | — | — | — |
| 59 | — | — | — |
| 60 | — | — | — |

F I G. 78

| EXTERNAL TERMINAL No. (DAT#) | CONNECTION DESTINATION | | |
|---|---|---|---|
| | Card (TYPE, No.) | LSI No. | EXTERNAL TERMINAL No. |
| 61 | — | — | — |
| 62 | — | — | — |
| 63 | — | — | — |
| RDD 0 | SW#R | 0 | 4n |
| RDD 1 | SW#R | 1 | 4n |
| RDD 2 | SW#R | 0 | 4n+1 |
| RDD 3 | SW#R | 1 | 4n+1 |
| RDD 4 | SW#R | 0 | 4n+2 |
| RDD 5 | SW#R | 1 | 4n+2 |
| RDD 6 | SW#R | 0 | 4n+3 |
| RDD 7 | SW#R | 1 | 4n+3 |

(*) n; BUFFER CARD No. (0~7)
-; UNCONNECTED

FIG. 79

TABLE 9 OFFSET SETTING REGISTER TABLE (SW#0/1)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 0 | 0 | 0 | 0 |
| 1 | 0 | 0 | 0 | 1 |
| 2 | 0 | 0 | 2 | 2 |
| 3 | 0 | 0 | 2 | 3 |
| 4 | 0 | 0 | 0 | 0 |
| 5 | 0 | 0 | 0 | 1 |
| 6 | 0 | 0 | 2 | 2 |
| 7 | 0 | 0 | 2 | 3 |
| 8 | 0 | 0 | 0 | 0 |
| 9 | 0 | 0 | 0 | 1 |
| 10 | 0 | 0 | 2 | 2 |
| 11 | 0 | 0 | 2 | 3 |
| 12 | 0 | 0 | 0 | 0 |
| 13 | 0 | 0 | 0 | 1 |
| 14 | 0 | 0 | 2 | 2 |
| 15 | 0 | 0 | 2 | 3 |
| 16 | 0 | 0 | 0 | 0 |
| 17 | 0 | 0 | 0 | 1 |
| 18 | 0 | 0 | 2 | 2 |
| 19 | 0 | 0 | 2 | 3 |
| 20 | 0 | 0 | 0 | 0 |
| 21 | 0 | 0 | 0 | 1 |
| 22 | 0 | 0 | 2 | 2 |
| 23 | 0 | 0 | 2 | 3 |
| 24 | 0 | 0 | 0 | 0 |
| 25 | 0 | 0 | 0 | 1 |
| 26 | 0 | 0 | 2 | 2 |
| 27 | 0 | 0 | 2 | 3 |
| 28 | 0 | 0 | 0 | 0 |
| 29 | 0 | 0 | 0 | 1 |
| 30 | 0 | 0 | 2 | 2 |
| 31 | 0 | 0 | 2 | 3 |
| 32 | 0 | 0 | 0 | 0 |
| 33 | 0 | 0 | 0 | 1 |
| 34 | 0 | 0 | 2 | 2 |
| 35 | 0 | 0 | 2 | 3 |
| 36 | 0 | 0 | 0 | 0 |
| 37 | 0 | 0 | 0 | 1 |
| 38 | 0 | 0 | 2 | 2 |
| 39 | 0 | 0 | 2 | 3 |
| 40 | 0 | 0 | 0 | 0 |
| 41 | 0 | 0 | 0 | 1 |
| 42 | 0 | 0 | 2 | 2 |
| 43 | 0 | 0 | 2 | 3 |
| 44 | 0 | 0 | 0 | 0 |
| 45 | 0 | 0 | 0 | 1 |
| 46 | 0 | 0 | 2 | 2 |
| 47 | 0 | 0 | 2 | 3 |
| 48 | 0 | 0 | 0 | 0 |
| 49 | 0 | 0 | 0 | 1 |
| 50 | 0 | 0 | 2 | 2 |
| 51 | 0 | 0 | 2 | 3 |
| 52 | 0 | 0 | 0 | 0 |
| 53 | 0 | 0 | 0 | 1 |
| 54 | 0 | 0 | 2 | 2 |
| 55 | 0 | 0 | 2 | 3 |
| 56 | 0 | 0 | 0 | 0 |
| 57 | 0 | 0 | 0 | 1 |
| 58 | 0 | 0 | 2 | 2 |
| 59 | 0 | 0 | 2 | 3 |
| 60 | 0 | 0 | 0 | 0 |
| 61 | 0 | 0 | 0 | 1 |
| 62 | 0 | 0 | 2 | 2 |
| 63 | 0 | 0 | 2 | 3 |

F I G. 80

◆160G Buffer-Card

TABLE 10 OFFSET SETTING REGISTER TABLE (CNV#0/1)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 64 | CONFIGURATION NOT ALLOWED | | |
| 1 | 66 | | | |
| 2 | 68 | | | |
| 3 | 70 | | | |
| 4 | 72 | | | |
| 5 | 74 | | | |
| 6 | 76 | | | |
| 7 | 78 | | | |
| 8 | 65 | | | |
| 9 | 67 | | | |
| 10 | 69 | | | |
| 11 | 71 | | | |
| 12 | 73 | | | |
| 13 | 75 | | | |
| 14 | 77 | | | |
| 15 | 79 | | | |
| 16 | 96 | | | |
| 17 | 98 | | | |
| 18 | 100 | | | |
| 19 | 102 | | | |
| 20 | 104 | | | |
| 21 | 106 | | | |
| 22 | 108 | | | |
| 23 | 110 | | | |
| 24 | 97 | | | |
| 25 | 99 | | | |
| 26 | 101 | | | |
| 27 | 103 | | | |
| 28 | 105 | | | |
| 29 | 107 | | | |
| 30 | 109 | | | |
| 31 | 111 | | | |

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 32 | 0 | CONFIGURATION NOT ALLOWED | | |
| 33 | 2 | | | |
| 34 | 4 | | | |
| 35 | 6 | | | |
| 36 | 8 | | | |
| 37 | 10 | | | |
| 38 | 12 | | | |
| 39 | 14 | | | |
| 40 | 1 | | | |
| 41 | 3 | | | |
| 42 | 5 | | | |
| 43 | 7 | | | |
| 44 | 9 | | | |
| 45 | 11 | | | |
| 46 | 13 | | | |
| 47 | 15 | | | |
| 48 | 32 | | | |
| 49 | 34 | | | |
| 50 | 36 | | | |
| 51 | 38 | | | |
| 52 | 40 | | | |
| 53 | 42 | | | |
| 54 | 44 | | | |
| 55 | 46 | | | |
| 56 | 33 | | | |
| 57 | 35 | | | |
| 58 | 37 | | | |
| 59 | 39 | | | |
| 60 | 41 | | | |
| 61 | 43 | | | |
| 62 | 45 | | | |
| 63 | 47 | | | |

FIG. 81

◆80G Buffer-Card

TABLE 11 OFFSET SETTING REGISTER TABLE (CNV#0)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | – | – | CONFIGURATION NOT ALLOWED | |
| 1 | – | – | | |
| 2 | – | – | | |
| 3 | – | – | | |
| 4 | – | – | | |
| 5 | – | – | | |
| 6 | – | – | | |
| 7 | – | – | | |
| 8 | – | – | | |
| 9 | – | – | | |
| 10 | – | – | | |
| 11 | – | – | | |
| 12 | – | – | | |
| 13 | – | – | | |
| 14 | – | – | | |
| 15 | – | – | | |
| 16 | – | – | | |
| 17 | – | – | | |
| 18 | – | – | | |
| 19 | – | – | | |
| 20 | – | – | | |
| 21 | – | – | | |
| 22 | – | – | | |
| 23 | – | – | | |
| 24 | – | – | | |
| 25 | – | – | | |
| 26 | – | – | | |
| 27 | – | – | | |
| 28 | – | – | | |
| 29 | – | – | | |
| 30 | – | – | | |
| 31 | – | – | | |

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 32 | 0 | 0 | CONFIGURATION NOT ALLOWED | |
| 33 | 2 | 2 | | |
| 34 | 4 | 4 | | |
| 35 | 6 | 6 | | |
| 36 | 8 | 16 | | |
| 37 | 10 | 18 | | |
| 38 | 12 | 20 | | |
| 39 | 14 | 22 | | |
| 40 | 1 | 32 | | |
| 41 | 3 | 34 | | |
| 42 | 5 | 36 | | |
| 43 | 7 | 38 | | |
| 44 | 9 | 48 | | |
| 45 | 11 | 50 | | |
| 46 | 13 | 52 | | |
| 47 | 15 | 54 | | |
| 48 | 32 | 64 | | |
| 49 | 34 | 66 | | |
| 50 | 36 | 68 | | |
| 51 | 38 | 70 | | |
| 52 | 40 | 80 | | |
| 53 | 42 | 82 | | |
| 54 | 44 | 84 | | |
| 55 | 46 | 86 | | |
| 56 | 33 | 96 | | |
| 57 | 35 | 98 | | |
| 58 | 37 | 100 | | |
| 59 | 39 | 102 | | |
| 60 | 41 | 112 | | |
| 61 | 43 | 114 | | |
| 62 | 45 | 116 | | |
| 63 | 47 | 118 | | |

(*) –; ARBITRARY SETTING VALUE DUE TO UNCONNECTION

F I G. 8 2

TABLE 12 OFFSET SETTING REGISTER TABLE (CNV#1)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 64 | 64 | CONFIGURATION NOT ALLOWED | |
| 1 | 66 | 66 | | |
| 2 | 68 | 68 | | |
| 3 | 70 | 70 | | |
| 4 | 72 | – | | |
| 5 | 74 | – | | |
| 6 | 76 | – | | |
| 7 | 78 | – | | |
| 8 | 65 | 72 | | |
| 9 | 67 | 74 | | |
| 10 | 69 | 76 | | |
| 11 | 71 | 78 | | |
| 12 | 73 | – | | |
| 13 | 75 | – | | |
| 14 | 77 | – | | |
| 15 | 79 | – | | |
| 16 | 96 | 80 | | |
| 17 | 98 | 82 | | |
| 18 | 100 | 84 | | |
| 19 | 102 | 86 | | |
| 20 | 104 | – | | |
| 21 | 106 | – | | |
| 22 | 108 | – | | |
| 23 | 110 | – | | |
| 24 | 97 | 88 | | |
| 25 | 99 | 90 | | |
| 26 | 101 | 92 | | |
| 27 | 103 | 94 | | |
| 28 | 105 | – | | |
| 29 | 107 | – | | |
| 30 | 109 | – | | |
| 31 | 111 | – | | |

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 32 | – | 96 | CONFIGURATION NOT ALLOWED | |
| 33 | – | 98 | | |
| 34 | – | 100 | | |
| 35 | – | 102 | | |
| 36 | – | – | | |
| 37 | – | – | | |
| 38 | – | – | | |
| 39 | – | – | | |
| 40 | – | 104 | | |
| 41 | – | 106 | | |
| 42 | – | 108 | | |
| 43 | – | 110 | | |
| 44 | – | – | | |
| 45 | – | – | | |
| 46 | – | – | | |
| 47 | – | – | | |
| 48 | – | 112 | | |
| 49 | – | 114 | | |
| 50 | – | 116 | | |
| 51 | – | 118 | | |
| 52 | – | – | | |
| 53 | – | – | | |
| 54 | – | – | | |
| 55 | – | – | | |
| 56 | – | 120 | | |
| 57 | – | 122 | | |
| 58 | – | 124 | | |
| 59 | – | 126 | | |
| 60 | – | – | | |
| 61 | – | – | | |
| 62 | – | – | | |
| 63 | – | – | | |

(*) –; ARBITRARY SETTING VALUE DUE TO UNCONNECTION

F I G. 83

◆40G Buffer-Card

TABLE 13 OFFSET SETTING REGISTER TABLE (CNV#0)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 72 | 72 | 72 | CONFIG-URATION NOT ALLOWED |
| 1 | 74 | 74 | 74 | |
| 2 | 76 | 76 | – | |
| 3 | 78 | 78 | – | |
| 4 | 104 | – | – | |
| 5 | 106 | – | – | |
| 6 | 108 | – | – | |
| 7 | 110 | – | – | |
| 8 | 73 | 104 | 76 | |
| 9 | 75 | 106 | 78 | |
| 10 | 77 | 108 | – | |
| 11 | 79 | 110 | – | |
| 12 | 105 | – | – | |
| 13 | 107 | – | – | |
| 14 | 109 | – | – | |
| 15 | 111 | – | – | |
| 16 | – | 88 | 88 | |
| 17 | – | 90 | 90 | |
| 18 | – | 92 | – | |
| 19 | – | 94 | – | |
| 20 | – | – | – | |
| 21 | – | – | – | |
| 22 | – | – | – | |
| 23 | – | – | – | |
| 24 | – | 120 | 92 | |
| 25 | – | 122 | 94 | |
| 26 | – | 124 | – | |
| 27 | – | 126 | – | |
| 28 | – | – | – | |
| 29 | – | – | – | |
| 30 | – | – | – | |
| 31 | – | – | – | |

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 32 | – | – | 104 | CONFIG-URATION NOT ALLOWED |
| 33 | – | – | 106 | |
| 34 | – | – | – | |
| 35 | – | – | – | |
| 36 | 0 | 0 | 0 | |
| 37 | 2 | 2 | 2 | |
| 38 | 4 | 4 | 16 | |
| 39 | 6 | 6 | 18 | |
| 40 | – | – | 108 | |
| 41 | – | – | 110 | |
| 42 | – | – | – | |
| 43 | – | – | – | |
| 44 | 1 | 32 | 32 | |
| 45 | 3 | 34 | 34 | |
| 46 | 5 | 36 | 48 | |
| 47 | 7 | 38 | 50 | |
| 48 | – | – | 120 | |
| 49 | – | – | 122 | |
| 50 | – | – | – | |
| 51 | – | – | – | |
| 52 | 8 | 16 | 64 | |
| 53 | 10 | 18 | 66 | |
| 54 | 12 | 20 | 80 | |
| 55 | 14 | 22 | 82 | |
| 56 | – | – | 124 | |
| 57 | – | – | 126 | |
| 58 | – | – | – | |
| 59 | – | – | – | |
| 60 | 9 | 48 | 96 | |
| 61 | 11 | 50 | 98 | |
| 62 | 13 | 52 | 112 | |
| 63 | 15 | 54 | 114 | |

(*) –; ARBITRARY SETTING VALUE DUE TO UNCONNECTION

FIG. 84

◆20G Buffer-Card

TABLE 14 OFFSET SETTING REGISTER TABLE (CNV#0)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 72 | 72 | 72 | 72 |
| 1 | 74 | 74 | 74 | – |
| 2 | 76 | 76 | – | – |
| 3 | 78 | 78 | – | – |
| 4 | 104 | – | – | – |
| 5 | 106 | – | – | – |
| 6 | 108 | – | – | – |
| 7 | 110 | – | – | – |
| 8 | 73 | 104 | 76 | 74 |
| 9 | 75 | 106 | 78 | – |
| 10 | 77 | 108 | – | – |
| 11 | 79 | 110 | – | – |
| 12 | 105 | – | – | – |
| 13 | 107 | – | – | – |
| 14 | 109 | – | – | – |
| 15 | 111 | – | – | – |
| 16 | – | 88 | 88 | 76 |
| 17 | – | 90 | 90 | – |
| 18 | – | 92 | – | – |
| 19 | – | 94 | – | – |
| 20 | – | – | – | – |
| 21 | – | – | – | – |
| 22 | – | – | – | – |
| 23 | – | – | – | – |
| 24 | – | 120 | 92 | 78 |
| 25 | – | 122 | 94 | – |
| 26 | – | 124 | – | – |
| 27 | – | 126 | – | – |
| 28 | – | – | – | – |
| 29 | – | – | – | – |
| 30 | – | – | – | – |
| 31 | – | – | – | – |

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 32 | – | – | 104 | 104 |
| 33 | – | – | 106 | – |
| 34 | – | – | – | – |
| 35 | – | – | – | – |
| 36 | 0 | 0 | 0 | 0 |
| 37 | 2 | 2 | 2 | 16 |
| 38 | 4 | 4 | 16 | 32 |
| 39 | 6 | 6 | 18 | 48 |
| 40 | – | – | 108 | 106 |
| 41 | – | – | 110 | – |
| 42 | – | – | – | – |
| 43 | – | – | – | – |
| 44 | – | – | – | – |
| 45 | – | – | – | – |
| 46 | – | – | – | – |
| 47 | – | – | – | – |
| 48 | – | – | – | 108 |
| 49 | – | – | – | – |
| 50 | – | – | – | – |
| 51 | – | – | – | – |
| 52 | 8 | 16 | 64 | 64 |
| 53 | 10 | 18 | 66 | 80 |
| 54 | 12 | 20 | 80 | 96 |
| 55 | 14 | 22 | 82 | 112 |
| 56 | – | – | – | 110 |
| 57 | – | – | – | – |
| 58 | – | – | – | – |
| 59 | – | – | – | – |
| 60 | – | – | – | – |
| 61 | – | – | – | – |
| 62 | – | – | – | – |
| 63 | – | – | – | – |

(*) –; ARBITRARY SETTING VALUE DUE TO UNCONNECTION

FIG. 85

| SW-CARD CONFIGURATION | REGISTER SETTING VALUE |
|---|---|
| 8 CARDS (2.56T) | 2N |
| 4 CARDS (1.28T) | 8×\|N/4\|+N mode4 |
| 2 CARDS (640G) | 8×\|N/4\|+N mode2 |
| 1 CARDS (320G) | 8×\|N/4\|+N mode1 |

( |N/4| INDICATES QUOTIENT (POSITIVE INTEGER) OBTAINED BY DIVIDING N BY 4)

FIG. 86

◆160G Buffer-Card

TABLE 15 SELECTOR SETTING REGISTER TABLE (CNV#0/1)

<table>
<tr><th rowspan="2">PORT No.</th><th colspan="4">SW-CARD CONFIGURATION</th></tr>
<tr><th>8 CARDS (2.56T)</th><th>4 CARDS (1.28T)</th><th>2 CARDS (640G)</th><th>1 CARDS (320G)</th></tr>
<tr><td>0</td><td rowspan="32">ALL 1</td><td rowspan="32" colspan="3">CONFIGURATION NOT ALLOWED</td></tr>
<tr><td>1</td></tr>
<tr><td>2</td></tr>
<tr><td>3</td></tr>
<tr><td>4</td></tr>
<tr><td>5</td></tr>
<tr><td>6</td></tr>
<tr><td>7</td></tr>
<tr><td>8</td></tr>
<tr><td>9</td></tr>
<tr><td>10</td></tr>
<tr><td>11</td></tr>
<tr><td>12</td></tr>
<tr><td>13</td></tr>
<tr><td>14</td></tr>
<tr><td>15</td></tr>
<tr><td>16</td></tr>
<tr><td>17</td></tr>
<tr><td>18</td></tr>
<tr><td>19</td></tr>
<tr><td>20</td></tr>
<tr><td>21</td></tr>
<tr><td>22</td></tr>
<tr><td>23</td></tr>
<tr><td>24</td></tr>
<tr><td>25</td></tr>
<tr><td>26</td></tr>
<tr><td>27</td></tr>
<tr><td>28</td></tr>
<tr><td>29</td></tr>
<tr><td>30</td></tr>
<tr><td>31</td></tr>
</table>

<table>
<tr><th rowspan="2">PORT No.</th><th colspan="4">SW-CARD CONFIGURATION</th></tr>
<tr><th>8 CARDS (2.56T)</th><th>4 CARDS (1.28T)</th><th>2 CARDS (640G)</th><th>1 CARDS (320G)</th></tr>
<tr><td>32</td><td rowspan="32">ALL 1</td><td rowspan="32" colspan="3">CONFIGURATION NOT ALLOWED</td></tr>
<tr><td>33</td></tr>
<tr><td>34</td></tr>
<tr><td>35</td></tr>
<tr><td>36</td></tr>
<tr><td>37</td></tr>
<tr><td>38</td></tr>
<tr><td>39</td></tr>
<tr><td>40</td></tr>
<tr><td>41</td></tr>
<tr><td>42</td></tr>
<tr><td>43</td></tr>
<tr><td>44</td></tr>
<tr><td>45</td></tr>
<tr><td>46</td></tr>
<tr><td>47</td></tr>
<tr><td>48</td></tr>
<tr><td>49</td></tr>
<tr><td>50</td></tr>
<tr><td>51</td></tr>
<tr><td>52</td></tr>
<tr><td>53</td></tr>
<tr><td>54</td></tr>
<tr><td>55</td></tr>
<tr><td>56</td></tr>
<tr><td>57</td></tr>
<tr><td>58</td></tr>
<tr><td>59</td></tr>
<tr><td>60</td></tr>
<tr><td>61</td></tr>
<tr><td>62</td></tr>
<tr><td>63</td></tr>
</table>

FIG. 87

◆80G Buffer-Card

TABLE 16 SELECTOR SETTING REGISTER TABLE (CNV#0)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 01 | | 1 | CONFIGURATION NOT ALLOWED | |
| 11 | | 1 | | |
| 2 | — | 1 | | |
| 31 | | 1 | | |
| 41 | | — | | |
| 51 | | — | | |
| 61 | | — | | |
| 71 | | — | | |
| 81 | | 1 | | |
| 91 | | 1 | | |
| 10 | 1 | 1 | | |
| 11 | 1 | 1 | | |
| 12 | 1 | — | | |
| 13 | 1 | — | | |
| 14 | 1 | — | | |
| 15 | 1 | — | | |
| 16 | 1 | 1 | | |
| 17 | 1 | 1 | | |
| 18 | 1 | 1 | | |
| 19 | 1 | 1 | | |
| 20 | 1 | — | | |
| 21 | 1 | — | | |
| 22 | 1 | — | | |
| 23 | 1 | — | | |
| 24 | 1 | 1 | | |
| 25 | 1 | 1 | | |
| 26 | 1 | 1 | | |
| 27 | 1 | 1 | | |
| 28 | 1 | — | | |
| 29 | 1 | — | | |
| 30 | 1 | — | | |
| 31 | 1 | — | | |
| 32 | 0 | 1 | CONFIGURATION NOT ALLOWED | |
| 33 | 0 | 1 | | |
| 34 | 0 | 1 | | |
| 35 | 0 | 1 | | |
| 36 | — | — | | |
| 37 | — | — | | |
| 38 | — | — | | |
| 39 | — | — | | |
| 40 | 0 | 1 | | |
| 41 | 0 | 1 | | |
| 42 | 0 | 1 | | |
| 43 | 0 | 1 | | |
| 44 | — | — | | |
| 45 | — | — | | |
| 46 | — | — | | |
| 47 | — | — | | |
| 48 | 0 | 1 | | |
| 49 | 0 | 1 | | |
| 50 | 0 | 1 | | |
| 51 | 0 | 1 | | |
| 52 | — | — | | |
| 53 | — | — | | |
| 54 | — | — | | |
| 55 | — | — | | |
| 56 | 0 | 1 | | |
| 57 | 0 | 1 | | |
| 58 | 0 | 1 | | |
| 59 | 0 | 1 | | |
| 60 | — | — | | |
| 61 | — | — | | |
| 62 | — | — | | |
| 63 | — | — | | |

(*) -; ARBITRARY SETTING VALUE DUE TO UNCONNECTION

F I G. 8 8

TABLE 17 SELECTOR SETTING REGISTER TABLE (CNV#1)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | – | – | CONFIGURATION NOT ALLOWED | |
| 1 | – | – | | |
| 2 | – | – | | |
| 3 | – | – | | |
| 4 | – | – | | |
| 5 | – | – | | |
| 6 | – | – | | |
| 7 | – | – | | |
| 8 | – | – | | |
| 9 | – | – | | |
| 10 | – | – | | |
| 11 | – | – | | |
| 12 | – | – | | |
| 13 | – | – | | |
| 14 | – | – | | |
| 15 | – | – | | |
| 16 | – | – | | |
| 17 | – | – | | |
| 18 | – | – | | |
| 19 | – | – | | |
| 20 | – | – | | |
| 21 | – | – | | |
| 22 | – | – | | |
| 23 | – | – | | |
| 24 | – | – | | |
| 25 | – | – | | |
| 26 | – | – | | |
| 27 | – | – | | |
| 28 | – | – | | |
| 29 | – | – | | |
| 30 | – | – | | |
| 31 | – | – | | |
| 32 | 1 | 1 | CONFIGURATION NOT ALLOWED | |
| 33 | 1 | 1 | | |
| 34 | 1 | 1 | | |
| 35 | 1 | 1 | | |
| 36 | 1 | 1 | | |
| 37 | 1 | 1 | | |
| 38 | 1 | 1 | | |
| 39 | 1 | 1 | | |
| 40 | 1 | 1 | | |
| 41 | 1 | 1 | | |
| 42 | 1 | 1 | | |
| 43 | 1 | 1 | | |
| 44 | 1 | 1 | | |
| 45 | 1 | 1 | | |
| 46 | 1 | 1 | | |
| 47 | 1 | 1 | | |
| 48 | 1 | 1 | | |
| 49 | 1 | 1 | | |
| 50 | 1 | 1 | | |
| 51 | 1 | 1 | | |
| 52 | 1 | 1 | | |
| 53 | 1 | 1 | | |
| 54 | 1 | 1 | | |
| 55 | 1 | 1 | | |
| 56 | 1 | 1 | | |
| 57 | 1 | 1 | | |
| 58 | 1 | 1 | | |
| 59 | 1 | 1 | | |
| 60 | 1 | 1 | | |
| 61 | 1 | 1 | | |
| 62 | 1 | 1 | | |
| 63 | 1 | 1 | | |

(*) –; ARBITRARY SETTING VALUE DUE TO UNCONNECTION

FIG. 89

◆40G Buffer-Card

TABLE 18 SELECTOR SETTING REGISTER TABLE (CNV#0)

| PORT No. | SW-CARD CONFIGURATION 8 CARDS (2.56T) | 4 CARDS (1.28T) | 2 CARDS (640G) | 1 CARDS (320G) |
|---|---|---|---|---|
| 0 | 1 | 1 | 1 | CONFIG-URATION NOT ALLOWED |
| 1 | 1 | 1 | 1 | |
| 2 | 1 | 1 | – | |
| 3 | 1 | 1 | – | |
| 4 | 1 | – | – | |
| 5 | 1 | – | – | |
| 6 | 1 | – | – | |
| 7 | 1 | – | – | |
| 8 | 1 | 1 | 1 | |
| 9 | 1 | 1 | 1 | |
| 10 | 1 | 1 | – | |
| 11 | 1 | 1 | – | |
| 12 | 1 | – | – | |
| 13 | 1 | – | – | |
| 14 | 1 | – | – | |
| 15 | 1 | – | – | |
| 16 | 0 | 1 | 1 | |
| 17 | 0 | 1 | 1 | |
| 18 | 0 | 1 | – | |
| 19 | 0 | 1 | – | |
| 20 | – | – | – | |
| 21 | – | – | – | |
| 22 | – | – | – | |
| 23 | – | – | – | |
| 24 | 0 | 1 | 1 | |
| 25 | 0 | 1 | 1 | |
| 26 | – | 1 | – | |
| 27 | – | 1 | – | |
| 28 | – | – | – | |
| 29 | – | – | – | |
| 30 | – | – | – | |
| 31 | – | – | – | |

| PORT No. | SW-CARD CONFIGURATION 8 CARDS (2.56T) | 4 CARDS (1.28T) | 2 CARDS (640G) | 1 CARDS (320G) |
|---|---|---|---|---|
| 32 | 0 | 0 | 1 | CONFIG-URATION NOT ALLOWED |
| 33 | 0 | 0 | 1 | |
| 34 | – | – | – | |
| 35 | – | – | – | |
| 36 | 1 | 1 | 1 | |
| 37 | 1 | 1 | 1 | |
| 38 | 1 | 1 | 1 | |
| 39 | 1 | 1 | 1 | |
| 40 | 0 | 0 | 1 | |
| 41 | 0 | 0 | 1 | |
| 42 | – | – | – | |
| 43 | – | – | – | |
| 44 | 1 | 1 | 1 | |
| 45 | 1 | 1 | 1 | |
| 46 | 1 | 1 | 1 | |
| 47 | 1 | 1 | 1 | |
| 48 | 0 | 0 | 1 | |
| 49 | 0 | 0 | 1 | |
| 50 | – | – | – | |
| 51 | – | – | – | |
| 52 | 1 | 1 | 1 | |
| 53 | 1 | 1 | 1 | |
| 54 | 1 | 1 | 1 | |
| 55 | 1 | 1 | 1 | |
| 56 | 0 | 0 | 1 | |
| 57 | 0 | 0 | 1 | |
| 58 | – | – | – | |
| 59 | – | – | – | |
| 60 | 1 | 1 | 1 | |
| 61 | 1 | 1 | 1 | |
| 62 | 1 | 1 | 1 | |
| 63 | 1 | 1 | 1 | |

(*) –; ARBITRARY SETTING VALUE DUE TO UNCONNECTION

F I G. 90

◆20G Buffer-Card

TABLE 19 SELECTOR SETTING REGISTER TABLE (CNV#0)

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 1 | 1 | 1 | 1 |
| 1 | 1 | 1 | 1 | – |
| 2 | 1 | 1 | – | – |
| 3 | 1 | 1 | – | – |
| 4 | 1 | – | – | – |
| 5 | 1 | – | – | – |
| 6 | 1 | – | – | – |
| 7 | 1 | – | – | – |
| 8 | 1 | 1 | 1 | 1 |
| 9 | 1 | 1 | 1 | – |
| 10 | 1 | 1 | – | – |
| 11 | 1 | 1 | – | – |
| 12 | 1 | – | – | – |
| 13 | 1 | – | – | – |
| 14 | 1 | – | – | – |
| 15 | 1 | – | – | – |
| 16 | 0 | 0 | 0 | 1 |
| 17 | – | – | – | – |
| 18 | – | – | – | – |
| 19 | – | – | – | – |
| 20 | – | – | – | – |
| 21 | – | – | – | – |
| 22 | – | – | – | – |
| 23 | – | – | – | – |
| 24 | 0 | 0 | 0 | 1 |
| 25 | – | – | – | – |
| 26 | – | – | – | – |
| 27 | – | – | – | – |
| 28 | – | – | – | – |
| 29 | – | – | – | – |
| 30 | – | – | – | – |
| 31 | – | – | – | – |

| PORT No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 32 | 0 | 0 | 1 | 1 |
| 33 | 0 | 0 | 1 | – |
| 34 | – | – | – | – |
| 35 | – | – | – | – |
| 36 | 1 | 1 | 1 | 1 |
| 37 | 1 | 1 | 1 | 1 |
| 38 | 1 | 1 | 1 | 1 |
| 39 | 1 | 1 | 1 | 1 |
| 40 | 0 | 0 | 1 | 1 |
| 41 | 0 | 0 | 1 | – |
| 42 | – | – | – | – |
| 43 | – | – | – | – |
| 44 | – | – | – | – |
| 45 | – | – | – | – |
| 46 | – | – | – | – |
| 47 | – | – | – | – |
| 48 | 0 | 0 | 0 | 1 |
| 49 | – | – | – | – |
| 50 | – | – | – | – |
| 51 | – | – | – | – |
| 52 | 1 | 1 | 1 | 1 |
| 53 | 1 | 1 | 1 | 1 |
| 54 | 1 | 1 | 1 | 1 |
| 55 | 1 | 1 | 1 | 1 |
| 56 | 0 | 0 | 0 | 1 |
| 57 | – | – | – | – |
| 58 | – | – | – | – |
| 59 | – | – | – | – |
| 60 | – | – | – | – |
| 61 | – | – | – | – |
| 62 | – | – | – | – |
| 63 | – | – | – | – |

(*) –; ARBITRARY SETTING VALUE DUE TO UNCONNECTION

F I G. 91

●160G Buffer-Card

| RDD No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 1 | CONFIGURATION NOT ALLOWED | | |
| 1 | 1 | | | |
| 2 | 1 | | | |
| 3 | 1 | | | |
| 4 | 0 | | | |
| 5 | 0 | | | |
| 6 | 0 | | | |
| 7 | 0 | | | |

F I G. 92

●80G Buffer-Card

CNV#0

| RDD No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 1 | 1 | CONFIGURATION NOT ALLOWED | |
| 1 | 1 | 1 | | |
| 2 | 1 | 1 | | |
| 3 | 1 | 1 | | |
| 4 | 0 | 1 | | |
| 5 | 0 | 1 | | |
| 6 | 0 | 1 | | |
| 7 | 0 | 1 | | |

CNV#1

DEFAULT VALUE IN ALL CASES (SETTING NOT REQUIRED)

●40G Buffer-Card

| RDD No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 1 | 1 | 1 | CONFIGURATION NOT ALLOWED |
| 1 | 1 | 1 | 1 | |
| 2 | 0 | 1 | 1 | |
| 3 | 0 | 1 | 1 | |
| 4 | 0 | 0 | 1 | |
| 5 | 0 | 0 | 1 | |
| 6 | 0 | 0 | 1 | |
| 7 | 0 | 0 | 1 | |

●20G Buffer-Card

| RDD No. | SW-CARD CONFIGURATION | | | |
|---|---|---|---|---|
| | 8 CARDS (2.56T) | 4 CARDS (1.28T) | 2 CARDS (640G) | 1 CARDS (320G) |
| 0 | 1 | 1 | 1 | 1 |
| 1 | 1 | 1 | 1 | 1 |
| 2 | 0 | 0 | 0 | 1 |
| 3 | 0 | 0 | 0 | 1 |
| 4 | 0 | 0 | 1 | 1 |
| 5 | 0 | 0 | 1 | 1 |
| 6 | 0 | 0 | 0 | 1 |
| 7 | 0 | 0 | 0 | 1 |

FIG. 93

PACKET SWITCH DEVICE

BACKGROUND OF THE INVENTION

1. Field of the Invention

The present invention relates to a packet switch device for large-scale packet switching.

2. Description of the Related Art

With the explosive expansion of the Internet and with the advent of media handling large-amount or high-quality information, expectations have been running high in recent years for an improvement in a large-scale communications infrastructure that can flexibly handle a massive amount of data. Additionally, there has been a growing interest in a switch having a capacity of several hundreds of gigabytes to several terabytes, which is a key to actualization.

FIG. 1 exemplifies the configuration of a conventional input buffer switch.

In this configuration, a crossbar switch is a simple switch that is positioned at a stage succeeding input buffers, and that switches on/off each intersection point in a matrix generated when input and output HWs (highways) are arranged vertically and horizontally. At the exit of the input buffers, the crossbar switch can be configured not to include buffers. Namely, input packets are grouped into packets destined for output ports #1 through #N within the input buffers, and the grouped packets are stored. A scheduler outputs, for example, the packets to be output to the output port #1 at the appropriate timing so that they do not collide within the crossbar switch.

To expand the capacity of such a crossbar switch, a method connecting HWs in multiple stages in a matrix state, and a method bit-slicing one HW and arranging switches in parallel are considered as conventional techniques.

FIG. 2 shows a conventional crossbar switch expanding method, with which the capacity of a crossbar switch is expanded by connecting switches in multiple stages in a matrix state.

This figure shows the configuration which achieves its object by adding crossbar switches 11-1 through 11-3 in a matrix state when a single crossbar switch 10 which originally uses 4-input and 4-output lines is expanded to be a switch using 8-input and 8-output lines. In this configuration, the expansion method is simple. However, the number of crossbar switches is squared each time the capacity is expanded, leading to a very large hardware configuration.

FIG. 3 shows a conventional expansion method bit-slicing one HW, and arranging switches in parallel.

Assume that one M×M matrix switch is first arranged, and switching is made, for example, in units of 8-bit packets with the expansion method shown in FIG. 3. To expand this switch, an 8-bit packet is disassembled into 4-bit data, and switching is made by 2 M×M matrix switches, which respectively output the 4-bit data to the same output HW in parallel. Then, the output HW reassembles the 4-bit data into the 8-bit packet, and outputs the reassembled packet.

To further expand the capacity with the bit-slicing method shown in FIG. 3, one packet is further disassembled, and a required number of matrix switches are arranged. For instance, an 8-bit packet can be disassembled into 1-bit data. Therefore, this packet can be disassembled into 8 at the maximum. Accordingly, also 8 matrix switches are prepared, and each of the switches is made to switch 1-bit data. Bit data of one packet is output to the same output HW, which reassembles and transmits the 8-bit packet.

With the connections of crossbar switches in multiple stages shown in FIG. 2, the hardware amount increases with the requirements of IFs for expansion connections and with the square of the switch scale. Compared with this method, the bit slicing shown in FIG. 3 only requires the hardware proportional to the scale of a switch, thereby reducing a switch size. Note that, however, if the number of inputs/outputs of an HW accommodated by a switch is large, the number of input/output terminals proportional to that of the inputs/outputs is required with the bit slicing. Furthermore, a method attaching switch on-off information as the tag information of a packet to reduce the number of switch terminals is considered. However, the tag information must be attached to each bit with the bit slicing method, so that a process overhead becomes large.

FIG. 4 shows an example where a tag is attached to data with the bit slicing method.

If a packet having a payload composed of 63 words having 8-bit length is switched in units of packets, one tag may be attached to this packet. Namely, in FIG. 4, a tag composed of 1 word having 8-bit length is attached. If this packet is bit-sliced and disassembled into 1-bit data, it is necessary to attach a tag of 8 words having 1-bit length to each of the disassembled payloads of 63 words, and to switch each payload by an individual matrix switch. Accordingly, the data having 64 words when being switched in units of packets increases to 71 words if it is bit-sliced.

Furthermore, the following problems exist.

If a fault occurs in one slice, a packet itself is discarded (a complete packet cannot be transmitted), leading to system down.

Expansion cannot be made online.

SUMMARY OF THE INVENTION

An object of the present invention is to provide a large-scale packet switch device that can reduce a process overhead while preventing hardware from increasing when the capacity of the switch is expanded.

A packet switch device according to the present invention, which switches a packet, comprises: a distributing unit sequentially distributing input packets to a plurality of paths in an arrival order in units of packets; a switching unit switching a packet input from the distributing unit via the plurality of paths, and outputting the packet; and a multiplexing unit multiplexing the packet output from the switching unit by performing a process reverse to the packet distribution process performed by the distributing unit.

According to the present invention, switching is made after slicing is performed in units of packets. Therefore, a tag used for switching may be attached to each packet, thereby reducing a process overhead in comparison with the bit-slicing method attaching a tag to each bit.

Additionally, the capacity of a packet switch can be easily expanded by arranging small-capacity packet switches in parallel, which prevents useless hardware from being increased.

BRIEF DESCRIPTION OF THE DRAWINGS

FIG. 17 is a flowchart showing the flow of the operations of a switch controlling unit shown in FIG. 16;

FIG. 26 explains the duplex configuration of a buffer unit;

FIG. 35 explains a snooping capability;

FIG. 37 explains a switching procedure for the N+1 system shown in FIG. 36;

FIG. 42 explains a selector signal counter shown in FIG. 41;

FIG. 43 explains an offset adding unit shown in FIG. 41;

FIG. 44 explains an input line number input assigning unit shown in FIG. 41;

FIG. 45 explains the matrix switch shown in FIG. 41;

FIGS. 54A through 54C explain the configuration of a switch system allowing the capacity of a switch to be changed in the case where a circuit implementing both of the XB-SW unit and the converting unit is implemented as a switch LSI;

FIG. 57 shows the connection configuration of CNV external terminals in the case shown in FIGS. 55 and 56 (No. 1);

FIG. 58 shows the connection configuration of CNV external terminals in the case shown in FIGS. 55 and 56 (No. 2);

FIG. 59 shows the connection configuration of CNV external terminals in the case shown in FIGS. 55 and 56 (No. 3);

FIG. 63 shows the connection configuration of CNV external terminals in the cases shown in FIGS. 60 through 62 (No. 1);

FIG. 64 shows the connection configuration of CNV external terminals in the cases shown in FIGS. 60 through 62 (No. 2);

FIG. 65 shows the connection configuration of CNV external terminals in the cases shown in FIGS. 60 through 62 (No. 3);

FIG. 66 shows the connection configuration of CNV external terminals in the cases shown in FIGS. 60 through 62 (No. 4);

FIG. 67 shows the connection configuration of CNV external terminals in the cases shown in FIGS. 60 through 62 (No. 5);

FIG. 71 shows the connection configuration of CNV external terminals in the cases shown in FIGS. 68 through 70 (No. 1);

FIG. 72 shows the connection configuration of CNV external terminals in the cases shown in FIGS. 68 through 70 (No. 2);

FIG. 73 shows the connection configuration of CNV external terminals in the cases shown in FIGS. 68 through 70 (No. 3);

FIG. 77 shows the connection configuration of CNV external terminals in the cases shown in FIGS. 74 through 76 (No. 1);

FIG. 78 shows the connection configuration of CNV external terminals in the cases shown in FIGS. 74 through 76 (No. 2);

FIG. 79 shows the connection configuration of CNV external terminals in the cases shown in FIGS. 74 through 76 (No. 3);

FIG. 80 shows a table representing the setting values of an offset setting register (No. 1);

FIG. 81 shows the table representing the setting values of the offset setting register (No. 2);

FIG. 82 shows the table representing the setting values of the offset setting register (No. 3);

FIG. 83 shows the table representing the setting values of the offset setting register (No. 4);

FIG. 84 shows the table representing the setting values of the offset setting register (No. 5);

FIG. 85 shows the table representing the setting values of the offset setting register (No. 6);

FIG. 86 shows the table representing the setting values of the input line number setting register-0/1;

FIG. 87 shows a table representing the setting values of a selector Enable setting register (No. 1);

FIG. 88 shows the table representing the setting values of the selector Enable setting register (No. 2);

FIG. 89 shows the table representing the setting values of the selector Enable setting register (No. 3);

FIG. 90 shows the table representing the setting values of the selector Enable setting register (No. 4);

FIG. 91 shows the table representing the setting values of the selector Enable setting register (No. 5);

FIG. 92 shows a table representing the setting values of a URDD selector and a DRDD selector Enable register (No. 1); and FIG. 93 shows the table representing the setting values of the URDD selector and the DRDD selector Enable register (No. 2).

DESCRIPTION OF THE PREFERRED EMBODIMENTS

Figure 1:
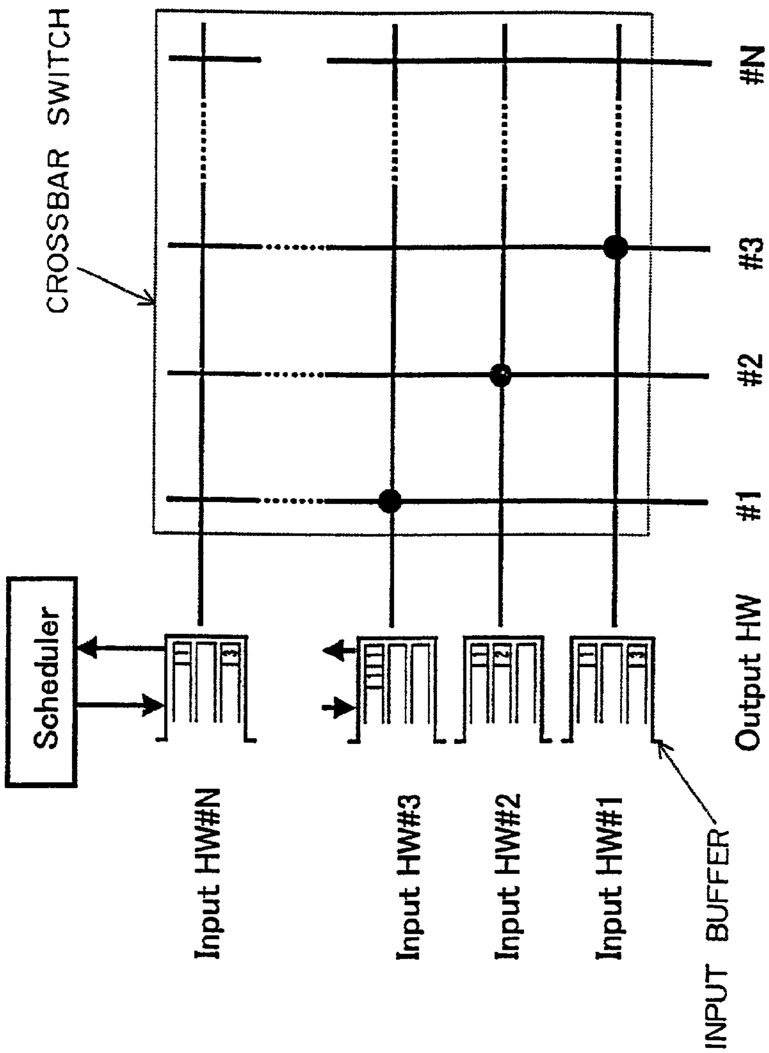
FIG. 1 exemplifies the configuration of a conventional input buffer switch.
Figure 2:
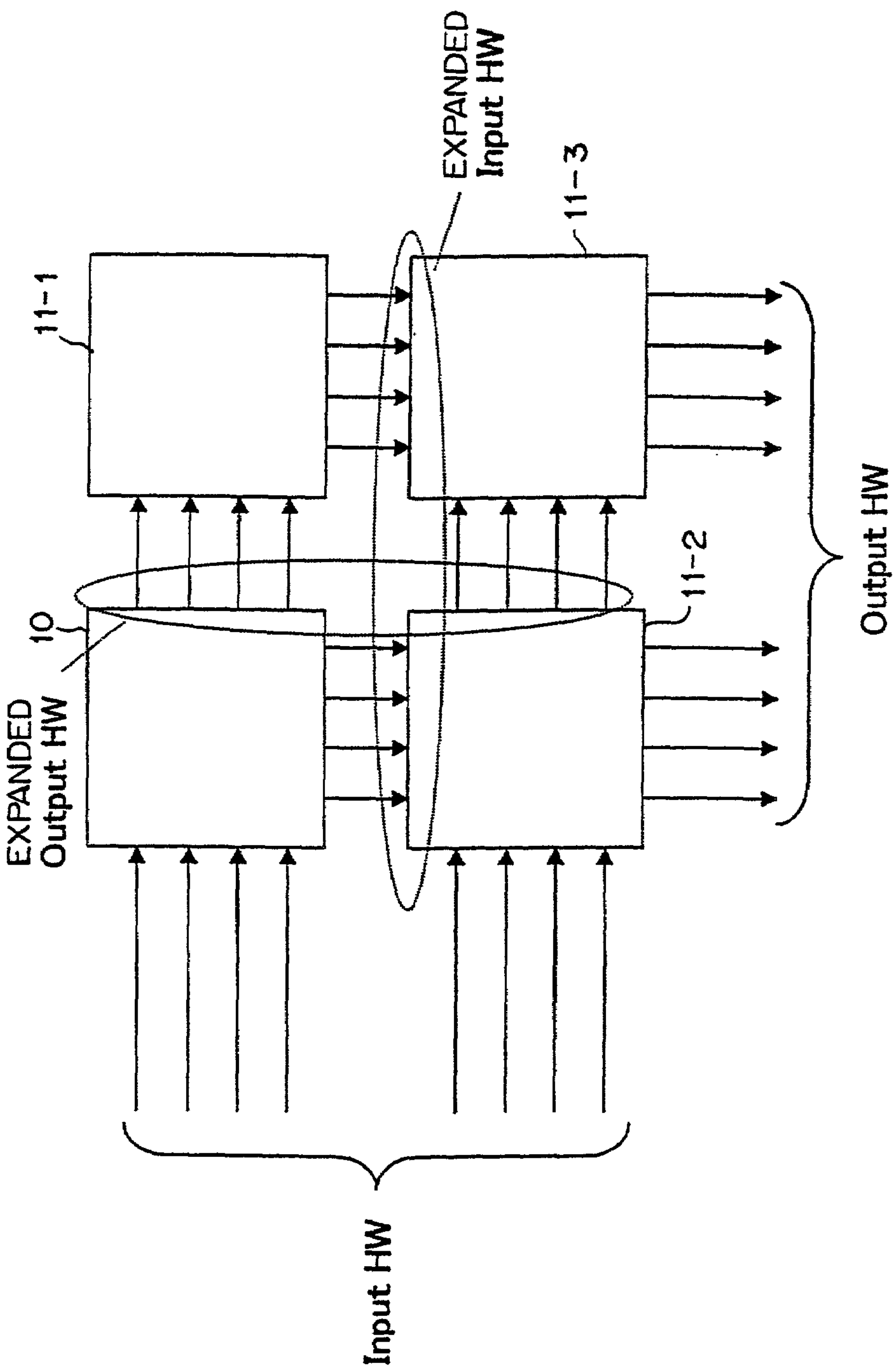
FIG. 2 shows a conventional crossbar switch expanding method connecting switches in many stages in a matrix state for expansion.
Figure 3:
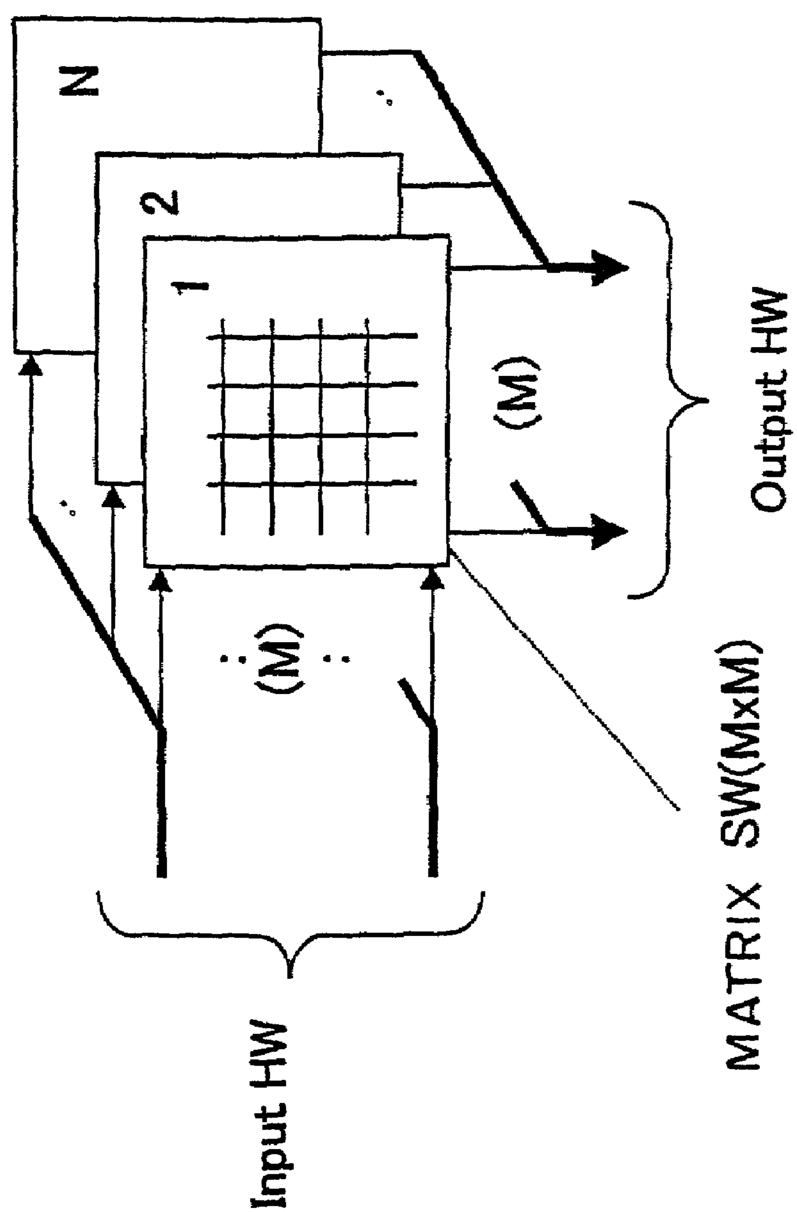
FIG. 3 shows a conventional expansion method bit-slicing one HW, and arranging switches in parallel.
Figure 4:
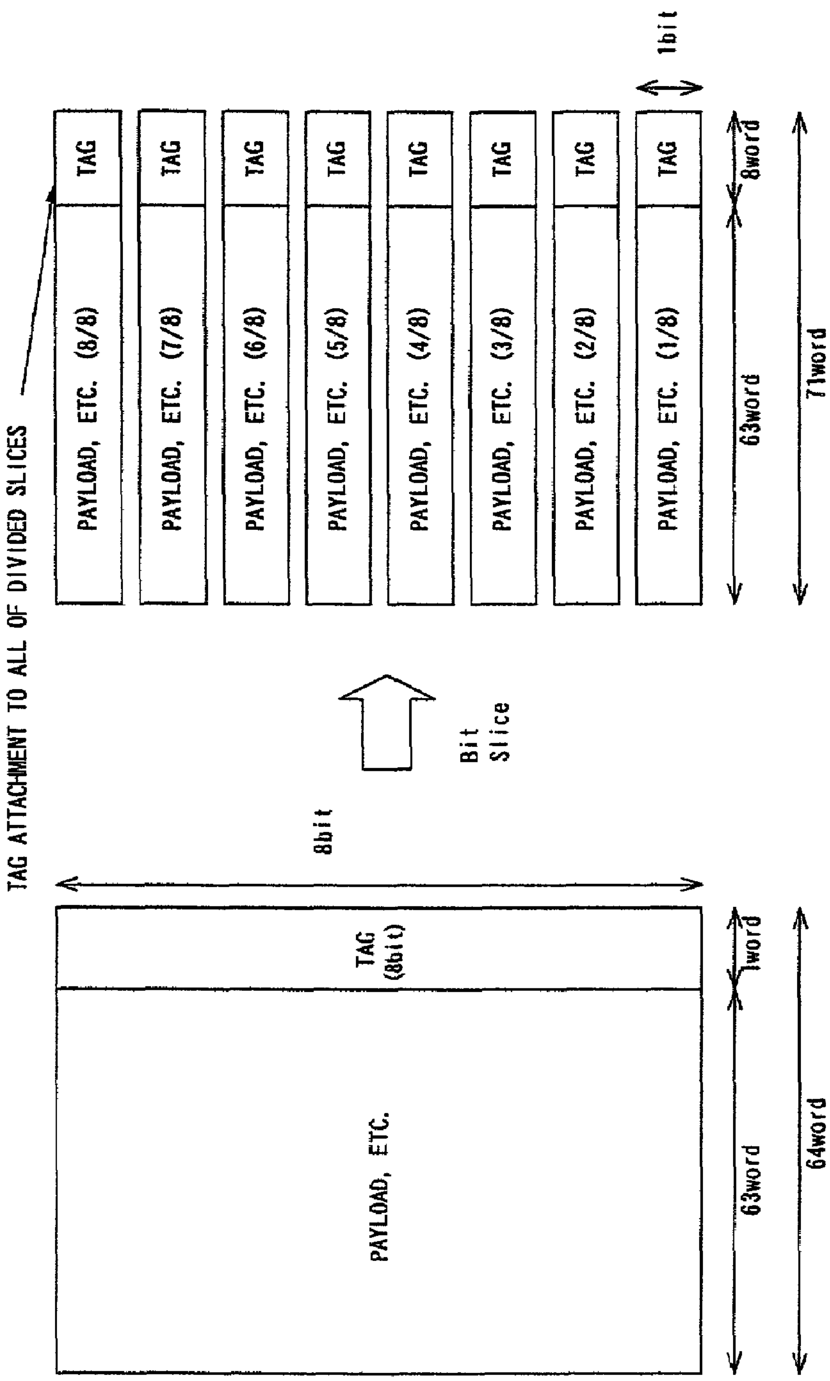
FIG. 4 shows an example where a tag is attached to data with the bit-slicing method.
Figure 5:
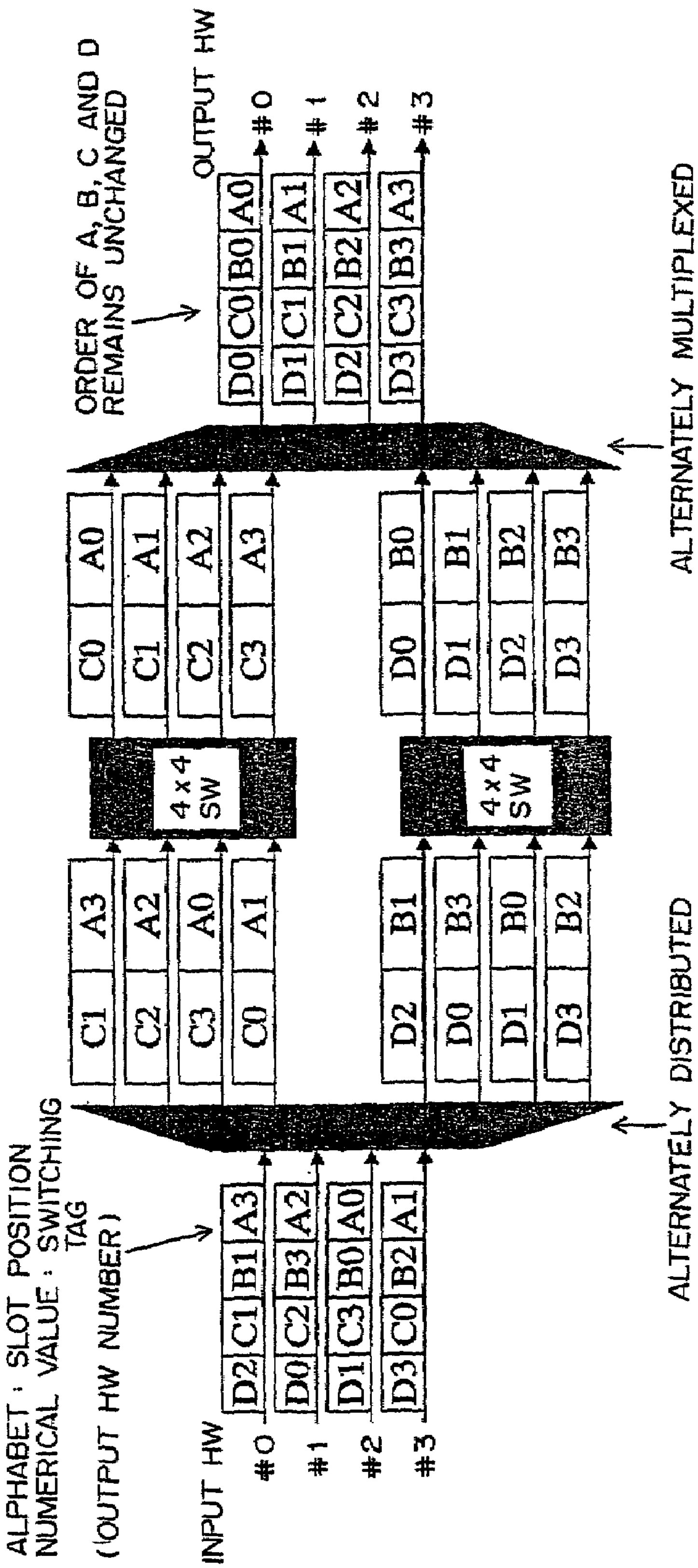
FIG. 5 shows the principle of a first preferred embodiment.

FIG. 5 shows the principle of a first preferred embodiment according to the present invention.

This figure exemplifies the case where two 4×4 crossbar switches are used. In this preferred embodiment, switching is made in units of packets. Input packets are distributed to the switches in the same order in a cyclic manner. Namely, as shown in FIG. 5, 4 packets are input to an input HW#0, and a packet in a slot A is destined for an output HW#3. Similarly, packets in slots B, C, and D of the input HW#0 are respectively destined for an output HW#1, the output HW#1, and an output HW#2. Similarly, for the input HWs #1 through #3, packets destined for the output HW#0 to #3 are assigned and input to the slots A through D. These slots are alternately assigned to the two switches.

Within the switches, switching is made by referencing tags (numerical values written in the slots in FIG. 5), which are independently attached to the packets. At a stage succeeding the switches, the packets are multiplexed in the same order as the distribution order of the packets when being input to the switches. Here, since only a fixed delay time occurs within the switches, the order of the packets (a packet which is input to an input HW later is output from an output HW earlier) is not inverted. Accordingly, according to this preferred embodiment, the capacity of a switch device can be expanded by arranging small-capacity packet switches in parallel. Hereafter, the configuration according to this preferred embodiment is referred to as a packet slicing method.

With the packet slicing method, only one switching tag is required for each packet, whereby an overhead can be reduced in comparison with the bit-slicing method, and the length of a packet is not varied within a packet switch device. Furthermore, even if a fault occurs in one switch, a packet passes via a different switch, thereby decreasing the influence of the fault.

Figure 6:
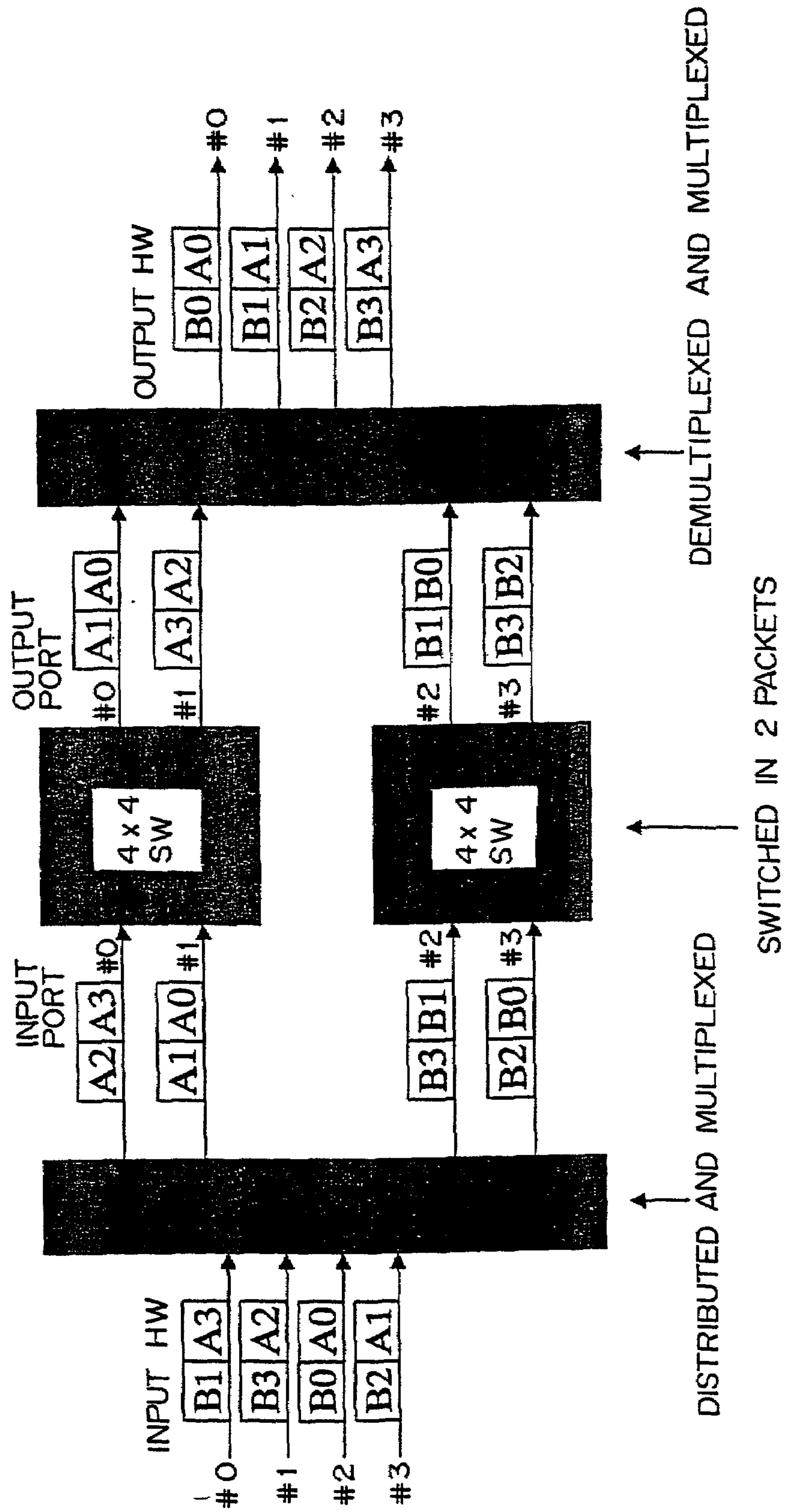
FIG. 6 shows the principle of a second preferred embodiment.

FIG. 6 shows the principle of a second preferred embodiment according to the present invention. This preferred embodiment is an example where two 4×4 crossbar switches adopting packet slicing are used, and 2 HWs are respectively multiplexed at a switch port. At the stage preceding the switches, packets are sliced and distributed, and the packets on input HWs #0 and #1 or input HWs #2 and #3 are multiplexed at one port. Namely, the packets in slots A of the input HWs #0 and #1 are distributed to an input port #1, and packets in slots A of the input HWs #2 and #3 are distributed to an input port #1. Similarly, packets in slots B of the input HWs #0 and #1 are distributed to an input port #2, and packets in slots B of the input HWs #2 and #3 are distributed to an input port #3.

Each of the switches handles the multiplexed packets output from the two HWs as a chunk, switches the packets according to the tags of the packets (for example, the order of the packets input from the input port #0 is changed by the 4×4 switch in FIG. 6), and respectively multiplexes the packets of the output ports #0 and #1 or #2 and #3 for one port in units of the above described chunks. After the multiplexed packets are demultiplexed at the stage succeeding the switches, the packets distributed to the respective output ports are multiplexed for each output HW. Here, the 4×4 switches shown in FIG. 6 are used to switch in units of 1 packet data which is input in units of 2 packets. That is, switching is made as a 4×4 switch within the switches, although 2 inputs/2 outputs are made to/from the switches.

In this way, the number of ports of the switches can be reduced.

Figure 7:
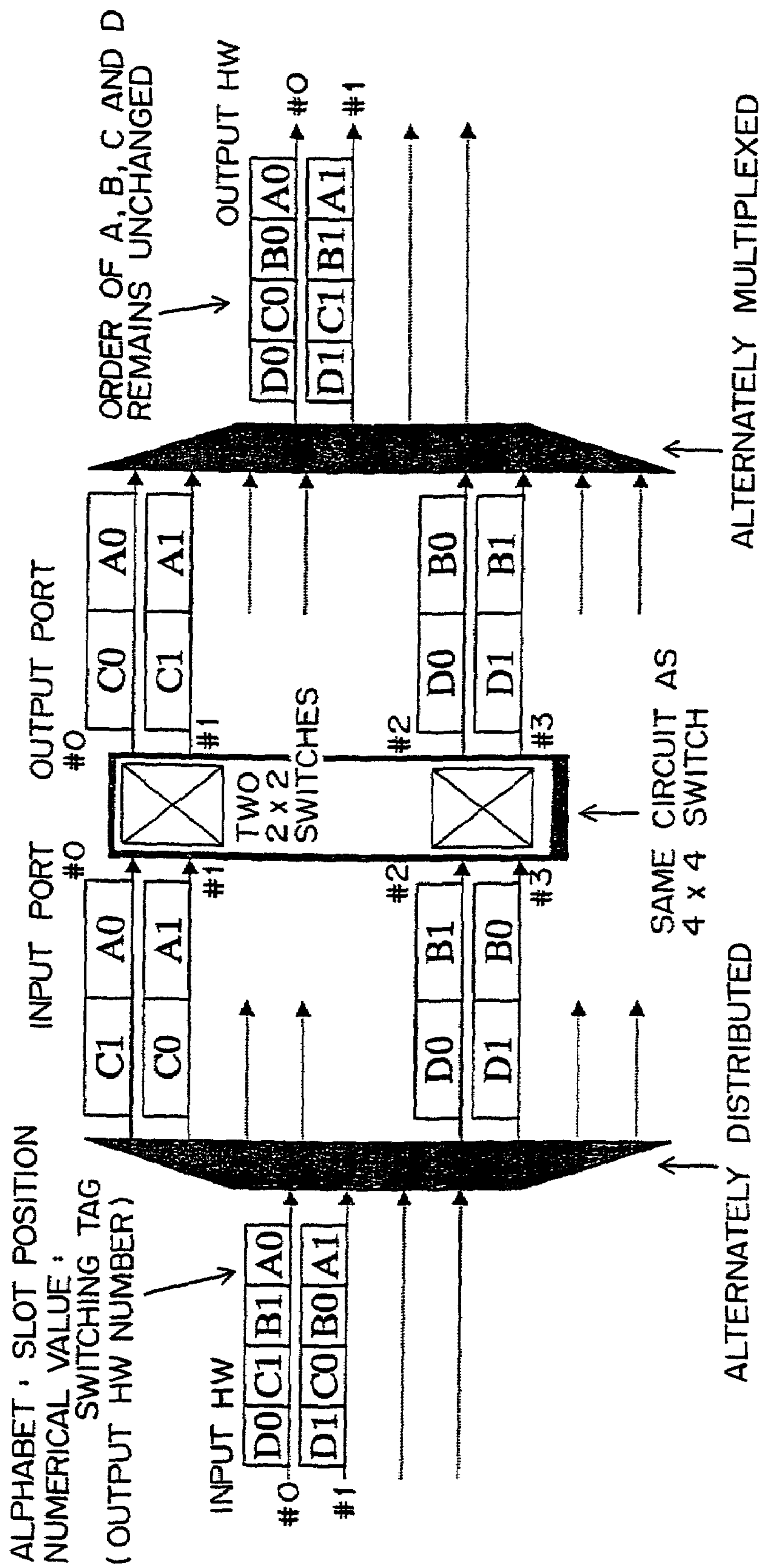
FIG. 7 shows the principle of a third preferred embodiment.

FIG. 7 shows the principle of a third preferred embodiment of the present invention.

Unlike FIG. 5, only one switch circuit is used, and this switch circuit is configured by not a 4×4 switch, but two 2×2 switches in FIG. 7.

In this figure, the switch circuit acts as a switch which operates at the same HW speed, and whose capacity is one half the switch shown in FIG. 5. By reducing the number of ports of a switch circuit and making the switch circuit perform a plurality of divided operations as described above, the number of switch circuits to be arranged can be varied according to the capacity.

The operations of this switch circuit are similar to those shown in FIG. 5. Namely, packets in respective slots are alternately distributed to the two 2×2 switches so that the packets in the slots A of input HWs #0 and #1 are respectively distributed to input ports #0 and #1, and the packets in the slots B of input HWs #2 and #3 are distributed to input ports #2 and #3. The packets switched by the two 2×2 switches are output from output ports #0 through #3, multiplexed alternately, and output to the output HWs #0 and #1.

Figure 8:
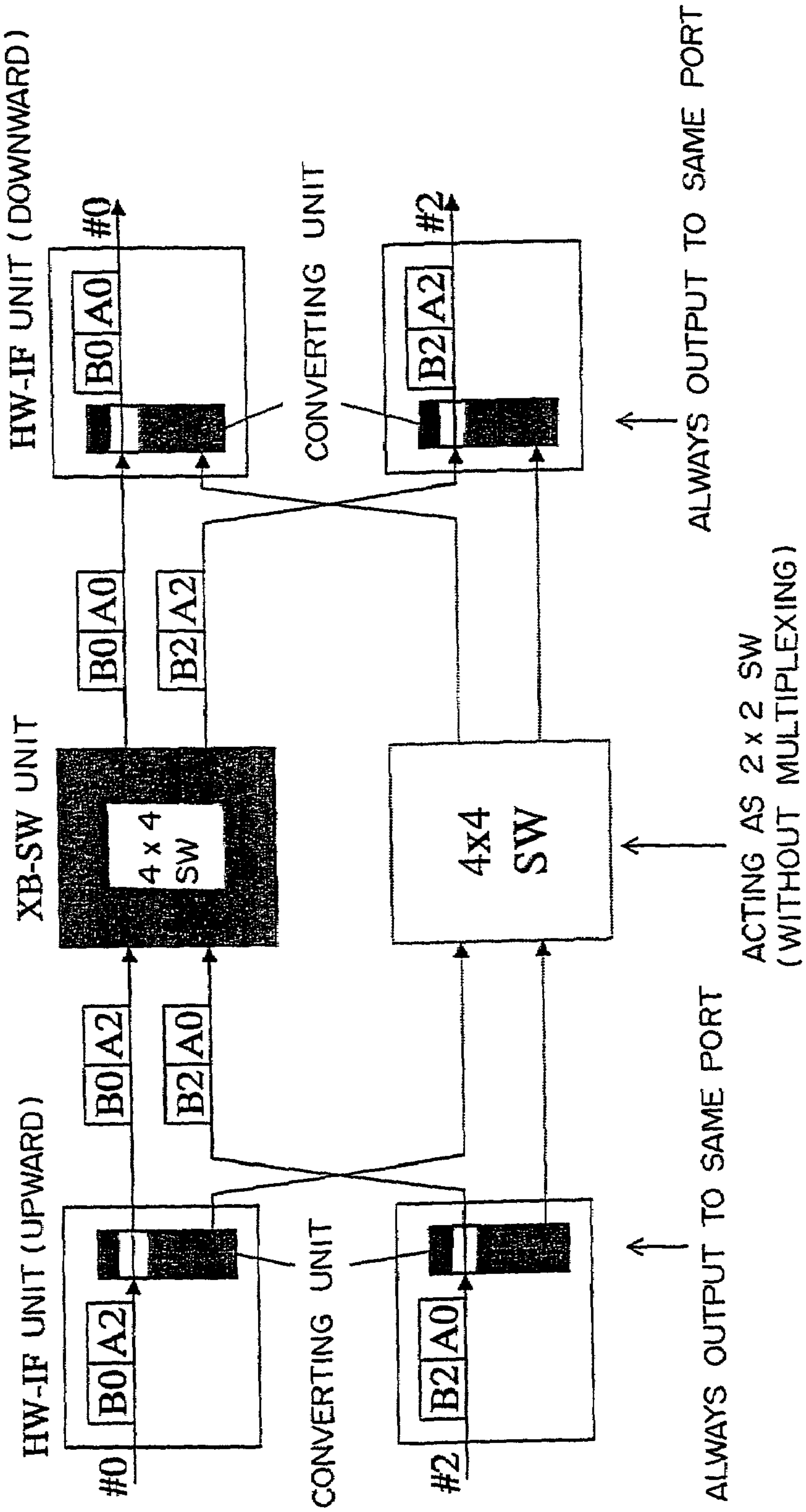
FIG. 8 shows the principle of a fourth preferred embodiment (No. 1)
Figure 9:
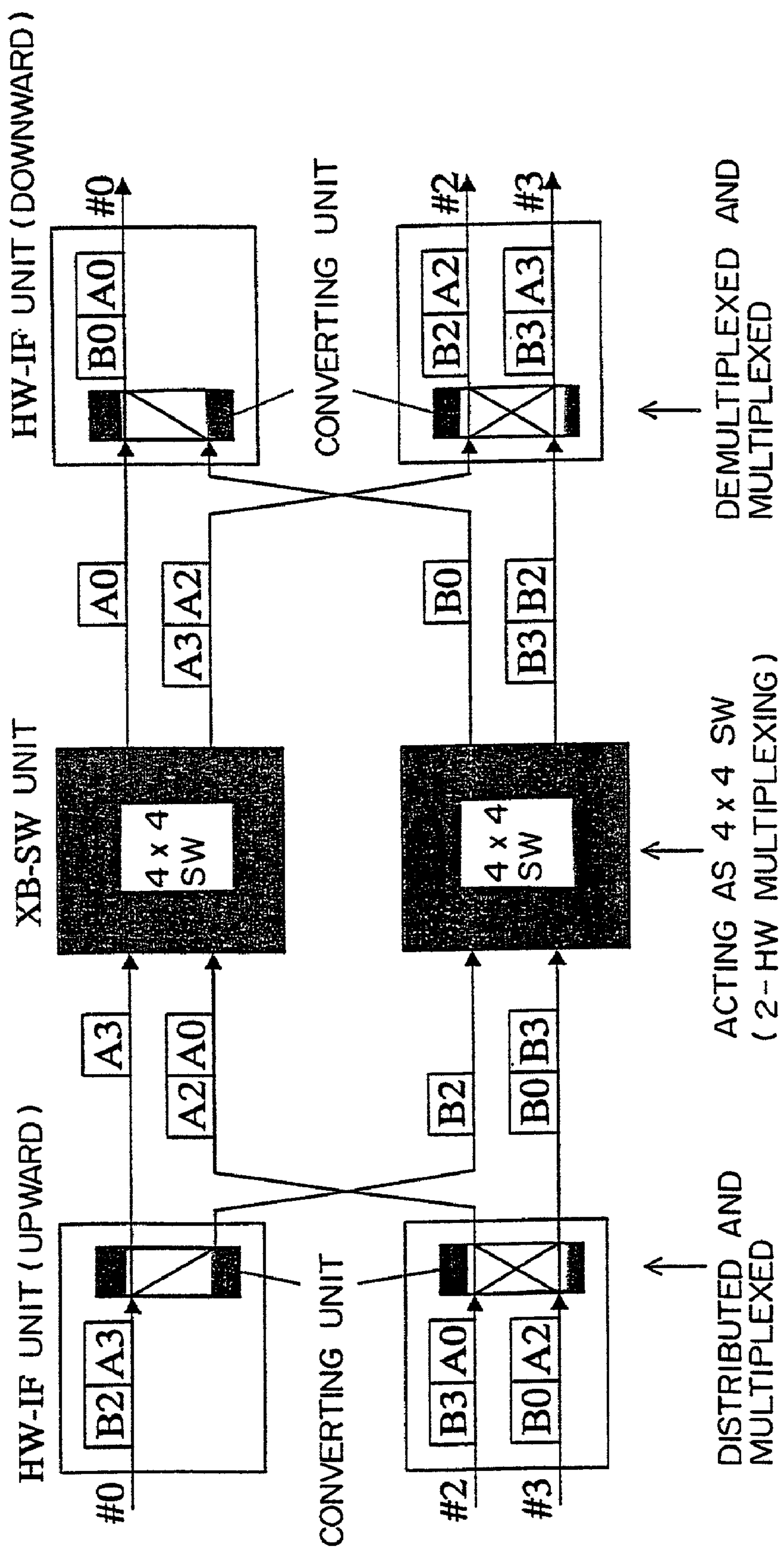
FIG. 9 shows the principle of the fourth preferred embodiment (NO. 2)

FIGS. 8 and 9 show the principle of a fourth preferred embodiment according to the present invention. These figures illustrate the case where crossbar switches (XB-SWs) having 2 input ports and 2 output ports are used. FIG. 8 shows the case where all of HW-IFs (highway interface units) accommodate only one HW, whereas FIG. 9 shows the case where an HW-IF accommodating one HW and an HW-IF accommodating two HWs coexist.

In the case shown in FIG. 8, only one XB-SW is used, and this XB-SB acts as a 2×2 switch as a whole. Upward and downward converting units transmit packets between used HWs and the used XB-SW. The XB-SW makes 2×2 switching without multiplexing HWs.

In the meantime, in the case shown in FIG. 9, two XB-SWs are used, and they act as a 4×4 switch as a whole. An upward converting unit of an HW-IF unit accommodating two HWs distributes packets to two XB-SWs, and multiplexes HWs. A downward converting unit of an HW-IF unit accommodating two HWs demultiplexes HWs, and multiplexes packets from the two XB-SW units. Upward and downward converting units of the HW-IFs accommodating one HW perform operations similar to those of the converting units of the HW-IFs accommodating two HWs by recognizing that no packets exists on unused HWs. The XB-SW units make 4×4 switching by multiplexing two HWs. The converting units absorb the difference between the operations of the XB-SW units as described above, whereby HW-IFs accommodating different HWs can coexist, and only a minimum number of XB-SW units according to the type of an accommodating HW-IF can be arranged.

Figure 10:
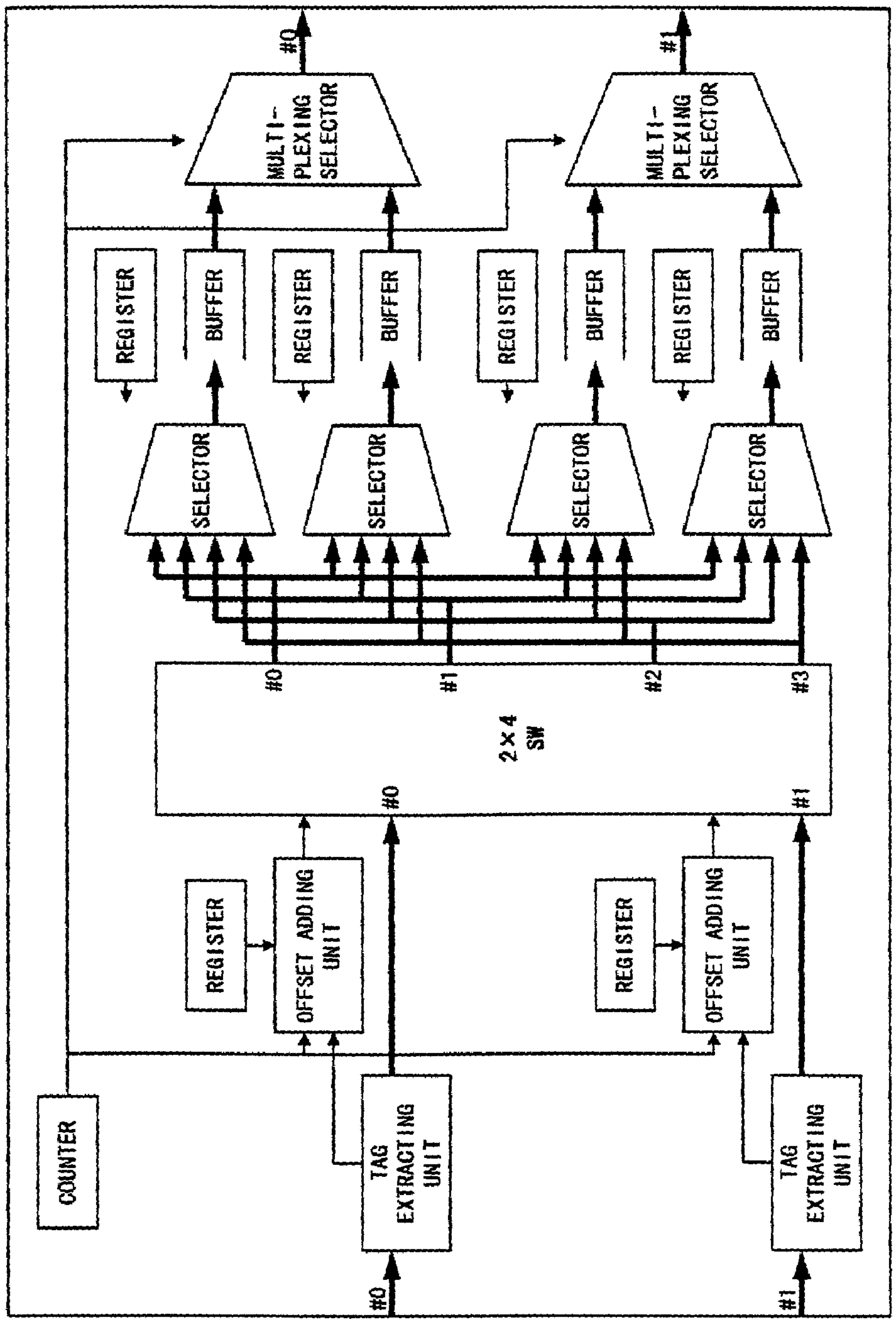
FIG. 10 is a block diagram showing the configuration of a circuit acting as a WB-SW unit or a converting unit.

FIG. 10 is a block diagram showing the configuration of a circuit operating as an XB-SW unit or a converting unit.

The circuit shown in FIG. 10 acts as an XB-SW unit or a converting unit that supports 2 inputs and 2 outputs, and 2-HW multiplexing. A counter alternately indicates 0 and 1 when two HWs are multiplexed, and always indicates 0 when HWs are not multiplexed. An offset adding unit adds an offset value set for each port to a tag attached to a packet when the circuit is applied as the XB-SW unit, and to a counter value when the circuit is applied as the converting unit, and uses the result of the addition as an output number. A register accompanying the offset adding unit is intended to hold an offset value to be added by the offset adding unit. The switch unit switches a packet to the port indicated by the output number. A selector makes a correspondence between a buffer and an output port of the switch. A register accompanying the selector holds a setting value that instructs to which port an output is to be connected when the selector makes switching. The selector makes the switching based on the setting value of the register. A buffer temporarily holds a packet to be multiplexed. A multiplexing selector alternately reads buffers when two HWs are multiplexed, and reads one buffer when HWs are not multiplexed. In this way, the XB-SW unit and the converting unit can be implemented by the same circuit.

By way of example, if the circuit acts as the 2×2 switch that does not multiplex HWs and is shown in FIG. 8, the offset adding unit uses an extracted tag unchanged as an output number. After the packet is switched according to the output number, the selector selects a switch output #0 for a port 0, and a switch output #2 for a port 1, and the packet is output to the selected port.

If the circuit acts as the 4×4 switch that multiplexes two HWs and is shown in FIG. 9, the offset adding unit uses an extracted tag unchanged as an output number. After the packet is switched according to the output number, the selector alternately selects switch outputs #0 and #1 for a port 0, and switch outputs #2 and #3 for a port 1 (the counter alternately indicates 0 and 1), and the packet is output to the selected port.

Figure 11:
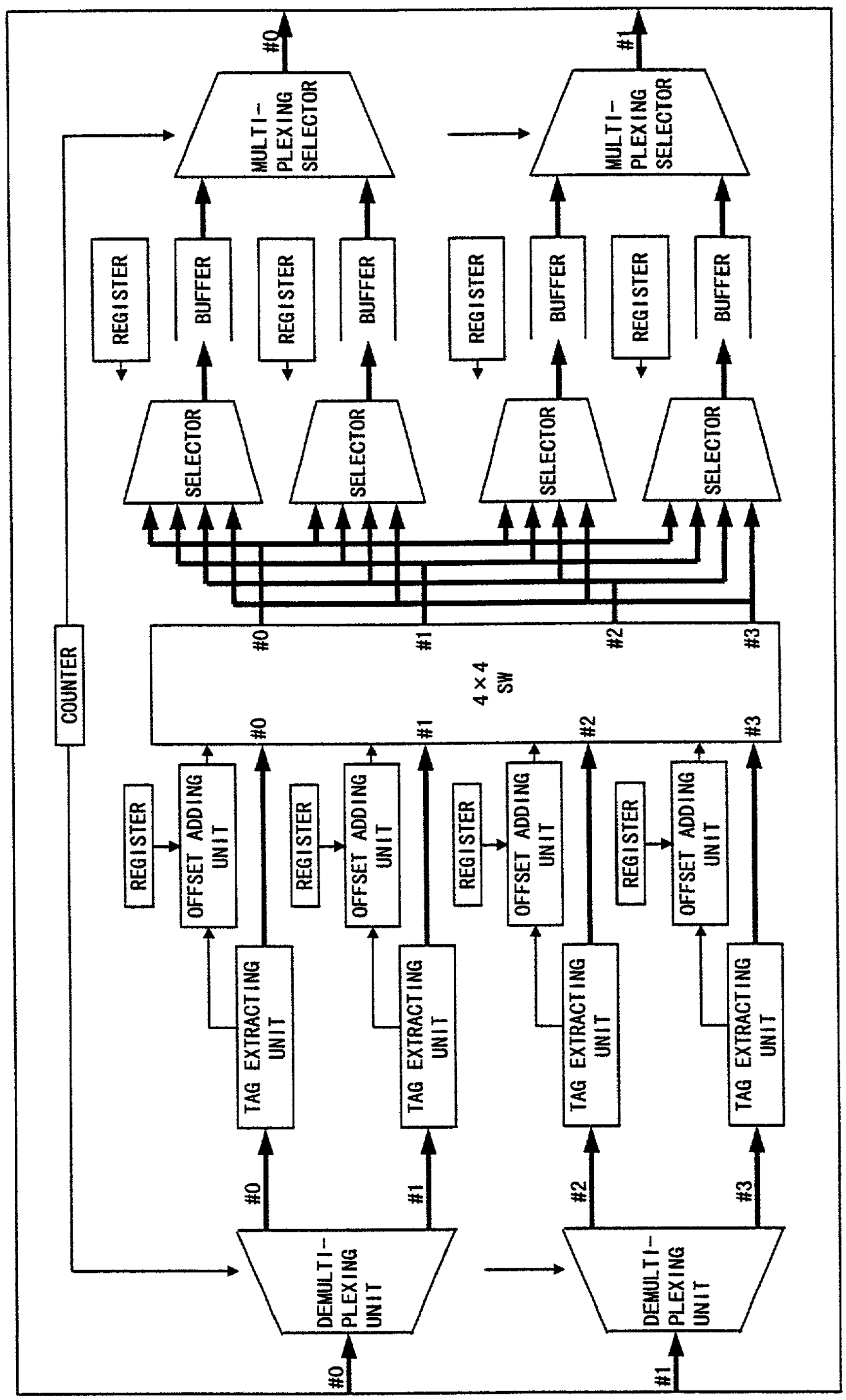
FIG. 11 exemplifies another configuration of the circuit shown in FIG. 10.

If the circuit acts as the converting unit that does not multiplex HWs, the counter value is fixed to 0. The offset adding unit for the input port #0 uses a counter value unchanged as an output number. After the packet is switched according to the output number, the selector alternately selects and outputs switch outputs #0 and #1 for the port 0, and switch outputs #2 and #3 for the port 1, and the packet is output to the selected port. Furthermore, if the circuit acts as each of two 2×2 switches that multiplex two HWs (if the 4×4 switch shown in FIG. 11 is assumed to multiplex two HWs), the offset adding unit for the input port #0 uses 0 as an output number, whereas the offset adding unit for the input port #1 uses the value obtained by adding 2 to the tag as an output number. After the packet is switched according to the output, the selector alternately selects switch outputs #0 and #1 for the port 0, and switch outputs #2 and #3 for the port 1 (the counter alternately indicates 0 and 1, and the packet is output to the selected port.

FIG. 11 exemplifies another configuration of the circuit shown in FIG. 10.

A demultiplexing unit demultiplexes a packet input from a port #0 or #1 based on the value of a counter, and outputs the demultiplexed packets to their ports #0 through #3. For example, the demultiplexed packets are alternately output to the output ports #0 and #1 of the demultiplexing unit. In this way, data input in units of two packets is disassembled into packets, and can be input to the switch. A tag extracting unit extracts the tag attached to a packet, and inputs the extracted tag to an offset adding unit. The offset adding unit adds an offset value to the value of the tag based on the number held in a register, so that the packets to be input to input ports #0 to #3 of the switch are output to desired output ports #0 through #3. The packets output from the output port of the switch are input to a selector.

The selector outputs any of the input packets based on the value set in a register, and inputs the packet to a buffer. The buffer temporarily stores the packet output from the selector, and inputs the packet to a multiplexing selector. The multiplexing selector selects and multiplexes packets in order to transmit a multiplexed packet from its output port. In this way, the input packet is switched and output.

Figure 12:
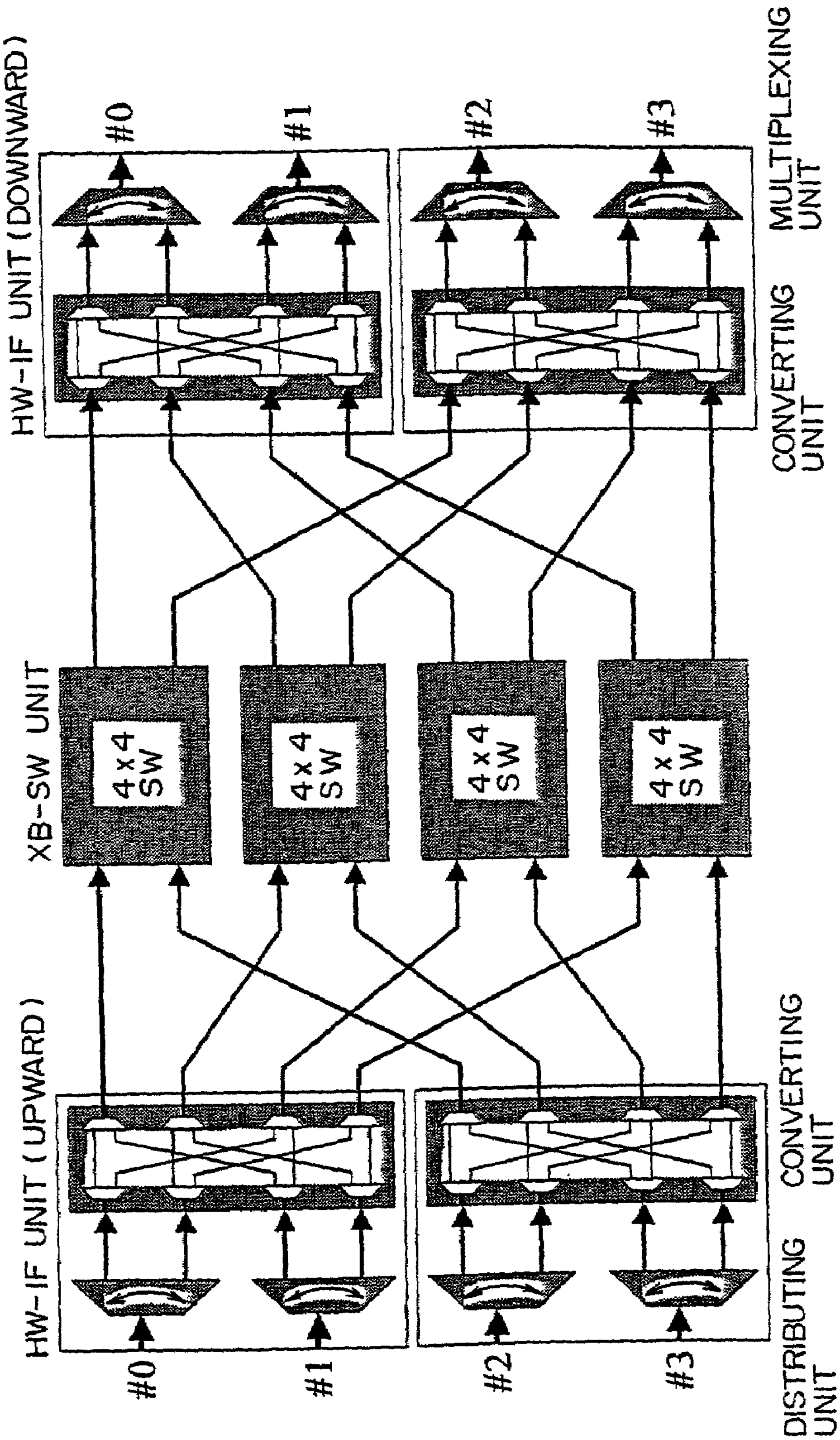
FIG. 12 exemplifies the configuration where 4 lines are accommodated by 4 switches.

FIG. 12 exemplifies the configuration in the case where four switches accommodate four lines.

In this case, data of input HWs #0 through #3 input to upward HW-IFs (highway-interfaces) are alternately distributed for respective time slots by a distributing unit, and input to converting units. Each of the converting units has a configuration shown in FIG. 10 or 11, that is, a converting unit having 2 inputs and 2 outputs. This converting unit demultiplexes an input signal, and substantially acts as a 4×4 switch. In FIG. 12, two converting units having 2 inputs and 2 outputs are mutually switched and connected. Namely, after the data input from the input highway #0 is distributed by the distributing unit, it is input to the converting unit. Not only the data input from the input highway #0, but also data input from the input highway #1 is switched and connected by the converting unit.

Accordingly, with the configuration shown in FIG. 12, the data from the input highways #0 and #1 are mutually switched and connected, and those from the input highways #2 and #3 are mutually switched and connected. However, the data from the input highways #0 and #1 and those from the input highways #2 and #3 are not switched and connected within the converting unit.

Data output from the converting units are input to the four 4×4 switches in the XB-SW unit in units of packets or time slots. The 4×4 switches switch and connect the packet data, and input the data to converting units of downward HW-IF units. Each of the downward converting units has a configuration similar to that of the upward converting unit, and distributes input data packets to multiplexing units for output highways #0 through #33. The multiplexing units alternately multiplex the input data packets, and output the multiplexed data to the respective output HWs.

Control for such data packet distribution operations is performed by adjusting the numbers stored in the respective registers shown in FIGS. 10 and 11.

Figure 13:
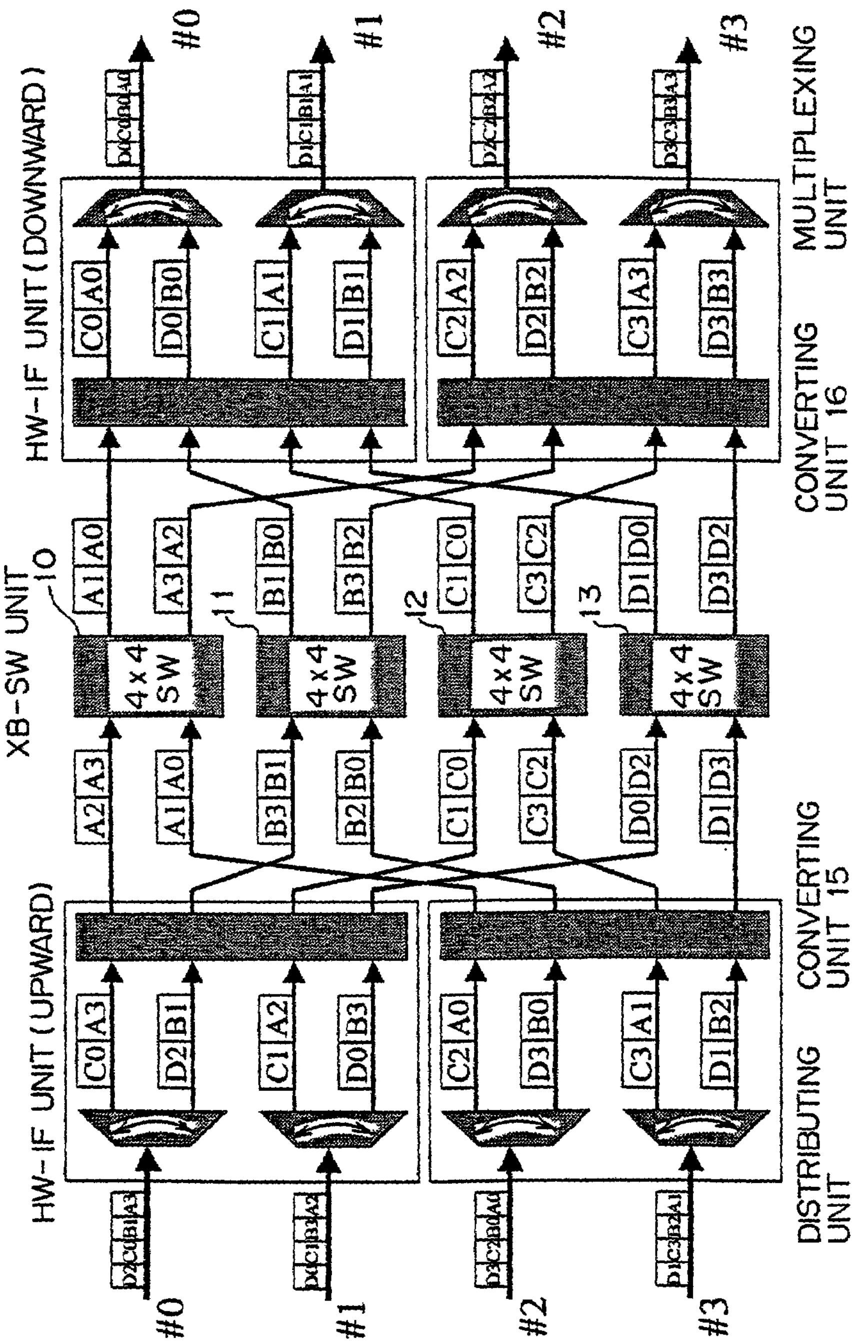
FIG. 13 exemplifies the operations in the configuration shown in FIG. 12.

FIG. 13 exemplifies the operations of the configuration shown in FIG. 12.

Packets to which output HWs are assigned are input to time slots A through D of input HWs #0 through #3. A distributing unit of an upward HW-IF unit alternately outputs, for example, the packets in the time slots A through D to two ports. As a result, the distributing unit to which the data from the input HW #0 is input outputs the packets A3 and C0 to one of its output ports, and outputs the packets B1 and D2 to the other. Also the operations of the other distributing units are similar to those of the input HW #0.

A converting unit 15 of the upward HW-IF unit distributes input packets to four 4×4 switches within the XB-SW unit for respective time slots. Namely, in the example shown in FIG. 13, the packets in the time slots A, B, C, and D are respectively input to the 4×4 switches 10, 11, 12, and 13.

The 4×4 switches 10 through 13 switch and output respective two packets as pairs for each output HW, and input the pairs to converting units 16 of downward HW-IFs. The converting units 16 switch and connect the input packets for each output HW, and transmit the packets to multiplexing units. The multiplexing units multiplex and output the input packets to output HWs.

Figure 14:
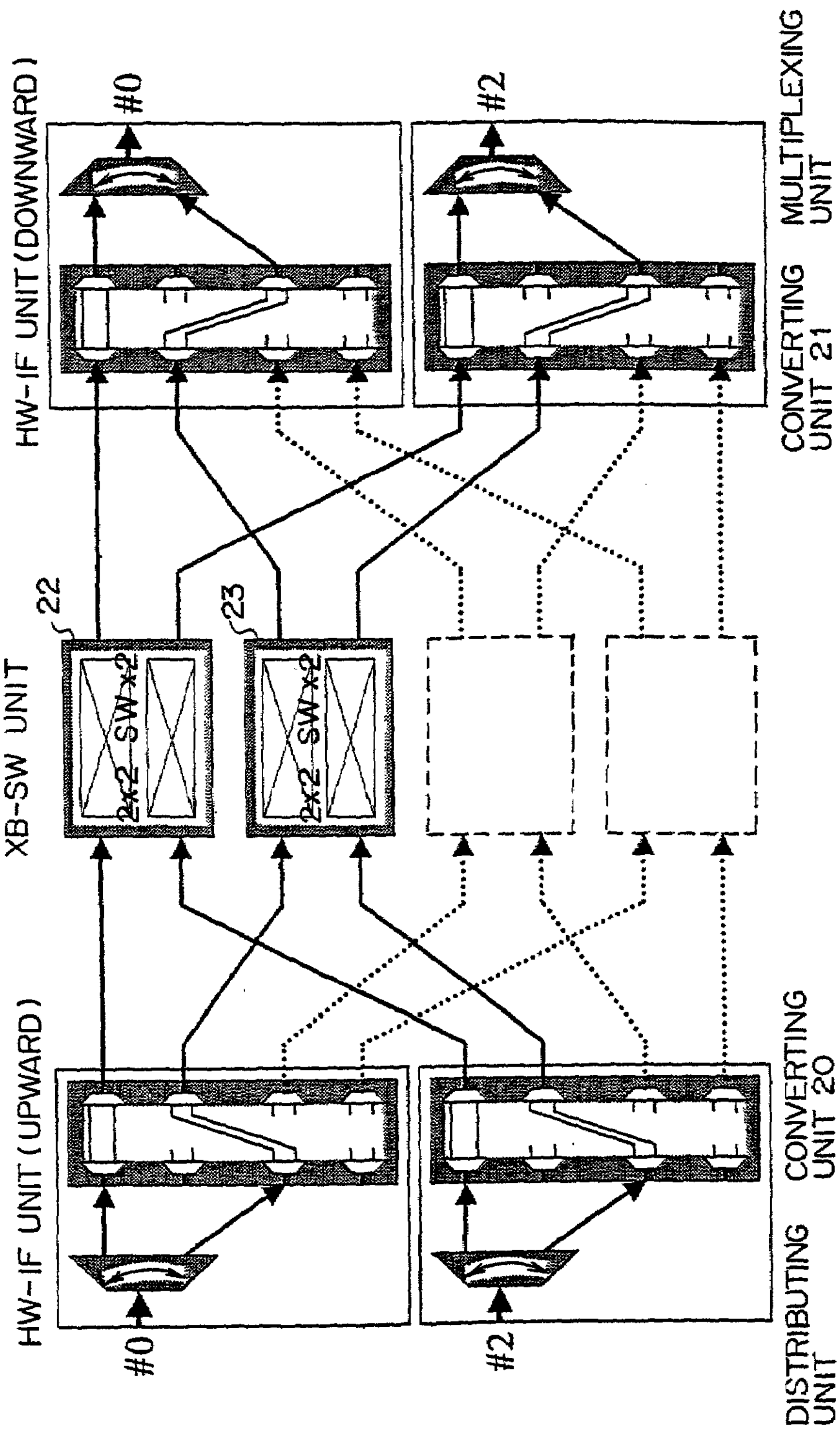
FIG. 14 exemplifies the configuration where 2 lines are accommodated by 4 switches.

FIG. 14 exemplifies the configuration in the case where four switches accommodates two lines.

In the case shown in FIG. 14, respective two 2×2 switches are prepared as each switch within an XB-SW unit. Input HWs #0 and #2 are input to upward HW-IF units. Distributing units alternately distribute and output packets input from the input HWs for respective time slots. Converting units 20 switch and connect the input packets from the distributing units, and distribute the packets to the switches 22 and 23 within the XB-SW unit. The switches 22 and 23 switch the packets, and input the packets to converting units 21 of downward HW-IF units. The converting units 21 switch and connect the input packets, and input the packets to multiplexing units. The multiplexing units multiplex the packets to be output to output highways #0 and #2.

As shown in FIG. 14, only two switches each of which is composed of two 2×2 switches are required to implement a packet switch for two lines and two multiplexing. If four switches are prepared, the remaining two switches are not needed.

Figure 15:
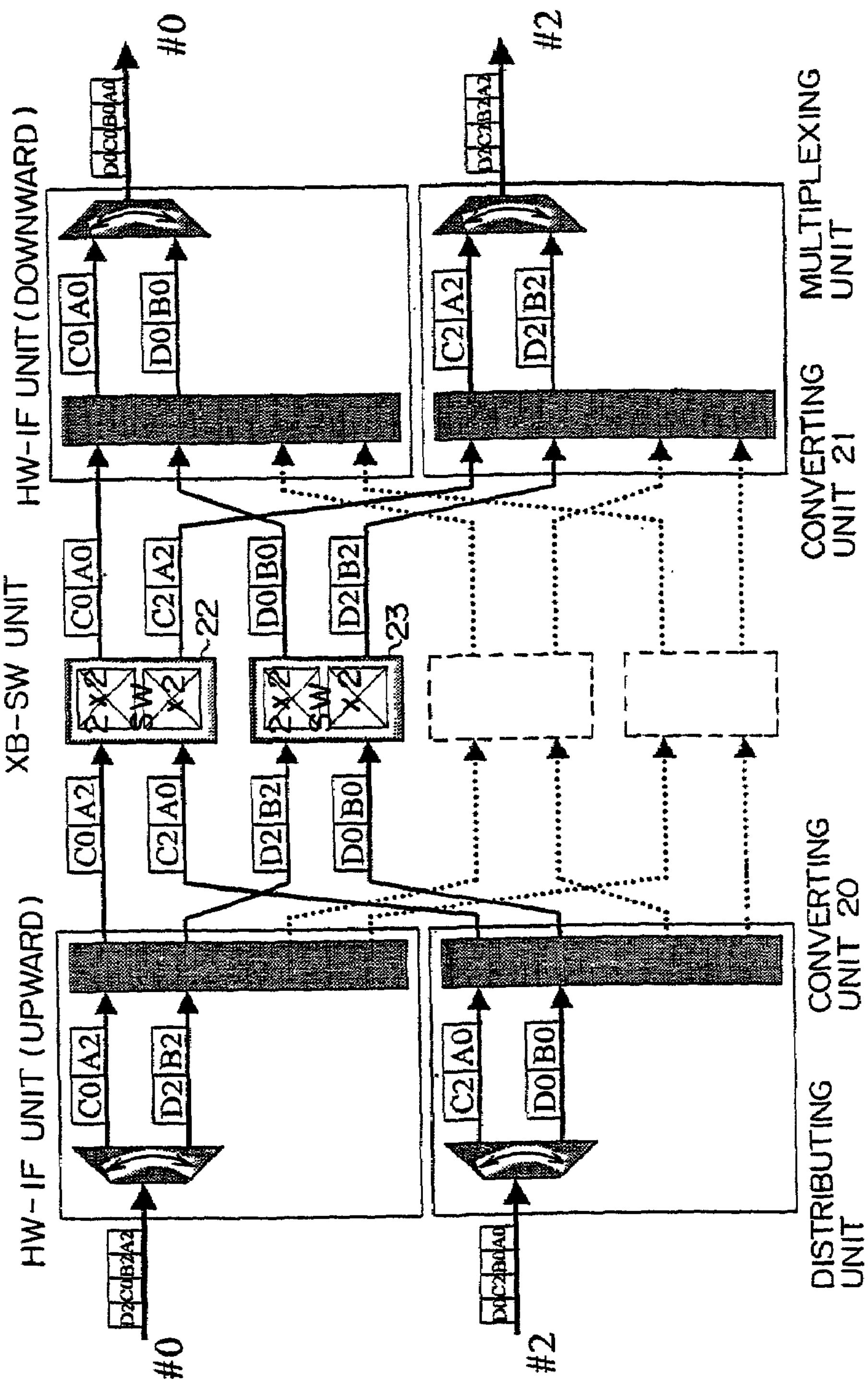
FIG. 15 explains the operations in the configuration shown in FIG. 14.

FIG. 15 explains the operations of the configuration shown in FIG. 14.

Packets destined for the output HWs #0 and #2, which are arranged in time slots A through D, are input from the input HWs #0 and #2. Distributing units alternately output these packets in units of time slots, and input the packets to converting units 20. The converting units 20 input the packets in the time slots A and C to the switch 22, and the packets in the time slots B and D to the switch 23. The switches 22 and 23 switch the packets in the respective time slots, and output the packets to converting units 21.

The converting units 21 output the received packets unchanged, and input the packets to multiplexing units. In this way, the packets destined for the output HWs #0 and #2 are input to the multiplexing units, which multiplex the packets and output the multiplexed packets to the output HWs #0 and #2.

Figure 16:
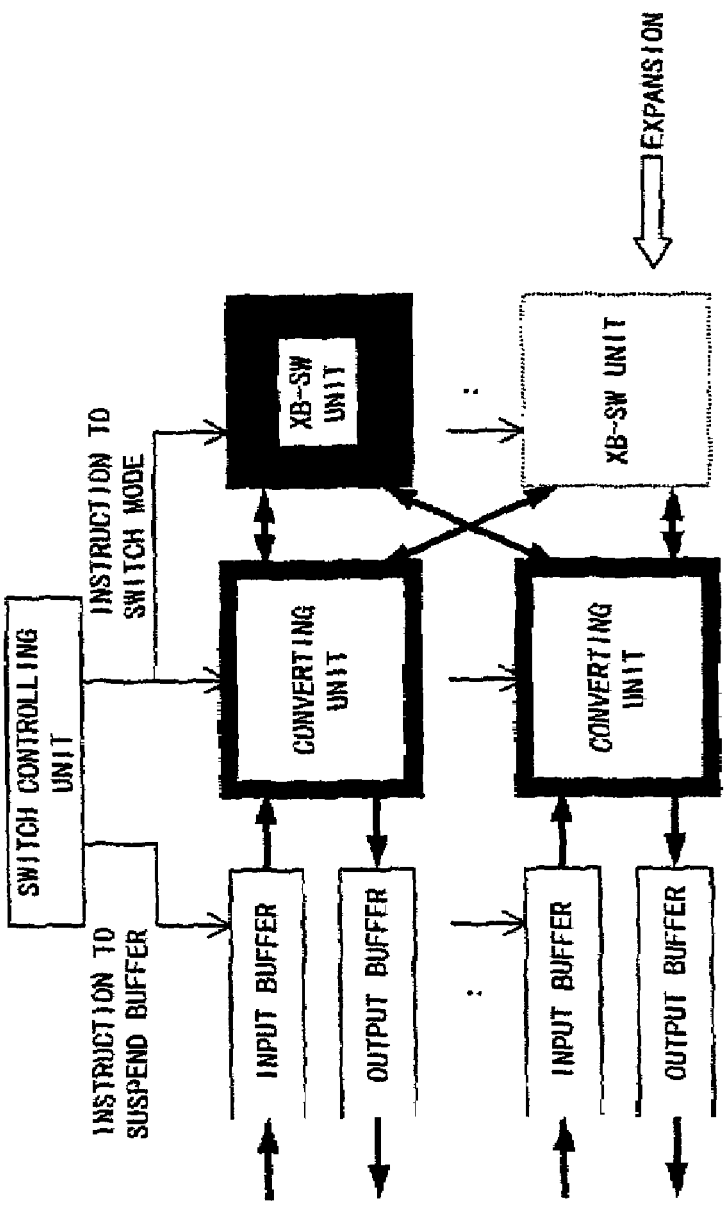
FIG. 16 shows the principle of the flow of a process for expanding a switch according to the preferred embodiment of the present invention.

FIG. 16 shows the principle of the flow of a switch expansion process according to the preferred embodiment of the present invention.

If the operations of a converting unit and an XB-SW unit are changed during a packet transmission when the XB-SW is expanded online, there is a possibility that the packet is output to an HW different from a target HW or is discarded. This phenomenon can be prevented by once suspending a packet read from an input buffer (which is not explicitly referred to in the above described preferred embodiment, but actually, arranged to wait for a packet input, etc.) before an operation mode is switched, by changing the operation mode upon completion of the output of all packets of the converting unit and the XB-SW unit, and by resuming the packet read from the input buffer. A series of operations is instructed by a switch controlling unit.

FIG. 17 is a flowchart showing the operations of the switch controlling unit shown in FIG. 16.

First of all, when an XB-SW unit is expanded online, the switch controlling unit issues an instruction to suspend a buffer read in step S1. As a result, no packets are output from the buffer. Next, in step S2, completion of the output of packets remaining within the XB-SW unit is waited. This completion is verified, for example, by detecting that no packets are output for a predetermined amount of time on the output side of the XB-SW unit. When the completion of the packet output from the XB-SW unit is verified, the XB-SW unit is expanded and the operation mode is switched, that is, new switching setting is made in step S3. In step S4, an instruction to resume the packet read from the buffer is issued. In this way, the XB-SW unit can be securely expanded online.

Figure 18:
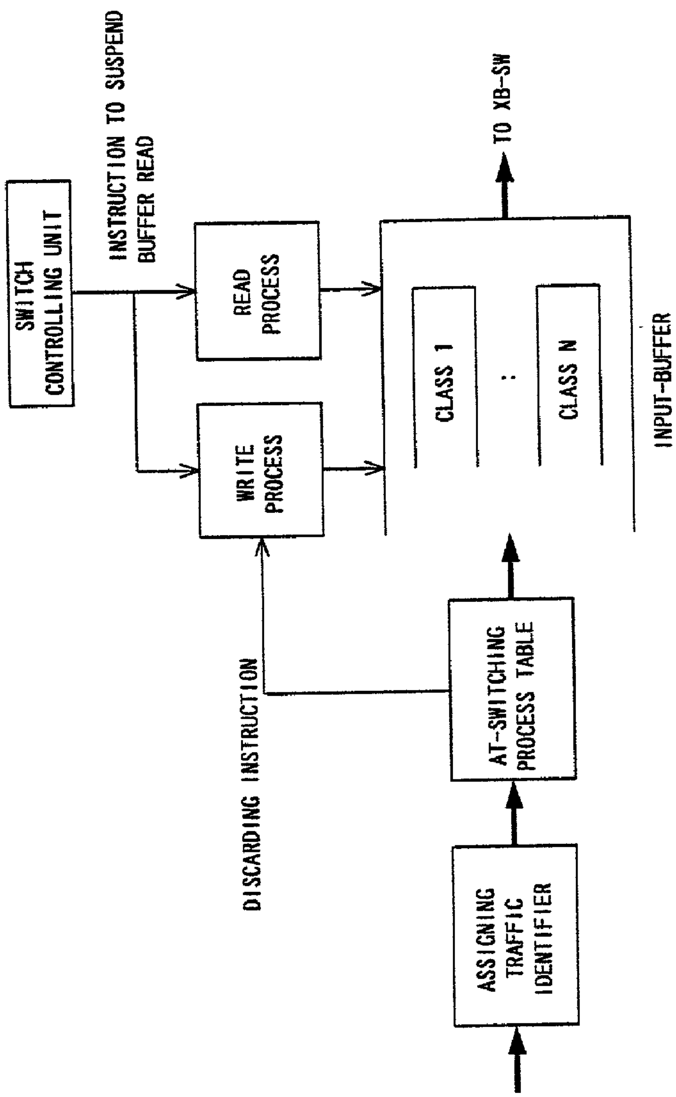
FIG. 18 shows another principle of the flow of a process when an XB-SW is expanded online.

FIG. 18 shows another principle of the flow of the process performed when an XB-SW unit is expanded online.

While an operation mode is switched, reading from an input buffer is suspended. Packets arrived during that time are stored in a buffer. Therefore, a delay occurs due to the mode switching. Discarding no packets is preferable to some data traffic delay. However, a delay sometimes exerts more influence than that of some noise caused by packet discarding as in the case of a telephone. Therefore, whether an arrived packet is either discarded or stored in a buffer is selected depending on the type of traffic in order to cope with such a case. An identifier identifying the type of traffic is attached to a packet, and an at-switching process table is referenced according to this identifier. In the at-switching process table, information such that a packet having which identifier type is to be discarded and a packet having which identifier to be stored in the input buffer are registered. For example, a data traffic packet is stored in an input buffer, whereas an audio traffic packet is discarded. As stated earlier, a process for either discarding or storing a packet is performed according to a result of referencing the at-switching process table. Here, if queues of input buffers are separated depending on the types of traffic, an influence such that even a packet which prioritizes the avoidance of a delay occurrence is retarded due to many packets which does not prioritize the avoidance of a delay occurrence and remain in the input buffer after the operation mode is switched, can be prevented.

Figure 19:
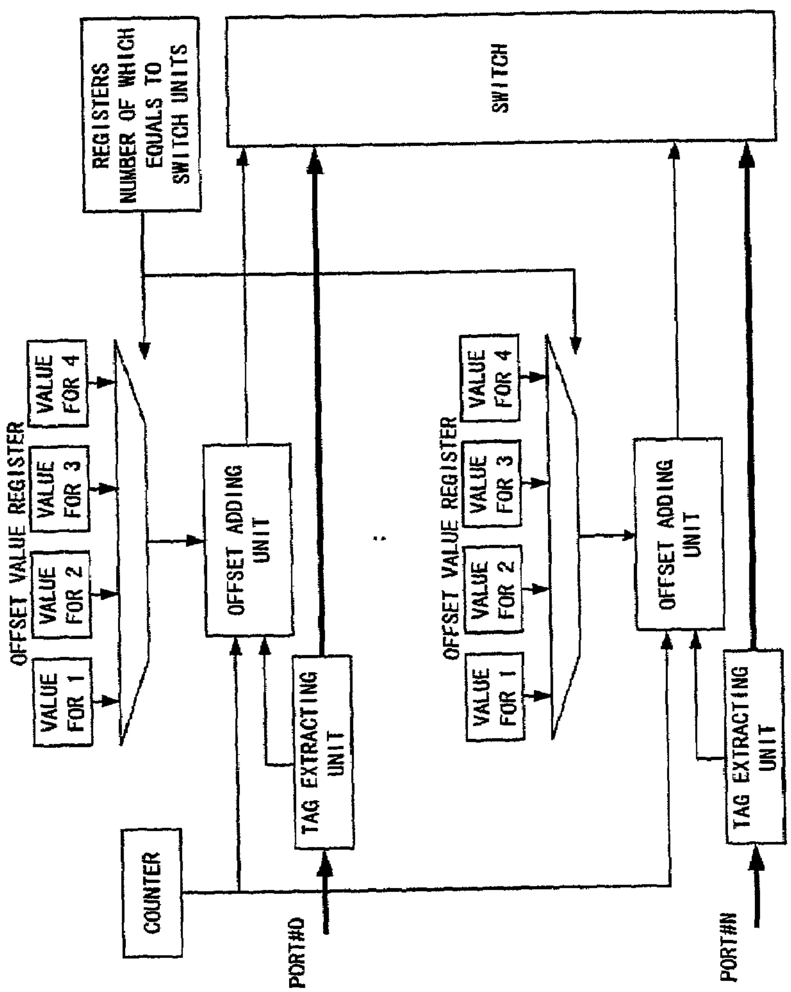
FIG. 19 exemplifies another configuration of a packet switch according to the preferred embodiment of the present invention.

FIG. 19 exemplifies another configuration of the packet switch device according to the preferred embodiment of the present invention.

If the number of XB-SW units to be arranged within a packet switch device is changed, it is necessary to change the registers for an offset addition and a selector selection, which are shown in FIGS. 10 and 11. These registers exist for each port. Therefore, if settings are manually made each time the number of XB-SW units to be arranged is changed, many changes must be made and a lot of time is required for a large-scale switch. This leads to a long buffer suspension time and a degradation of quality. To avoid this problem, registers the number of which equals the XB-SW units within the system are prepared. A setting value according to the number of XB-SW units to be arranged is preset in each register. A corresponding register is referenced according to the number of XB-SW units to be arranged, thereby reducing a register setting quantity when XB-SW units are arranged, and shortening a buffer suspension time. Because the register values provided to offset adding units and selectors are changed by setting the registers the number of which equals that of XS-SW units to be arranged, many register values can be changed with a simple process.

Figure 20:
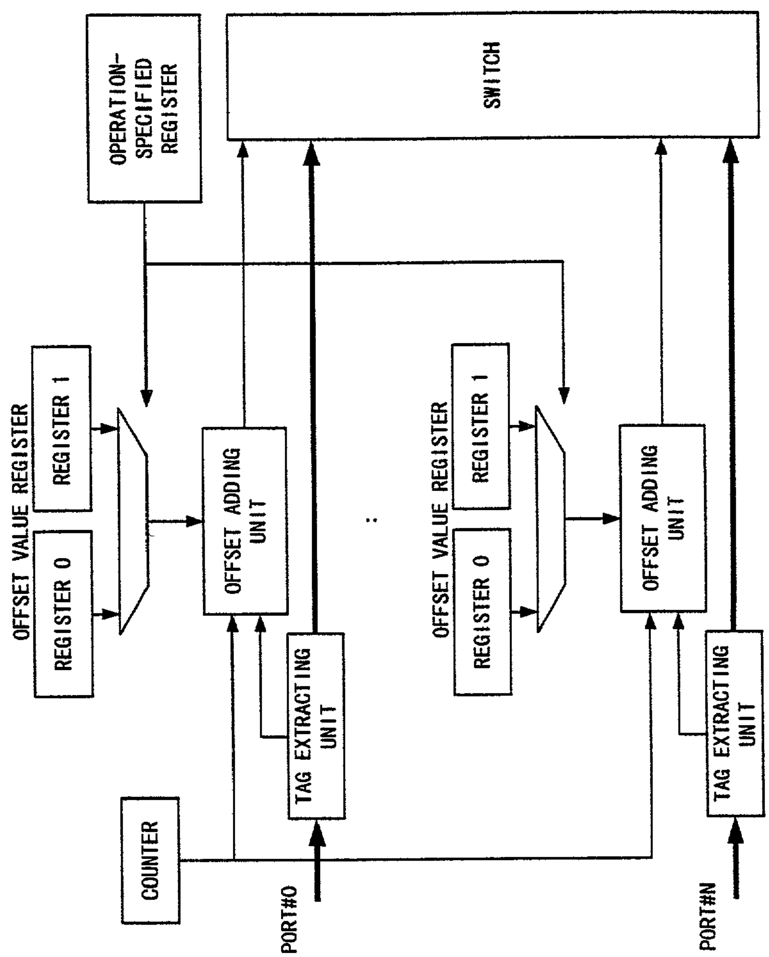
FIG. 20 shows the modification of the configuration exemplified in FIG. 19.

FIG. 20 shows a modification of the configuration exemplified in FIG. 19.

If the number of XB-SWs arranged within the system is large, there is a possibility that the number of registers becomes very large, which exerts a considerable influence on hardware scale. To avoid this problem, only two registers are prepared. One of the registers is used as a register for an operation, and the other is used as a register for rewrite. After the register for rewrite is changed beforehand when the number of XB-SW units is changed, a buffer read is suspended and the operation mode is switched. In this way, the buffer read suspension time can be shortened with the small-scale hardware. By way of example, if a register 0 is a currently used register, that is, the register for an operation in FIG. 20, a new value is set in a register 1, and the setting value of the operation-specified register is changed to 1 after necessary operations are performed. As a result, the register for an operation becomes a register 1, whereas the register for rewrite becomes a register 0. If a rewrite is further required, a new register value is set in the current register 0 for rewrite, and the value of the operation-specified register is set to 0. As a result, the register 0 becomes a register for an operation, whereas the register 1 becomes a register for rewrite. By alternately using the registers 0 and 1 as described above, the XB-SW unit can be quickly expanded without increasing the hardware scale.

Figure 21:
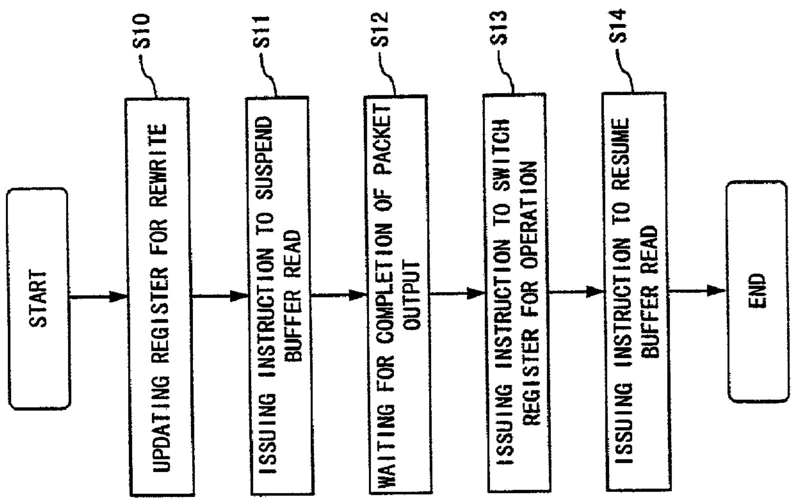
FIG. 21 is a flowchart showing the flow of an expansion process according to the preferred embodiment shown in FIG. 20.

FIG. 21 is a flowchart showing an expansion process in the preferred embodiment shown in FIG. 20.

First of all, in step S10, a register for rewrite is updated. Next, in step S11, an instruction to suspend a buffer read is issued. In step S12, completion of packet output from an XB-SW unit is waited. Then, in step S13, an instruction to switch the register for an operation is issued. In step S14, an instruction to resume an input buffer read is issued.

In this way, it becomes possible to implement a packet switch that can be expanded online.

Figure 22:
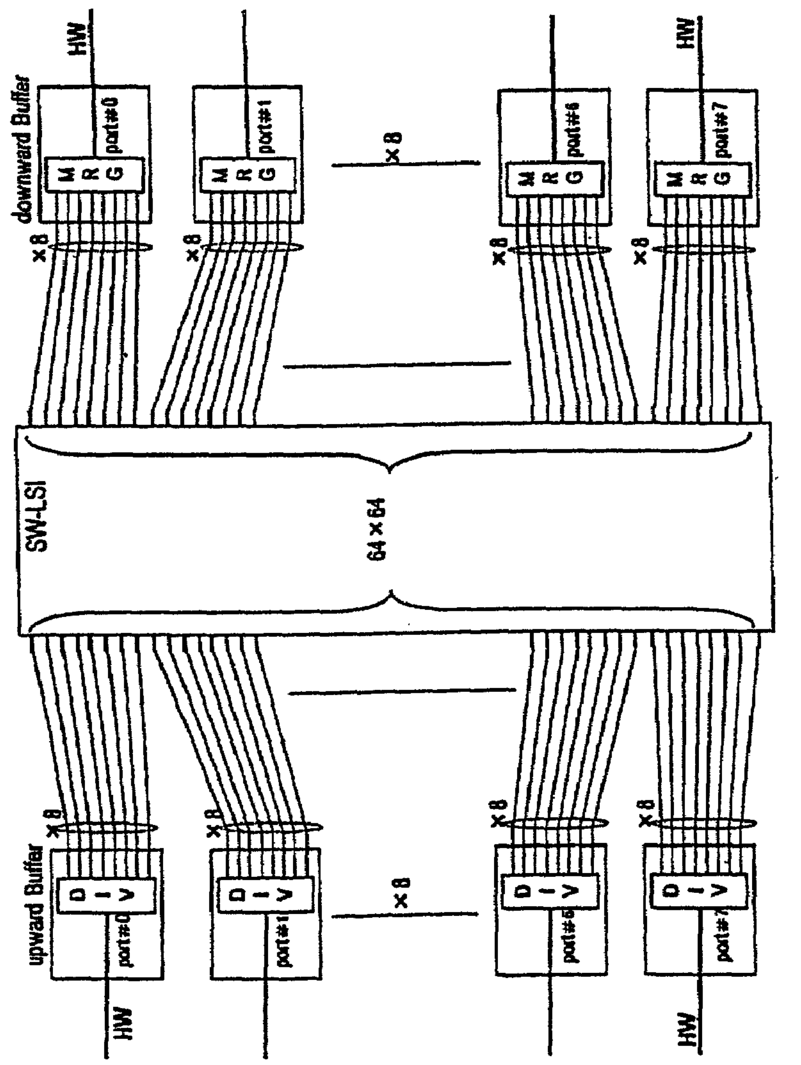
FIG. 22 shows an example when the preferred embodiment according to the present invention is assembled as an actual device.

FIG. 22 shows an example in the case where the preferred embodiment according to the present invention is assembled as an actual device.

In this figure, each HW is connected to each of 8 upward buffers. In each of the upward buffers, a distributing unit (indicated by DIV) is arranged, and each HW is divided into 8 lines by the distributing unit. All of these lines are connected to a switch LSI. For the switch LSI, 64 input and output ports are respectively arranged to accommodate all of the respective 8 lines from the 8 buffers. The switch LSI makes the same switching as that in the above described preferred embodiment. A switched packet is output from an output port of the switch LSI, and input to each of 8 downward buffers. A multiplexing unit (indicated by MRG) is arranged in each of the downward buffers, which multiplexes the packets input from the 8 lines and outputs the multiplexed packet to a HW.

Figure 23:
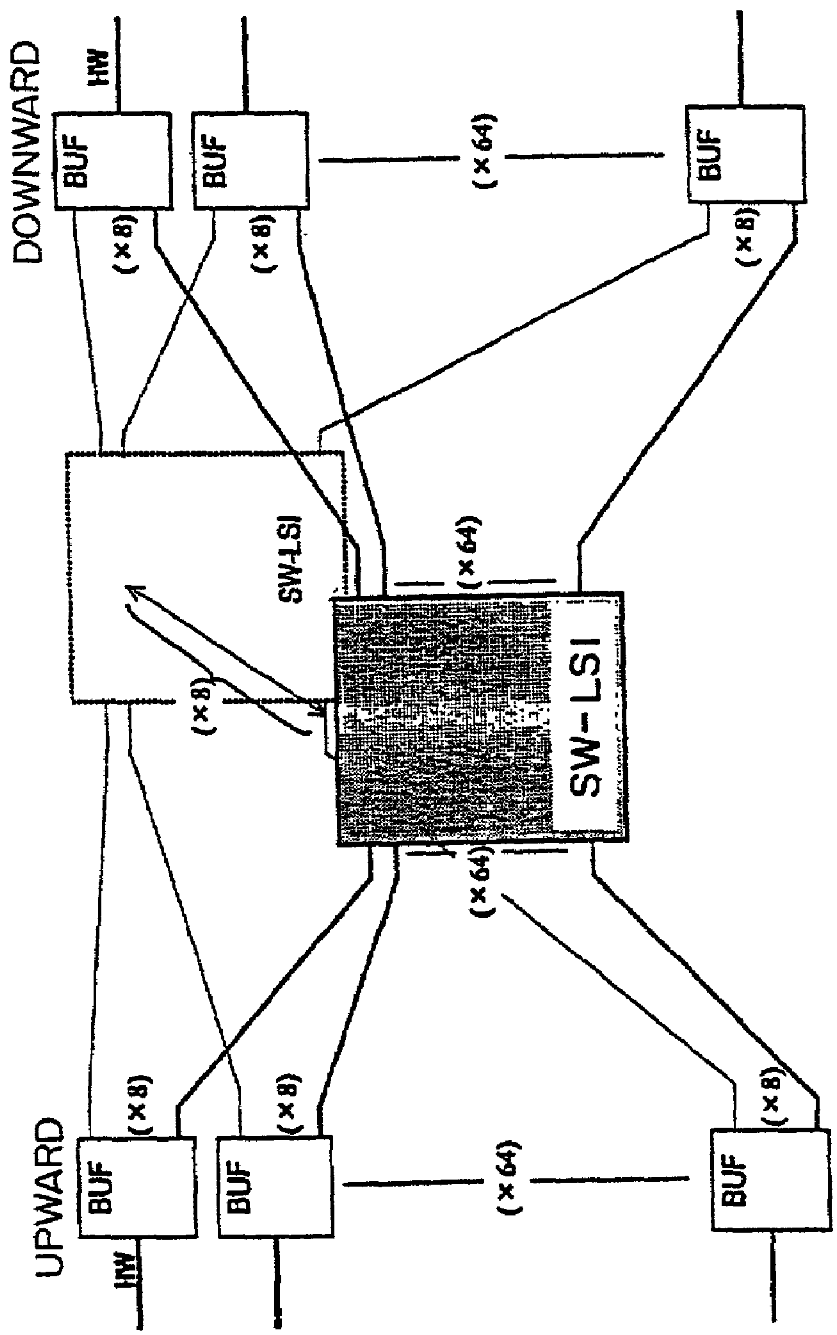
FIG. 23 exemplifies the configuration in the case where a larger-capacity packet switch is configured by arranging 8 switch LSIs shown in FIG. 22.

FIG. 23 exemplifies the configuration in the case where a larger-capacity packet switch is configured by arranging 8 switch LSIs shown in FIG. 22.

In this figure, 8 switch LSIs shown in FIG. 22 are arranged in parallel, and respective 8 lines from the buffers are connected to the respective switch LSIs. As a result, a packet switch the capacity of which is 8 times that of FIG. 22 can be configured. A packet distribution made by each buffer or switching made by each switch LSI is as described above. Because the 8 switch LSIs are arranged in the case shown in FIG. 23, upward and downward buffers the numbers of which are 8×8=64 are arranged. As described above, respective 64 input and output ports are arranged for each LSI, and one line from each upward buffer is connected to an input port of one of the switch LSIs, and one line from an output port of one of the switch LSIs is connected to one downward buffer.

Figure 24:
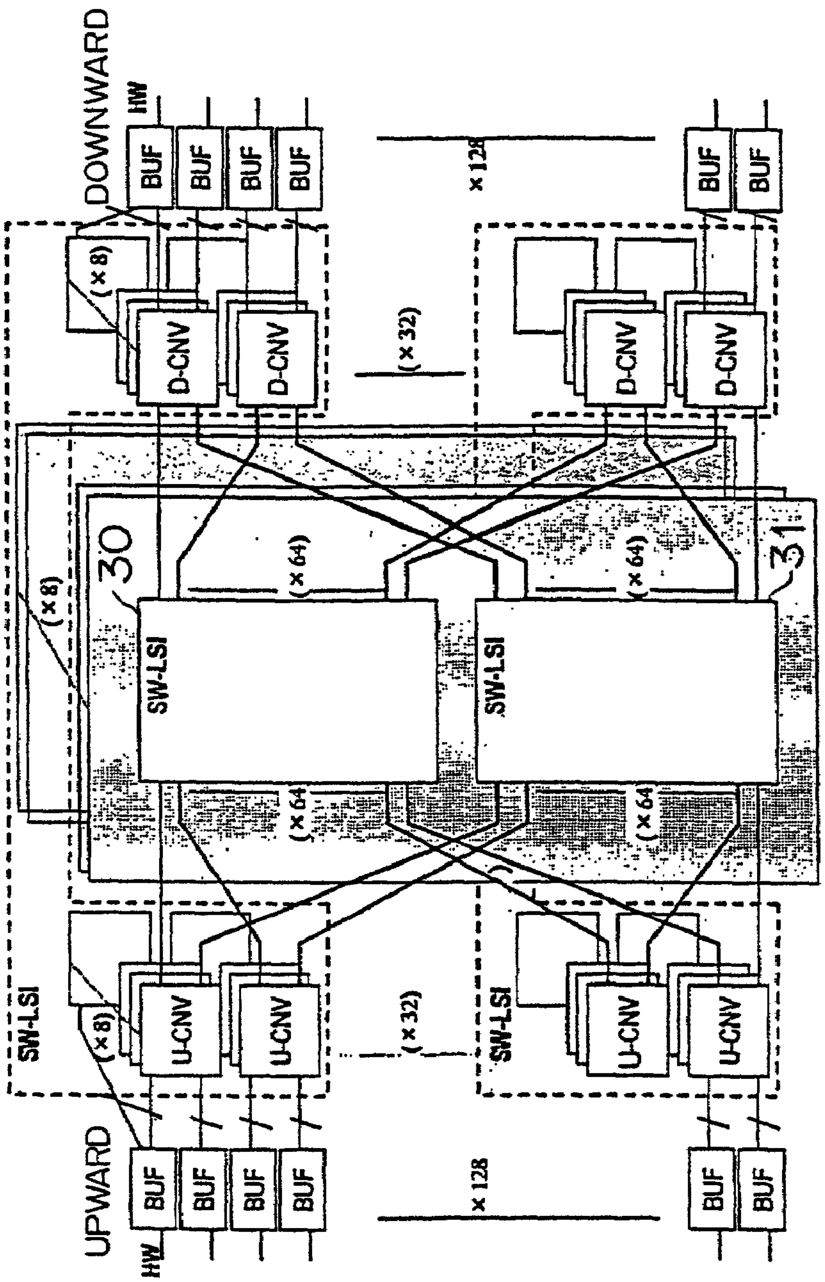
FIG. 24 exemplifies the configuration of a packet switch having a capacity twice that of the packet switch shown in FIG. 23.

FIG. 24 exemplifies the configuration in the case where a packet switch the capacity of which is twice that of the packet switch shown in FIG. 23.

In the case shown in FIG. 24, 128 upward and downward buffers are respectively arranged. These buffers input packets to 8 upward converting units (U-CNVs). The upward converting units alternately switch and connect the input packets according to time slots, and distribute the packets to two routes. As the upward converting units, two sets of 8 upward converting units are paired into one set, and 32 sets are arranged in this configuration. The packets distributed to the two routes by the upward converting units are distributed to an upward switch LSI 30 and a downward switch LSI 31. As a switch LSI, the upward switch LSI 130 and the downward switch LSI 131 are paired, and 8 pairs are set in this configuration.

Each of downward converting units (D-CNVs) has a configuration similar to that of the upward converting unit. Packets output from the switch LSIs are switched and connected by the downward converting units, multiplexed by downward buffers, and output to output HWs.

Figure 25:
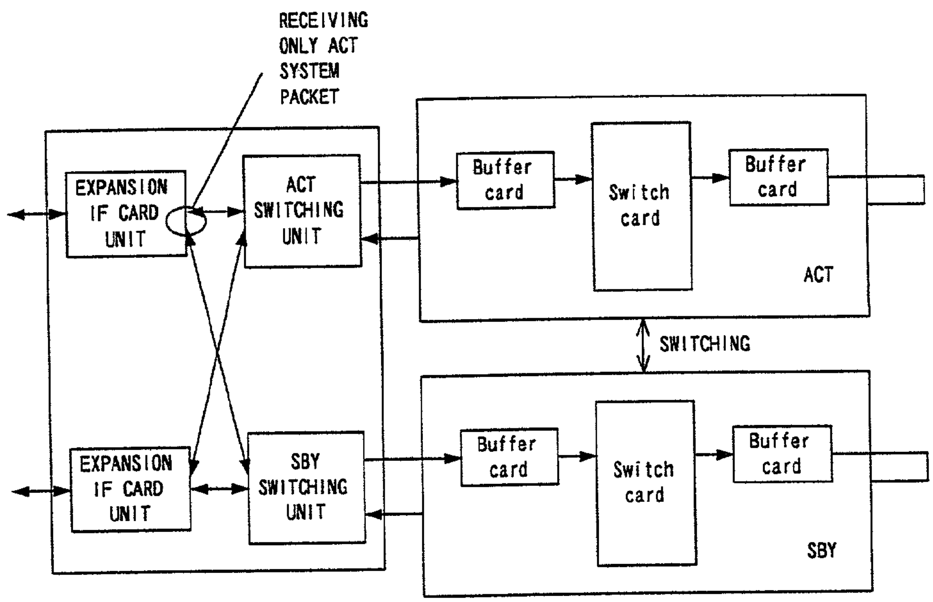
FIG. 25 explains a duplex of a switch system.

FIG. 25 explains the duplex of a switch system.

In the duplexed configuration shown in FIG. 25, a buffer unit and a switch unit within the configurations shown in FIGS. 22 through 24 are collectively used as a unit of switching. For this unit of switching, two systems such as a currently used system (ACT system) and a standby system (SBY system) are arranged. Packets input to expansion IF card units that are respectively arranged for the currently used and standby systems are copied and input to switching units of the currently used and standby systems. After the packets are switched by buffer and switch units of the currently used and standby systems, they are again input to the switching units of the currently used system and the standby system. The switching units of both of the currently used and standby systems copy the received packets, and transmit the copied packets to the two expansion IF card units. Here, the expansion IF card units select and input only the packets input from the currently used system, and discard the packets from the standby system. Then, only the packets switched by the currently used system are output from the expansion IF card units. Note that the switching units shown in FIG. 25 are arranged to switch between the currently used and standby systems.

FIG. 26 explains the duplexed configuration of a buffer unit.

A packet input to an expansion IF card unit is copied by switching units of currently used (ACT) and standby (SBY) systems. The copied packet is then input to buffer cards of the currently used and standby systems. Here, a means for determining whether a packet is either of a currently used or a standby system packet is arranged in the expansion IF card unit or the buffer unit, so that a packet is prevented from being input to the switching unit via the buffer card of the standby system. In this case, the exit of the buffer card of the standby system may be merely closed.

In this way, a packet is input to the switch unit. After the switch unit switches the packet, it copies the packet to generate two identical packets, which are respectively input to the buffer cards of the currently used and standby systems. Packets output from the buffer cards of the currently used and standby systems are respectively input to the switching units within the expansion IF card units of the currently used and standby systems, and only the packet transmitted from the buffer card of the currently used system is output.

Figure 27:
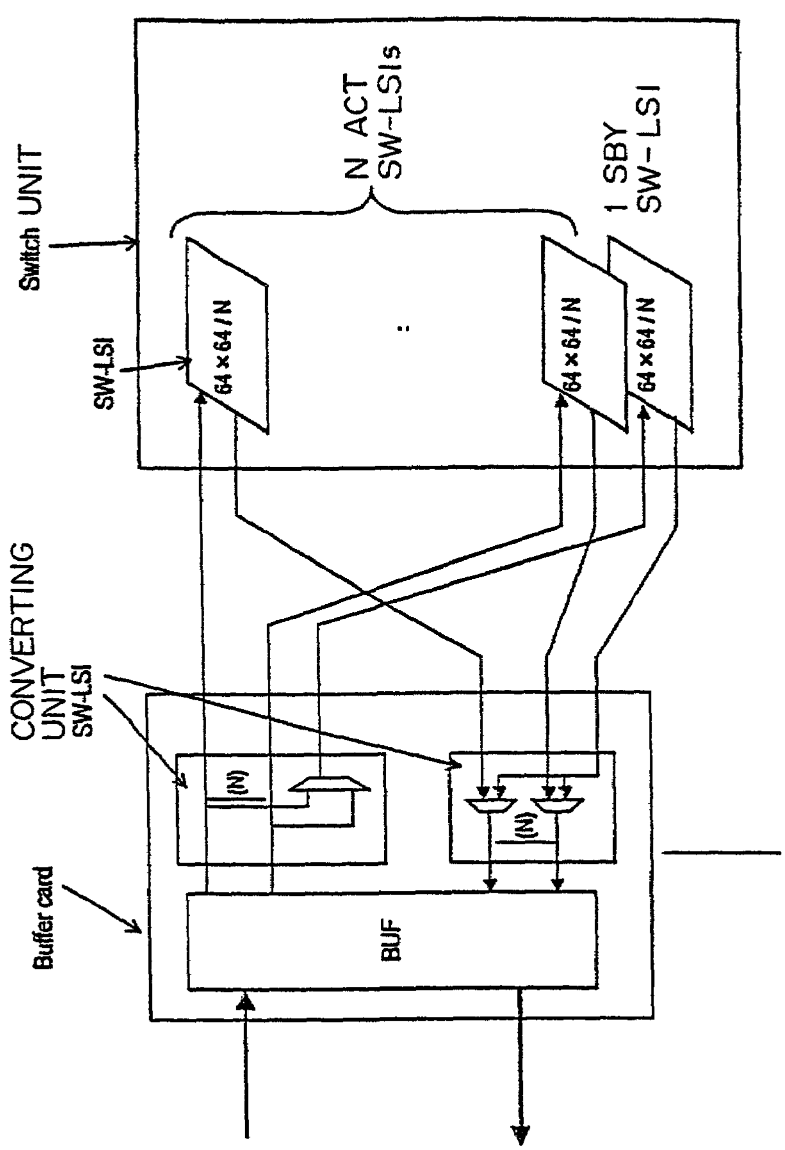
FIG. 27 exemplifies an N+1-plex configuration of the switch unit.

FIG. 27 exemplifies an N+1-plex configuration of a switch unit.

In the configuration shown in this figure, N 64×64 switch LSIs are prepared as switch LSIs of a currently used (ACT) system, whereas one 64×64 switch LSI is prepared as a switch LSI of a standby (SBY) system. Within a buffer card, switch LSIs that act as converting units are arranged in addition to a buffer. The switch LSI which inputs a packet to the switch unit is configured in a way such that a packet input to the switch LSI of the currently used system can be input to the switch LSI of the standby system by being switched. In the meantime, the switch LSI which receives a packet from the switch unit and acts as the converting unit which inputs the packet to the buffer is configured in a way such that packets from the N switch LSIs of the currently used system are received, and also packets from the switch LSI of the standby system can be output by being switched.

Figure 28:
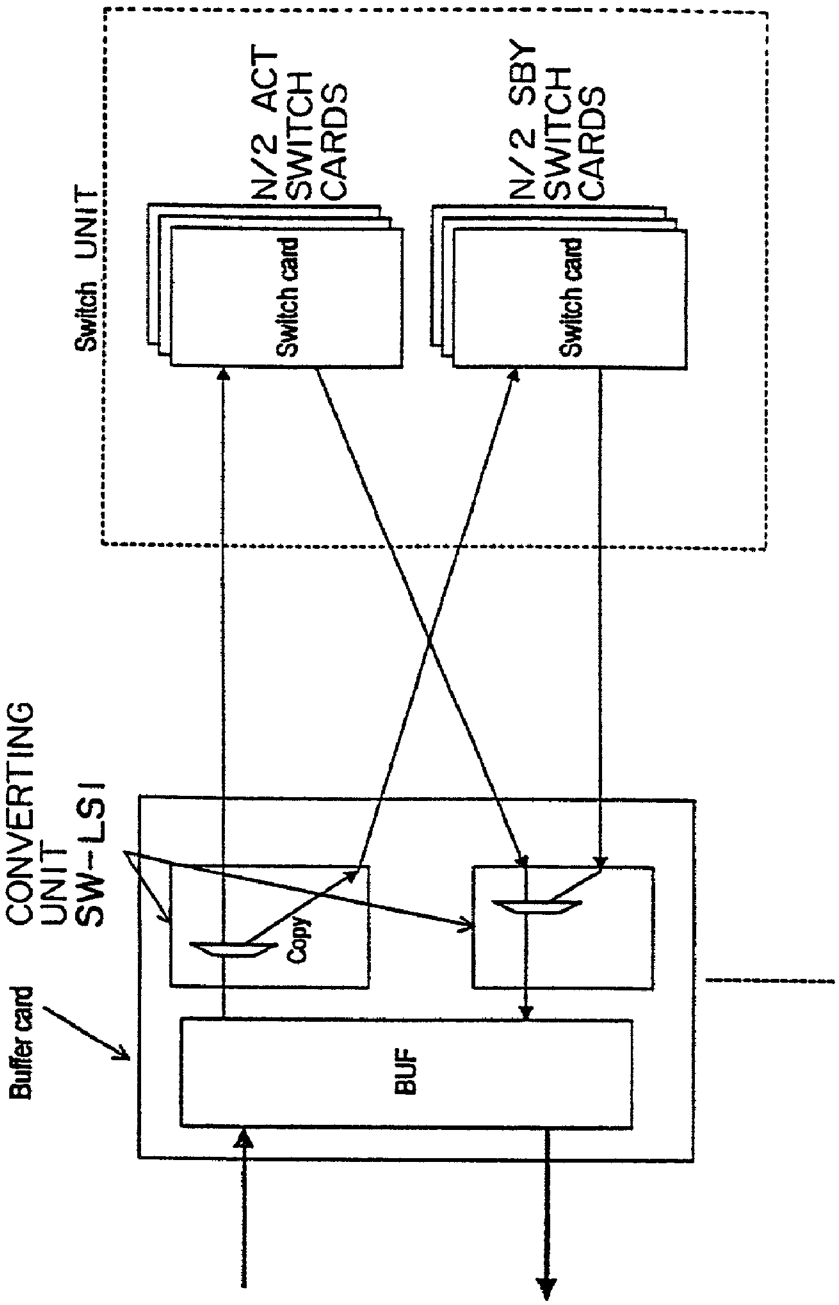
FIG. 28 exemplifies the duplexed configuration of the switch unit.

FIG. 28 exemplifies the duplexed configuration of the switch unit.

In the configuration shown in FIG. 28, two sets of switch cards whose numbers are the same and which have the same configuration are arranged as actually used and standby systems. Within a buffer card, a switch LSI acting as a converting unit copies a packet, and input to switch card groups of the currently used and standby systems. After a switch LSI, which receives the packet after being switched and acts as a converting unit, receives the packets from both of the systems, it transfers only the packet from the currently used system and discards the packet from the standby system. The packet transferred from the switch card group of the currently used system is transmitted via the buffer.

Figure 29:
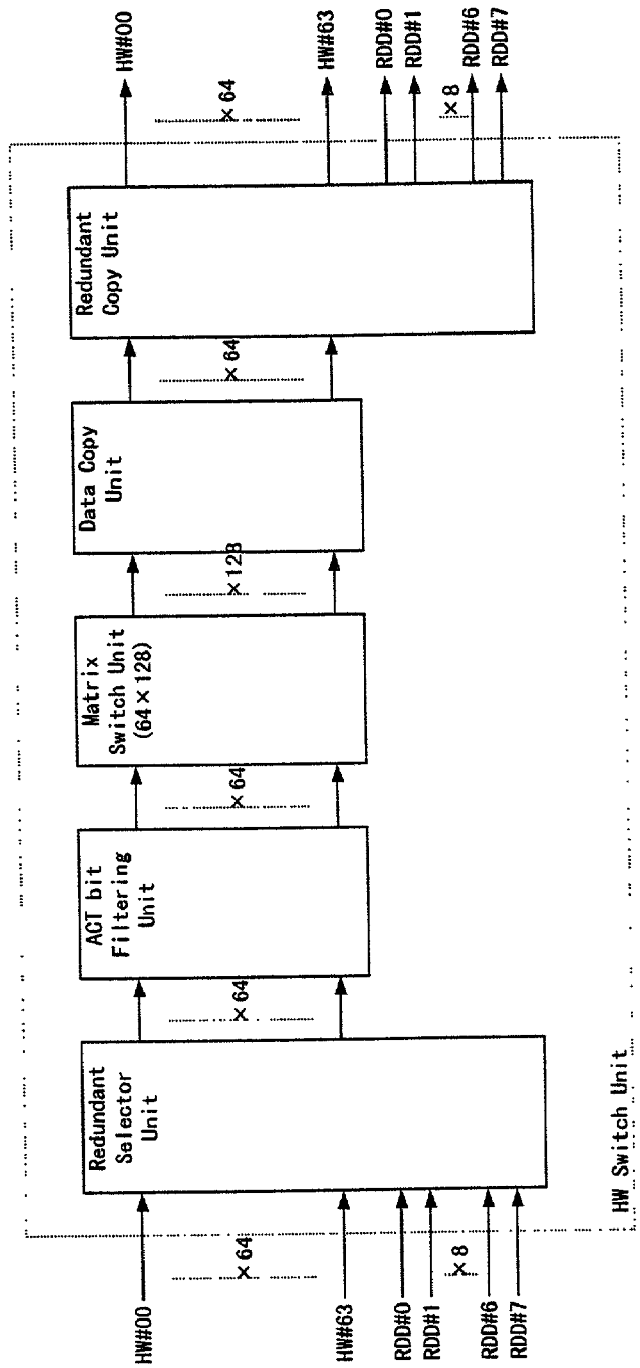
FIG. 29 is a block diagram showing the configuration of a circuit implementing both of an XB-SW unit and a converting unit.

FIG. 29 is a block diagram showing the configuration of a circuit implementing both of the XB-SW unit and the converting unit.

A redundant selector unit shown in this figure is a block making the switching between the currently used and standby systems of the N+1-plex configuration, and has a configuration such that data received from a redundant input (RDD) is switched to an output of the currently used system depending on need. An ACT bit filtering unit determines whether or not 1 indicating a currently used data packet is set in the ACT bit field of the input data packet. This unit discards the data packet if 1 is not set. A matrix switch unit has the following capabilities.

- Data packet switching capability: Having a mode in which switching is made based on a tag attached to a packet, and a mode in which switching is made based on the position of a time slot.
- Input line number assigning (tag value converting) capability: Extracting destination (output line) information from the tag value attached to a packet, and rewriting the value to an input line number.
- Offset value adding capability: Adding a preset offset value to fundamental switching information (destination information or a select signal counter value (see FIGS. 10 and 11)), and generating final switching information. The capabilities of the XB-SW unit and the converting unit are implemented with offset value settings.
- Input port snooping capability (SNIP capability) Copying data of a specified input line for a test output line.

A data copy unit is a block having a capability for generating copies of an input packet, and for outputting input data to a plurality of HWs according to settings. Especially, this unit can be used to support an APS (Automatic Protection Switching) capability. Furthermore, this unit provides an SNOP capability (output port snooping capability) for suspending a packet output for multiplexing of two lines and for each output port, or for copying data of a specified output line for a test output line. A redundant copy unit provides a capability for switching between the currently used and standby systems of the N+1 redundant configuration. Namely, one line is selected from the input data of the currently used system, and the data is output to a redundant output (RDD).

Figure 30:
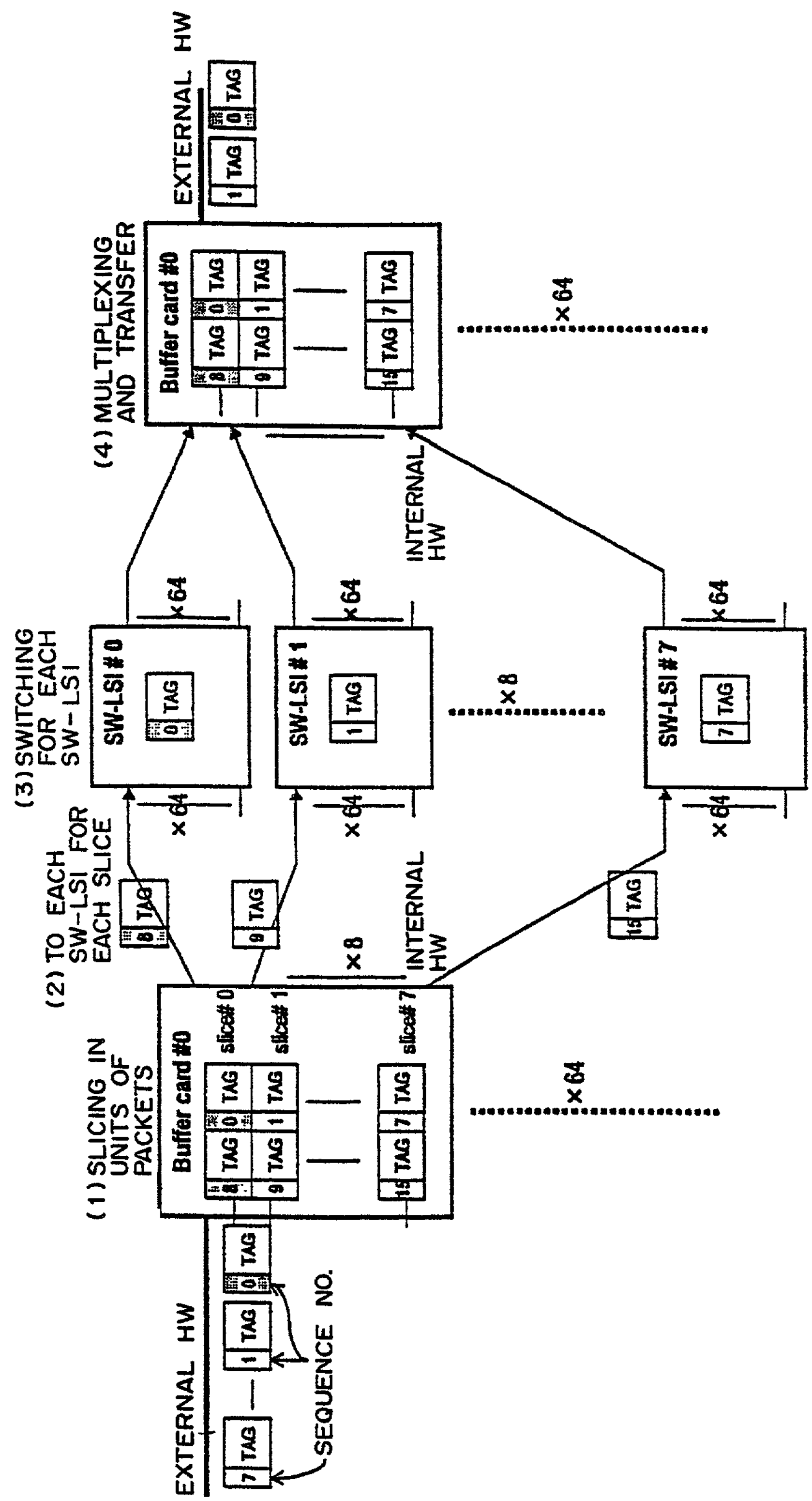
FIG. 30 explains a switching method according to the preferred embodiment of the present invention.

FIG. 30 explains the switching method according to the preferred embodiment of the present invention.

First of all, packets input from an external HW to a buffer card #0 (64 buffer cards are used in all) are sliced (divided) into 8 rows in an arrival order (1). In the case shown in FIG. 30, packets having sequence numbers 0 and 8 are sliced as a slice #0, and packets having sequence numbers 1 and 9 are sliced as a slice #1. Similarly, the packets are sliced as up to a slice #7. Next, the respectively sliced packet rows are transferred to different switch LSIs (2). Next, the switch LSIs switch the packets rows in a normal manner, and transfer them to buffer cards at destination HWs (3). Then, the buffer cards on the output side multiplex the 8 slice packet rows, and transmit the multiplexed packets. (4).

Figure 31:
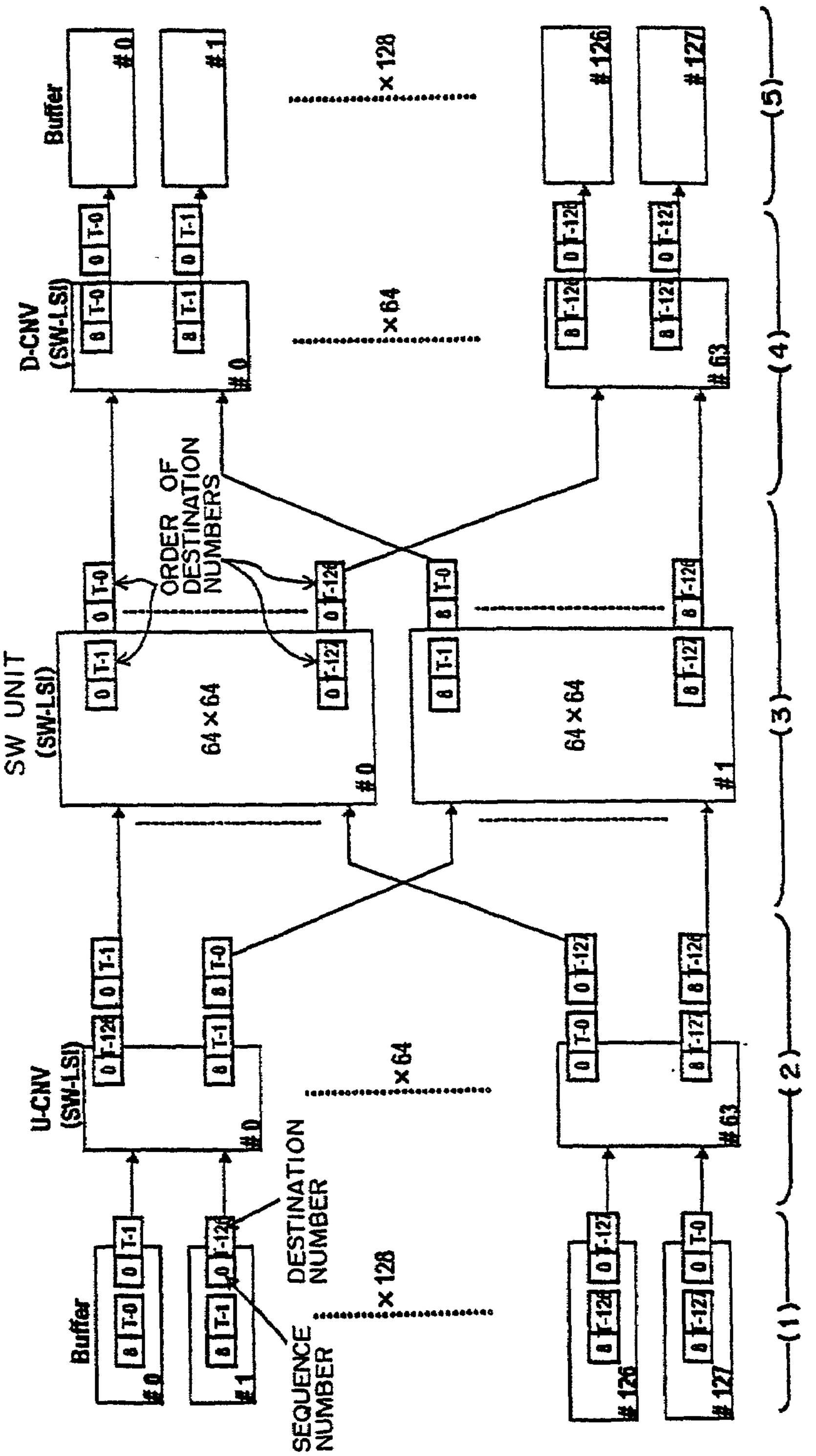
FIG. 31 explains the operations corresponding to the configuration shown in FIG. 24.

FIG. 31 explains the operations corresponding to the configuration shown in FIG. 24.

This figure shows only one of the 8 slices.

First of all, input data are packet-sliced by buffer units, and respective sliced data are transferred to different upward converting units (U-CNVs) (1). Next, each of the U-CNVs distributes the packets to output routes according to time slots. Namely, an earlier arrived packet (the sequence number of which is 0) is transferred to a switch LSI #0, and a later arrived packet (the sequence number of which is 8) is transferred to a switch LSI #1 (2). In the switch unit (SW unit), each switch LSI switches the packet according to its tag. Namely, a packet is transferred from an output route connected to a downward converting unit (D-CNV) which accommodates a destination buffer. At this time, a packet having a smaller destination number is transferred earlier (3). D-CNVs distribute the packets on the output routes according to the time slots (a process similar to that in (2)) (4). Then, the 8 sliced data are multiplexed by buffer units on the output side, and transferred in a sequence order (5).

Here, the switch LSIs of the SW unit, the U-CNVs and D-CNVs are the same. However, their operation modes are different. Namely, the SW unit switches a packet according to its tag. In the meantime, the U-CNVs and the D-CNVs distribute two inputs to two routes according to time slots, and do not reference tag values.

Figure 32:
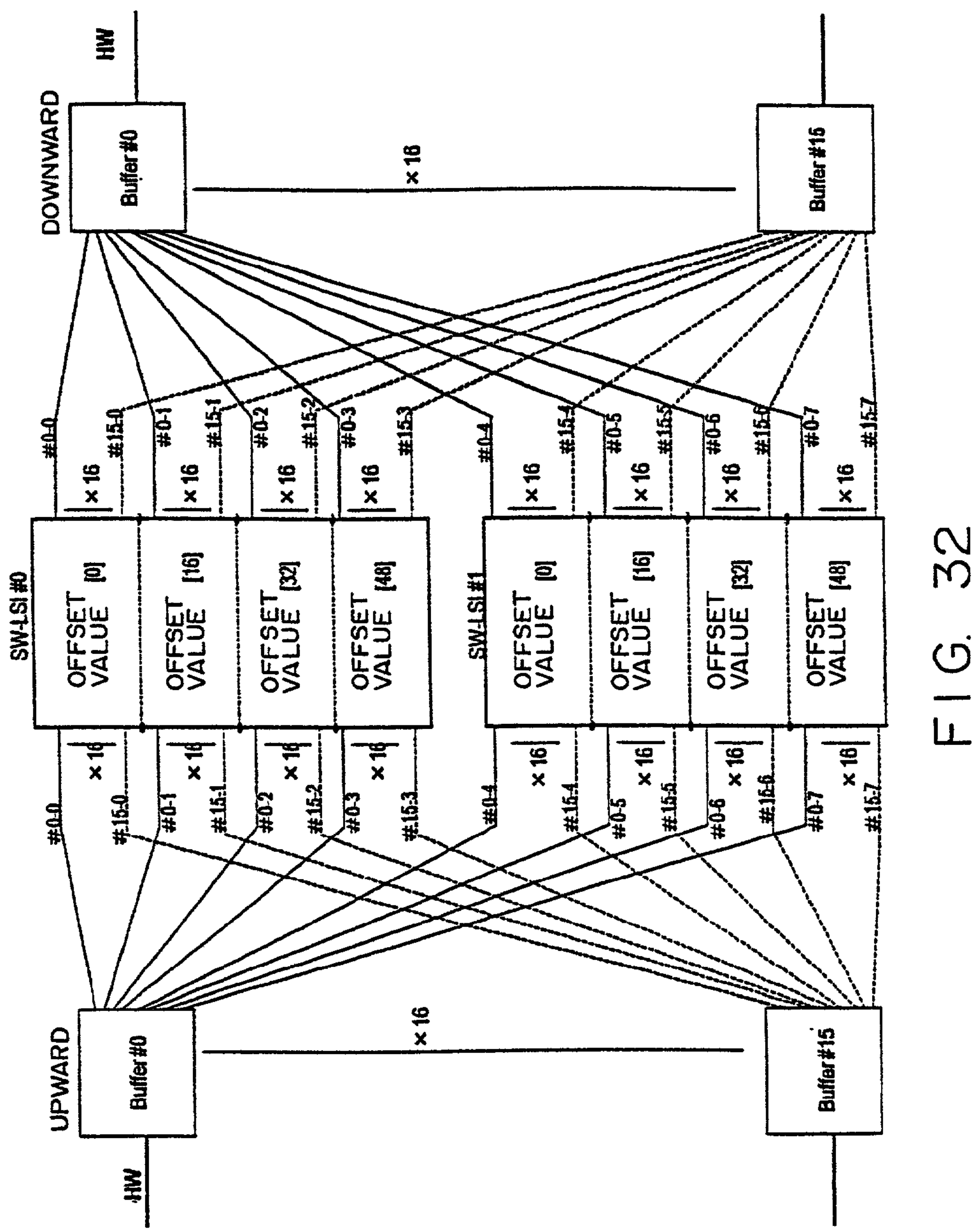
FIG. 32 explains switching division setting.

FIG. 32 explains the case where a switch is dividedly set.

A switch LSI acts as a plurality of reduced switches into which one LSI is logically divided in order to effectively use the resource of the LSI, when being configured as reduced switches (accommodating a small number of HWs). This capability is implemented by setting an offset value in each input port in a matrix switch unit.

In FIG. 32, 16 upward buffers #0 to #15, and 16 downward buffers #0 to #15 are arranged. Additionally, two switch LSIs #0 and #1 are arranged, and each of the LSIs is divided into four. An offset value is set to 0 for ports having numbers #0 through #15, 16 for ports having numbers #16 through #31, 32 for ports having numbers #32 to #47, and 48 for ports having numbers #48 through #63.

By making the above described settings, it becomes possible to respectively divide the switch LSIs #0 and #1 into 4, and to respectively use the divided LSIs as 16×16 switches. Outputs of the divided switches formed by the offset values are respectively input to 16 downward buffers #0 through #15, multiplexed, and transferred.

Figure 33:
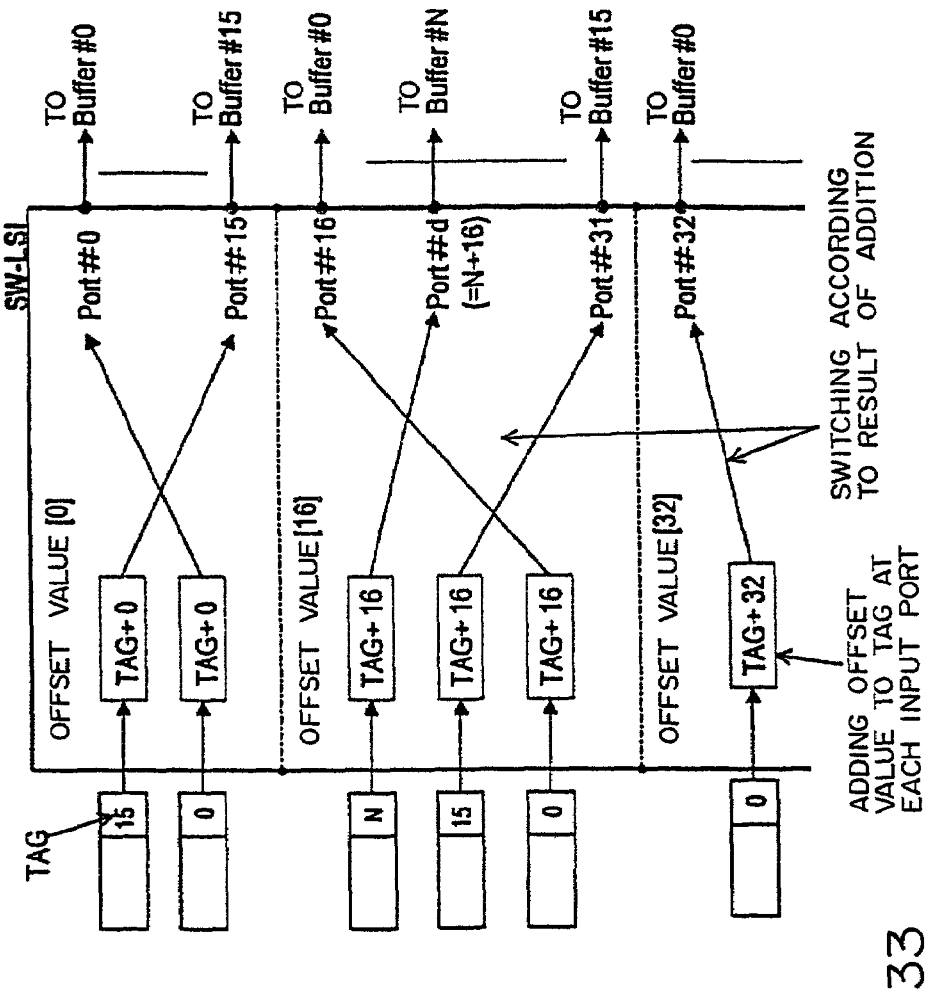
FIG. 33 explains the operations of FIG. 32.

FIG. 33 explains the operations of the configuration shown in FIG. 32.

Each input port adds a preset offset value to the tag value (destination information: fundamental switching information) of the header of an input packet, so that switching is made according to their sum (final switching information). Offset values assigned to the input ports are externally preset in registers.

In FIG. 33, a packet is first input to a divided switch having an offset value 0. For example, if a tag is 15, the packet is transferred to a port #15 as a result of adding 0 to the tag. If the tag is 0, the packet is transferred to a port #0 as a result of adding 0 to the tag. The packet transferred to the port #0 is transferred to a buffer #0. Similarly, the packet transferred to the port #15 is transferred to a buffer #15.

If a packet is input to a divided switch having an offset value 16, it is transferred to a port #16 as a result of adding 16 when the tag is 0. If the tag is 15, the packet is transferred to a port #31 as a result of adding 16 to the tag. If the tag is N, the packet is transferred to a port #(N+16) as a result of adding 16 to the tag. The packets transferred to the ports #16, #31, and #(N+16) are respectively transferred to buffers #0, #15, and #N.

If a packet is switched by a switch LSI, the packet is output to a port having a number to which an offset value is added as described above. The buffer to which the packet is output, however, is the buffer indicated by the original value of the tag.

Figure 34:
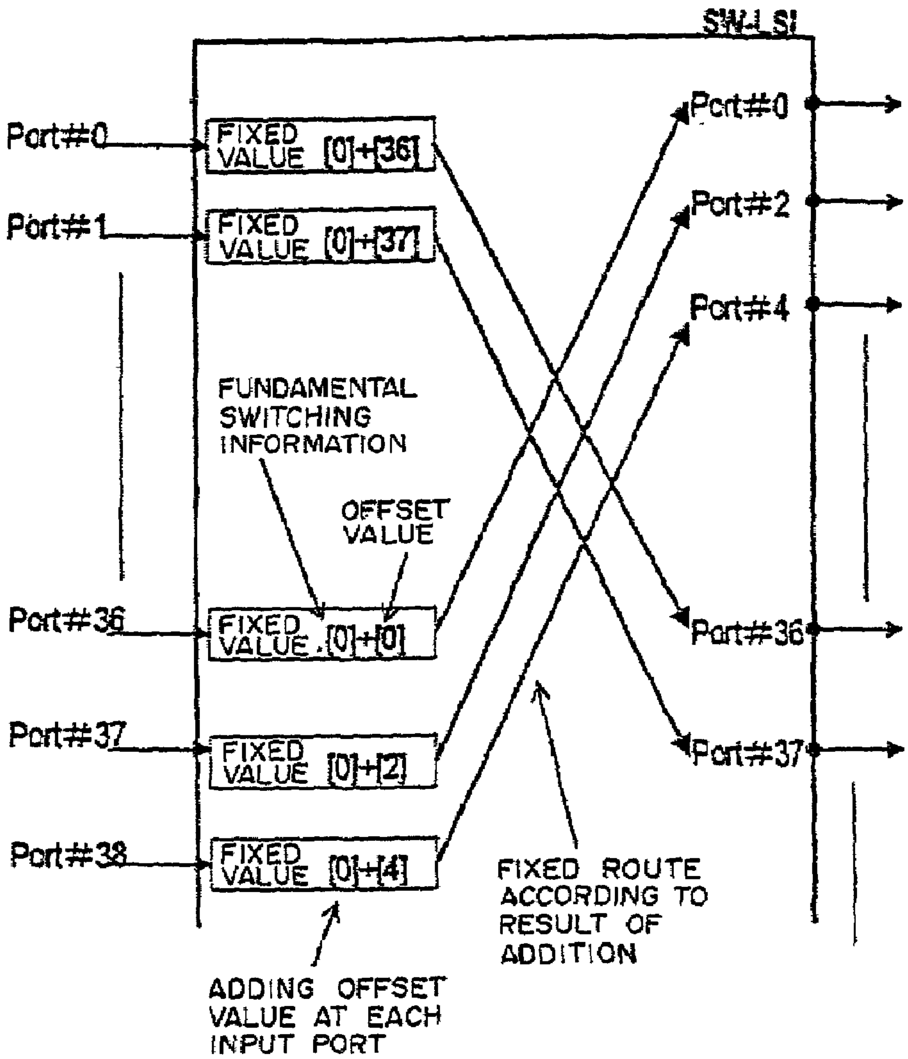
FIG. 34 explains a crossconnect capability of a switch LSI.

FIG. 34 explains a crossconnect capability of a switch LSI.

A switch LSI that is used as a converting unit (U-CNV or D-CNV) when the configuration shown in FIG. 24 is applied makes switching by referencing as fundamental switching information not the value of the destination tag of a packet, but the value according to a time slot, which is given to all of input ports in common. Accordingly, to appropriately distribute packets in time slots, a suitable offset value must be added to the fundamental switching information (set to 0 in this case). Therefore, a different offset value is added to fundamental switching information by each input port, so that a fixed output port is specified. In this way, each input port can possess a different output route.

Namely, the switch LSI used as a U-CNV or a D-CNV does not use the tag of a packet as fundamental switching information, and the fundamental information is set to a fixed value (0 in this figure) for all of the ports, as shown in FIG. 34. Accordingly, an offset value is set to suitably distribute a packet input from each port to an output port. With the setting method shown in FIG. 34, 36 is assigned to a port #0 as an offset value. A packet is therefore switched and connected to a port #36. Similarly, ports #1, #36, #37, and #38 are respectively switched and connected to ports #37, #0, #2, and #4.

FIG. 35 explains the snooping capability.

The SNIP (Snooping of Incoming Port) capability is a capability for copying a data packet input from a specified line, and for outputting the copied packet to a test line. For SNIP target lines, test lines the number of which is equal to that of the SNIP target lines are required. Furthermore, a normal output line is used as a test line. Accordingly, if the SNIP capability is used, a substantial switching capacity decreases.

As shown in FIG. 35, a packet input from an SNIP target line is copied as a normal switching packet and a packet to be unswitched within a switch unit. The packet to be unswitched is transmitted to an SNIP test line. Since the route from the input side to the SNIP test line is fixed, this route cannot be used for switching. Although the switching capacity of the switch unit decreases, this is a necessary configuration for making a test.

With the SNOP (Snooping of Outgoing Port) capability, a data packet output from a specified line is copied and output to a test line. Test lines the number of which is equal to that of SNOP target lines are required. Additionally, a normal output line is used as a test line. Therefore, if the SNOP capability is used, a substantial switching capacity decreases.

As shown in FIG. 35, a packet output to an SNOP target line is copied by the switch unit. One of the two packets is transmitted to the SNOP test line. Accordingly, if a packet is input from the input side, it cannot be output to the SNOP test line, leading to a decrease in a substantial switching capacity. However, this is a necessary configuration for making a test for the switch unit.

Figure 36:
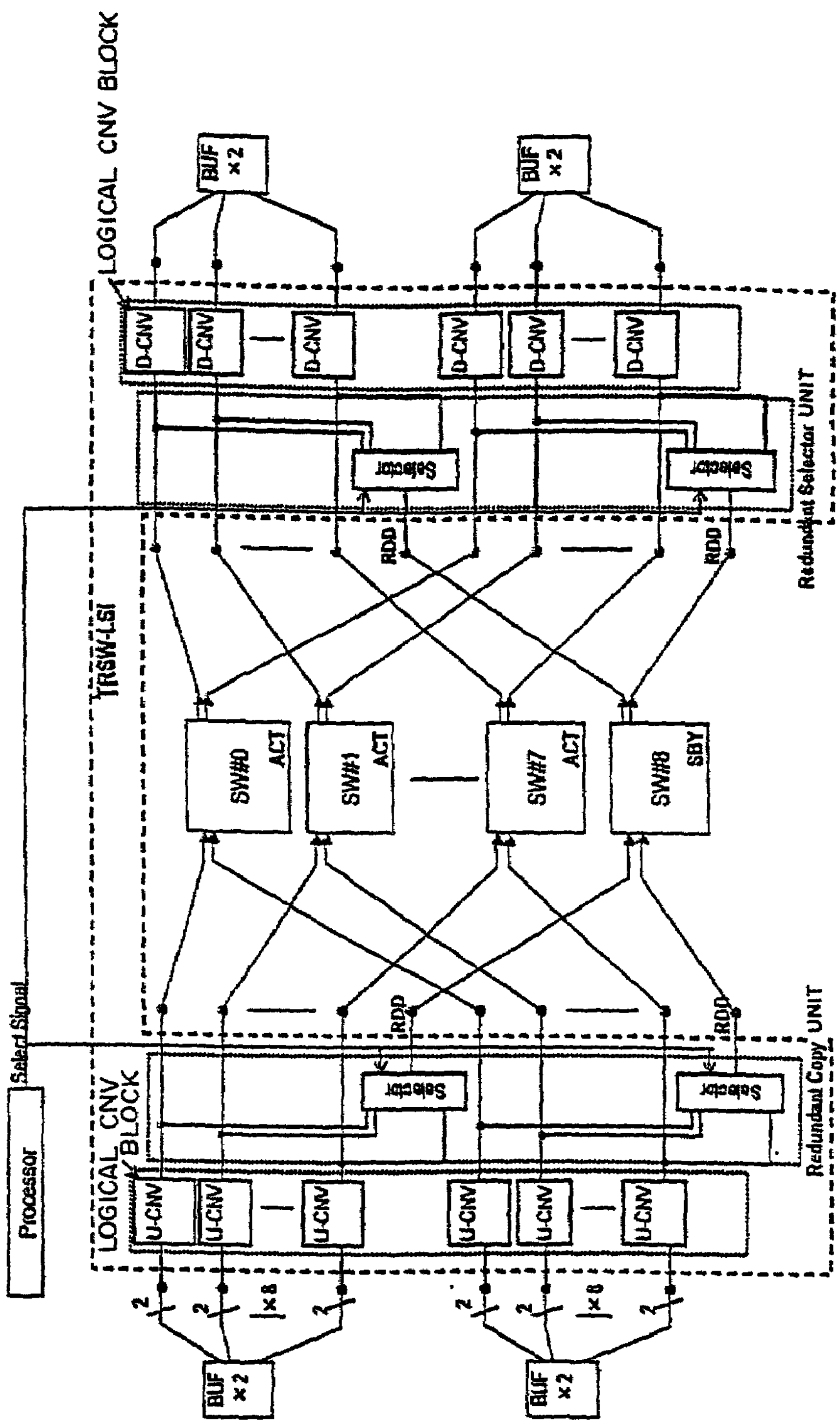
FIG. 36 exemplifies the configuration for providing a capability switching ACT and SBY of the N+1 redundant configuration.

FIG. 36 exemplifies the configuration for providing an N+1 redundant configuration ACT/SBY switching capability.

If the N+1 redundant configuration of a switch card is applied as a system, a capability for switching the data packet flow between the switch and buffer cards from an ACT to an SBY system is required. This switching capability is provided by a switch LSI mounted on the buffer card. As shown in FIG. 36, one selector and RDD input/output interfaces are arranged for 8 U/D-CNVs, and are connected to an SBY system switch. Note that FIG. 36 collectively shows two input/output HWs of each U/D-CNV as one HW. Actually, respective pairs of RDDs and selectors exist.

FIG. 37 explains the procedure for switching the N+1 system shown in FIG. 36.

In this figure, data output from each U-CNV (converting unit) is always copied for a corresponding RDD selector, and the copied data is transferred to the selector. If a fault is detected in a certain switch (SW), a processor that receives a faulty alarm transmits a select signal to each RDD selector. The selector that receives the signal selects the data from the U-CNV connected to the SW in which the fault occurs, and transfers the selected data to an SBY system switch (SW). The data output from the SBY system SW is transmitted from the RDD to the selector, which transfers the data to the output port specified by the select signal from the processor.

Figure 38:
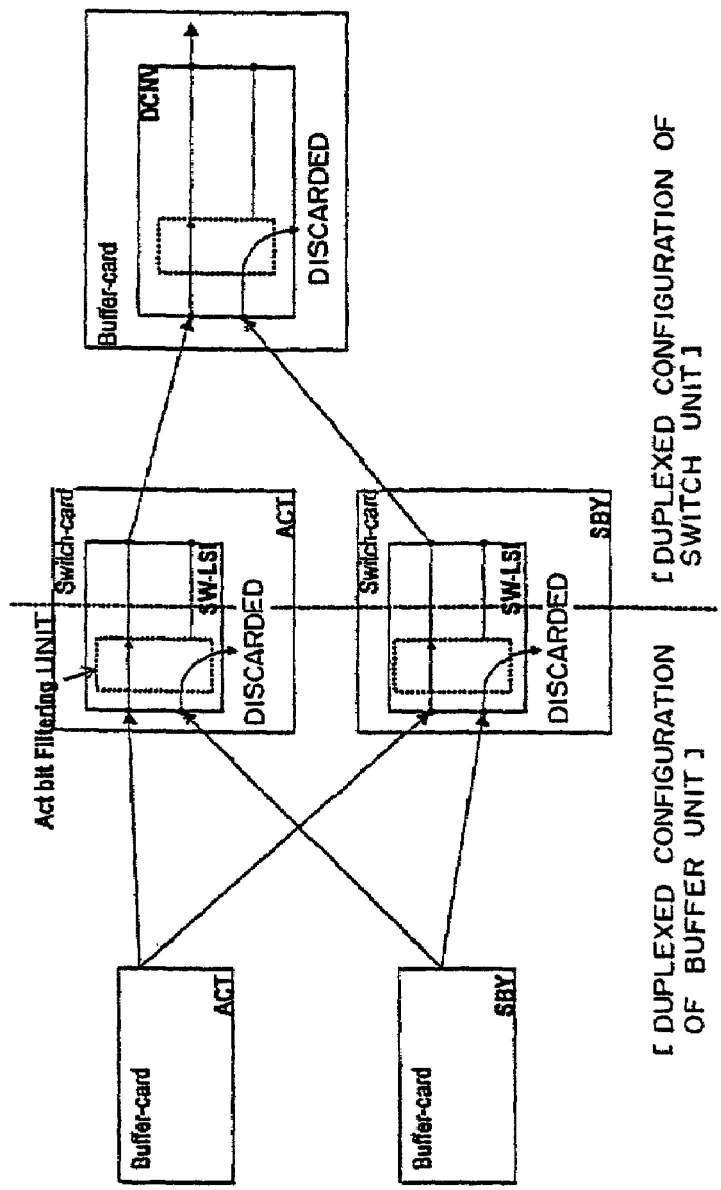
FIG. 38 explains an ACT bit filtering capability.

FIG. 38 explains an ACT bit filtering capability.

If a duplexed switch unit or buffer unit configuration is provided as a system, data input from an SBY system buffer card or switch card must be discarded.

As shown in FIG. 38, ACT bit filtering units of the ACT and SBY systems detect an ACT bit stored in the header of a packet transmitted from an ACT or an SBY system buffer card, and transmit only the packet transmitted from the ACT system buffer card to a buffer card at a succeeding stage, which includes a D-CNV. Furthermore, the buffer card at the succeeding stage, which includes the D-CNV, makes only the packet from the ACT bit filtering unit of the ACT system pass through, and discards the other packets.

Explained next is an SW mode in which a circuit acts as an XB-SW unit in the case where the circuit implementing both of the capabilities of the XB-SW unit and a converting unit is used as a switch LSI.

Figure 39:
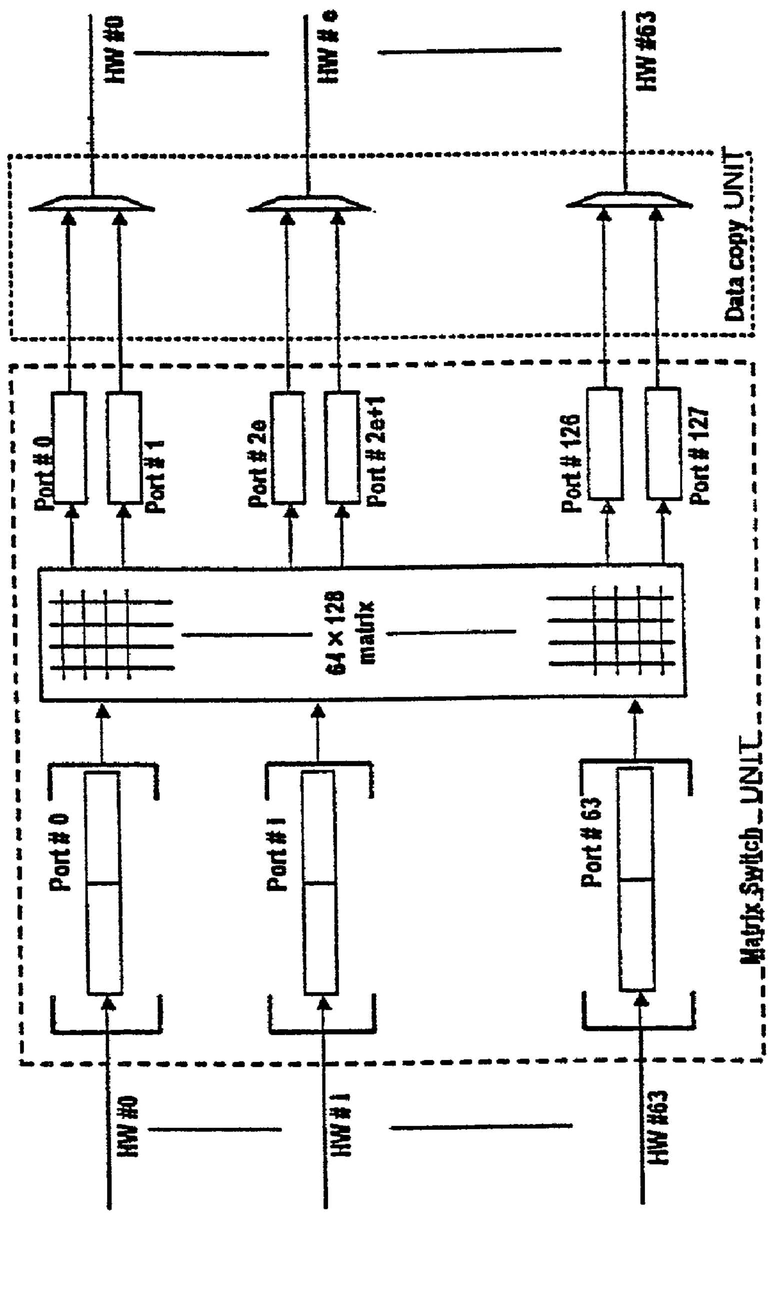
FIG. 39 explains a logical configuration of a matrix switch unit.

FIG. 39 explains the logical configuration of a matrix switch unit.

In this preferred embodiment, a 64×128 matrix switch in which one output HW is separated into two output ports so as to process two packets simultaneously. Input ports transfer packets to the 64×128 matrix switch in an arrival order. This transfer is a process conscious of a 2-packet unit based on a synchronization frame. This is because 128 destinations attached to the tag of an input packet do not overlap in the 2-packet unit. Notice that 2-to-1 selectors within a data copy unit multiplex the output ports. Furthermore, to support a frame assembly capability in a buffer unit, an input line number is assigned to a tag after a destination is extracted from the tag value.

Namely, in FIG. 39, two packets input from HWs #0, #1, and #63 are switched and connected by the 64×128 matrix switch, and respectively output to ports #0, #1, #2*e*, #2*e*+1, #126, and #127. Packets to be output to an output HW #0 are respectively output from the ports #0 and #1, multiplexed by the data copy unit, and output to the HW #0. Similarly, packets output from the ports #2*e* and #2*e*+1 are multiplexed by the data copy unit, and output to an HW #e. Packets output from the ports #126 and #127 are multiplexed by the data copy unit, and output to the HW #63.

Figure 40:
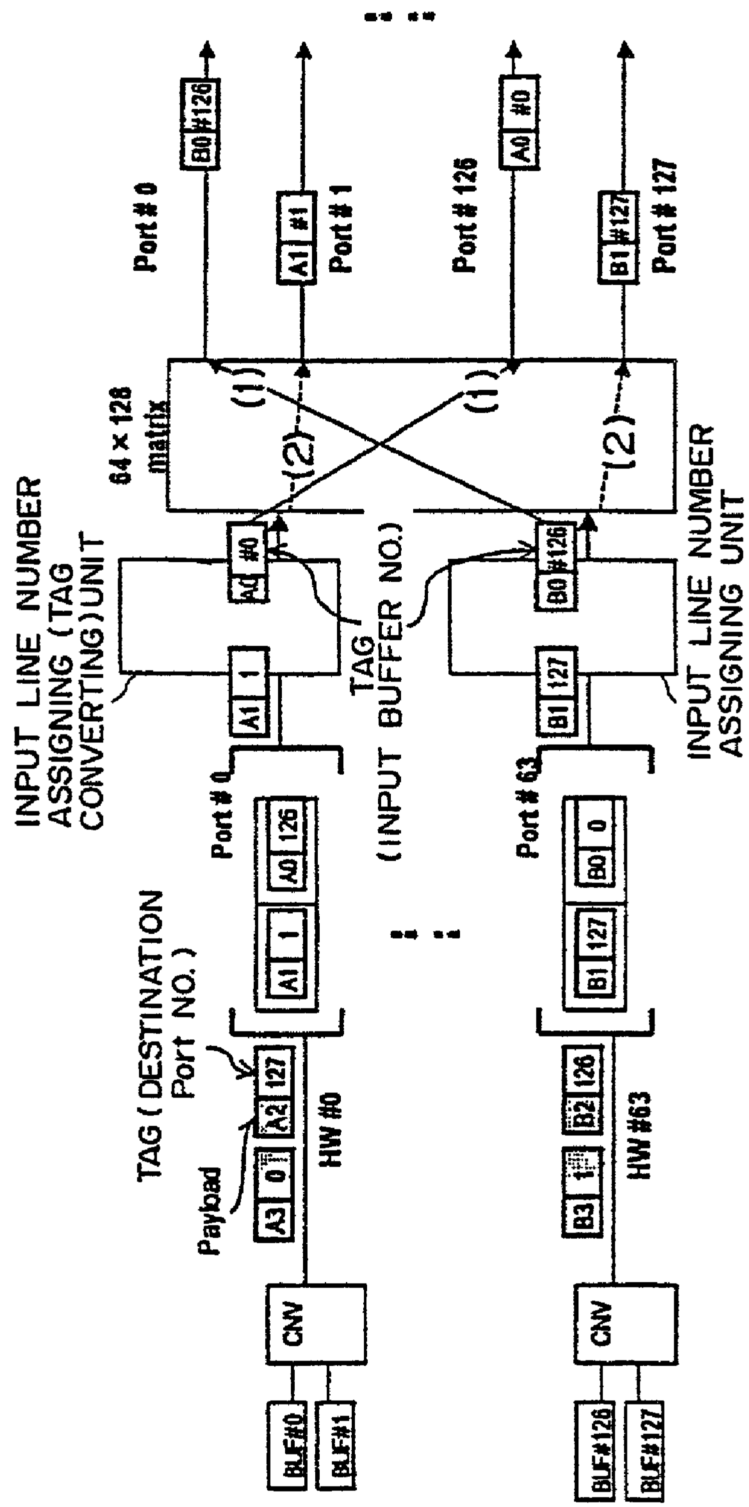
FIG. 40 explains the data flow of the matrix switch unit shown in FIG. 39.

FIG. 40 explains the data flow of the matrix switch unit shown in FIG. 39.

First of all, each input port switches an arrived packet according to its tag, and outputs the packet to a corresponding output port. At this time, the internal matrix state is determined by referencing the value of the extracted tag (destination port number), and an input line number is assigned to the self-switching tag (tag is converted). Here, after the destination port number is extracted from the tag value, the tag is rewritten to the input line number. Since two lines are multiplexed for one HW, two line numbers are alternately assigned based on a synchronization frame ((1) and (2)) FIG. 41 shows the circuit configuration of the matrix switch unit.

In this figure, a tag extracting block extracts a tag (destination information) of an input data packet. The destination information is transferred as fundamental switching information to an offset adding unit via an SW/CNV-mode selector (which switches whether a switch LSI having the same configuration is used either as a matrix switch or as a converting unit) Additionally, Enable information of the tag value is transferred in units of 1 bit at the same time.

An HW multiplexing setting register is externally set to determine whether or not an HW multiplexing method is applied (whether two packets are multiplexed for one HW). The value set in this register is referenced by a selector signal counter and a 2-to-1 selector of the data copy unit, and their operations are defined.

Figure 41:
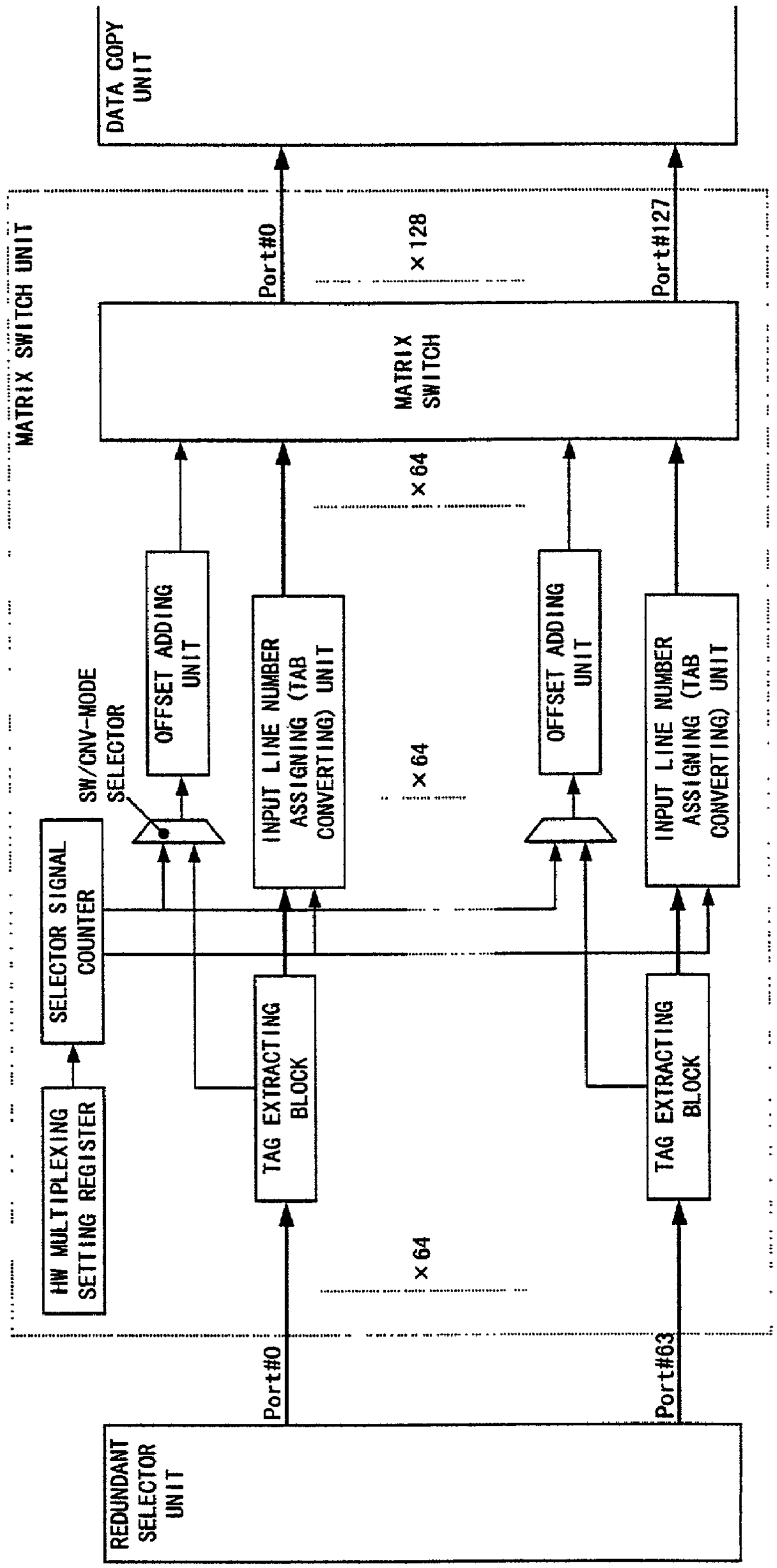
FIG. 41 shows the circuit configuration of the matrix switch unit.

FIG. 42 explains the selector signal counter shown in FIG. 41.

The selector signal counter provides an operation signal for the input line number assigning (tag converting) unit.

As shown in FIG. 42, an internal counter (1 bit) operates as follows by referencing the HW multiplexing setting register.

HW multiplexing is specified: Performs a count operation (High [1] and Low[0] are repeated)

HW multiplexing is not specified: Suspends the count operation (always Low[0])

This count operation is driven to High based on a frame pulse, and synchronizes a packet processing clock within a switch LSI.

The output of the selector signal counter falls into two types.

The value of the internal counter is output as a selector signal counter output unchanged. This value is input to an input line number assigning (tag converting) unit.

A count value is converted into High [16] or Low [0] by a count value converting unit shown in FIG. 42. 1-bit Enable information (Enable bit) is attached to the converted value, and the value is output. This value is input to the SW/CNV mode selector as the fundamental switching information.

The SW/CNV mode selector shown in FIG. 41 references the fundamental switching information. The SW/CNV mode selector makes the matrix switch execute the capability as the above described crossconnect capability in the CNV mode, or selects the tag extracting block and makes the matrix switch perform switching according to the destination tag information in the SW mode.

FIG. 43 explains the offset adding unit shown in FIG. 41. The offset adding unit generates final switching information by adding a preset offset value to fundamental switching information, and transfers the generated information to the matrix switch. The offset adding unit implements the following capabilities.

Switch division capability: SW mode (in which a matrix switch including a switch LSI is made to perform switching based on tag information)

Crossconnect capability: CNV mode (in which a switch LSI is made to act as a converting unit).

In an offset setting register within the offset adding unit, 7-bit code [0–127] is externally preset. Its default value is [0] . An adder transfers to the matrix switch the value obtained by adding the value of the offset setting register to the fundamental switching information received from the SW/CNV mode selector as switching information.

FIG. 44 explains the input line number assigning unit shown in FIG. 41.

The input line assigning unit writes a transmission source (input) line number to the tag field of all of input packets.

A tag converter receives the following two signals.

A data packet from the tag extracting block: (1)

The (7-bit) value of an input line number to be assigned from a counter: (4)

The tag field of the input packet in (1) and the value received from the selector in (4) are converted and transferred to the matrix switch (3).

The selector uses the signal (2) from the selector signal counter as an operation signal, and selects an input line number setting register-0 (IHWLN-0) if this signal is Low (5), or selects an input line number setting register-1 (IHWLN-1) if this signal is High (6).

The value of the selected register is transferred to the tag converter unchanged (4). (If HW multiplexing is not applied (two packets are not multiplexed for one HW), the signal (2) is always Low. Therefore, the input line number setting register 0 is selected in all cases).

To the input line number setting register-0/1, an input line number to be assigned is externally set with 7-bit code.

When the HW multiplexing is applied (two packets are multiplexed for one HW), two line numbers multiplexed for one HW are set in respective registers. In this case, numbers of lines first multiplexed for an HW are set in the register-0 based on a frame pulse.

When the HW multiplexing is not applied, only the register-0 s used.

FIG. 45 explains the matrix switch shown in FIG. 41.

The matrix switch extends the switching information received from the offset adding unit into a 128-bit map with a decoder, determines the state of a selector based on that value, and switches the data packets which are received from the input line number assigning unit via 64 ports to 128 routes.

The decoder receives 7-bit switching information and 1-bit Enable information. If the Enable information is "valid", the decoder decodes the switching information to a 128-bit map and transfers the map to each select signal selector. If the Enable information is "invalid", the decoder outputs "ALL0" (all bit values are 0). Namely, the data packet from the corresponding input line number assigning unit is not selected by the selector.

The select signal selector transmits an SNIP line to the selector as a select signal if the Enable information is valid. If the Enable information is invalid, the select signal selector outputs the switching signal as a select signal.

Here, if two or more valid bits exist in the switching signal, the select signal is output as "ALL0". That is, the selector is closed due to an output line conflict, and no data packets are passed through.

At this time, the number of discarded packets is counted. A counter for counting this number is 35 bits, and stops at its maximum value. Additionally, this counter has a tag bit error state flag (included in the header of an IP packet).

The SNIP includes an SNIP setting register (7-bit code) and an SNIP Enable register (1 bit), and outputs an SNIP Enable signal (1 bit) and an SNIP line number (64-bit map) to the select signal selector.

An SNIP setting method varies as follows depending on whether or not the HW multiplexing method is applied.

In the case where the HW multiplexing method is not applied: Always outputting an SNIP setting register value.

In the case where the HW multiplexing is applied: Since two lines are multiplexed for one HW, it is necessary to enable only a corresponding time slot used by the line for which the SNIP is set. The following operations are therefore performed.

If the lowest bit of the SNIP setting register is [0], even-numbered time slots output the value obtained by decoding the upper 6 bits of the SNIP setting register value with reference to a frame pulse, and odd-numbered time slots output "ALL0" based on a frame pulse.

If the lowest bit is [1], odd-numbered time slots output the value obtained by decoding the upper 6 bits of the SNIP setting register value, and even-numbered time slots output "ALL0".

The selector selects one of the data packets which are received from the input line number assigning units via the 64 ports, and outputs the selected data packet to a corresponding output port according to the signal from the select signal selector. If the selector does not receive a valid select signal, it outputs "ALL0".

Figure 46:
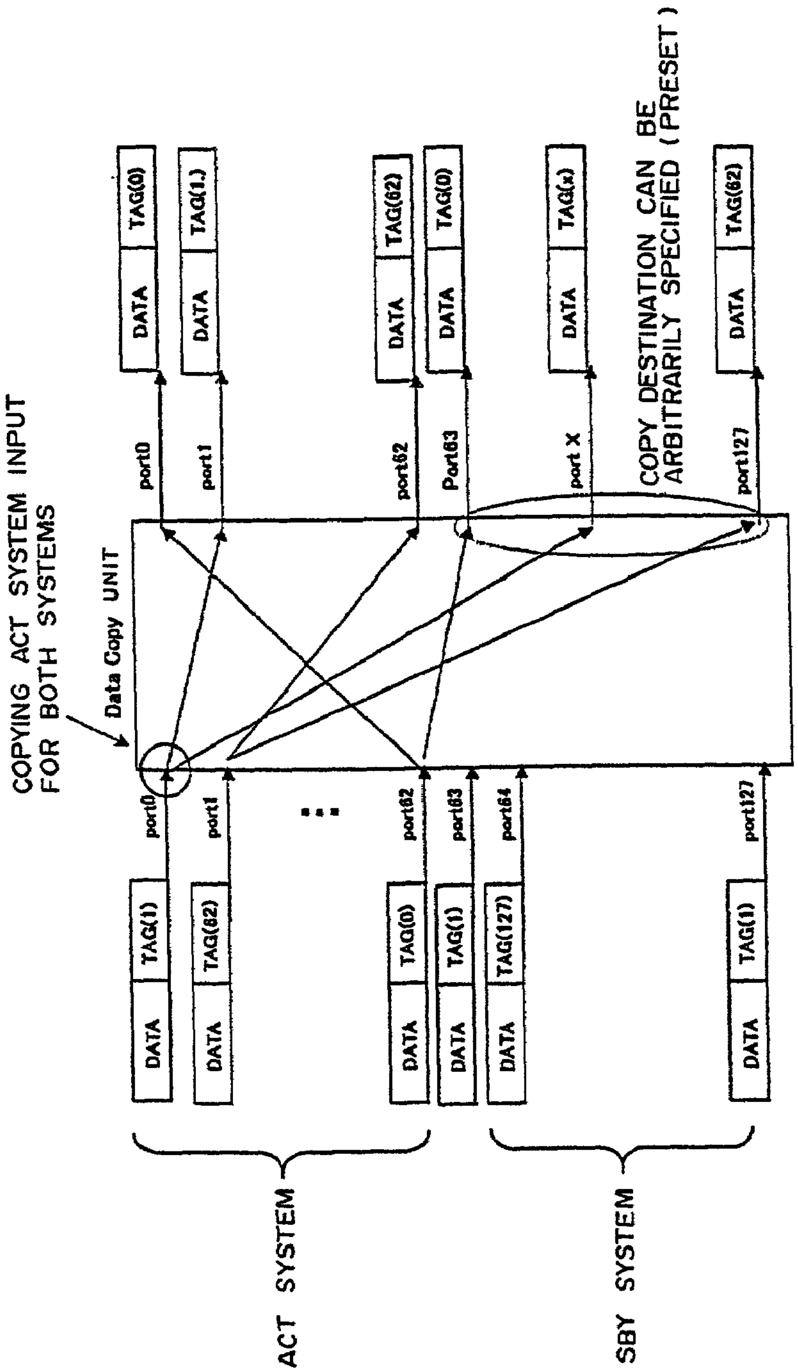
FIG. 46 explains the principle of the operations of a data copying unit.

FIG. 46 explains the principle of the operations of the data copy unit.

To provide the duplexed configuration of the buffer unit and the APS capability, a data copy transfer capability is required for a switch LSI.

When the copy capability is set, an HW input set in an ACT system is copied to an SBY system. At this time, no packet is input from an SBY system HW. Or, a packet is discarded by an ACT bit filtering unit. An output HW at a copy destination is preset externally. Besides, the output HW at the copy destination may be preset arbitrarily. Additionally, this capability can be used also for the SNOP.

Furthermore, the data copy unit has a capability for again multiplexing to 64 HWs a data stream that the matrix switch unit demultiplexes into 128 lines.

Figure 47:
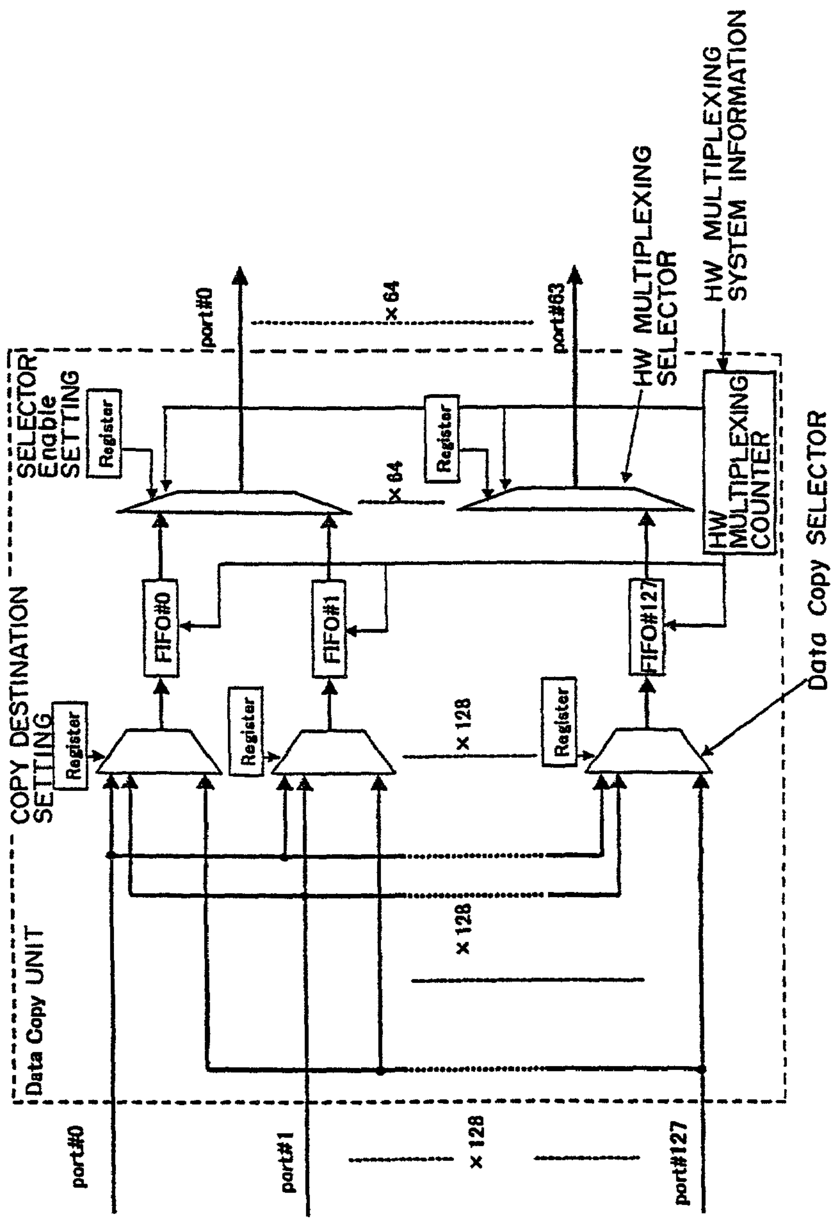
FIG. 47 exemplifies the configuration of the data copying unit.

FIG. 47 exemplifies the configuration of the data copy unit.

In this figure, each data copy selector selects one of data packets received from input ports (#0 through #127) according to the value of a copy destination setting register, and outputs the selected packet to a corresponding FIFO.

In the copy destination setting register (DTCP), 7-bit code (0 to 127) is externally set for each port. The default value is its port number. By setting the port number of the copy source in the register of the copy output destination port, data copy is implemented. Furthermore, since the register value can be arbitrarily set, this capability can be applied also to a usage as a crossconnect.

Figure 48:
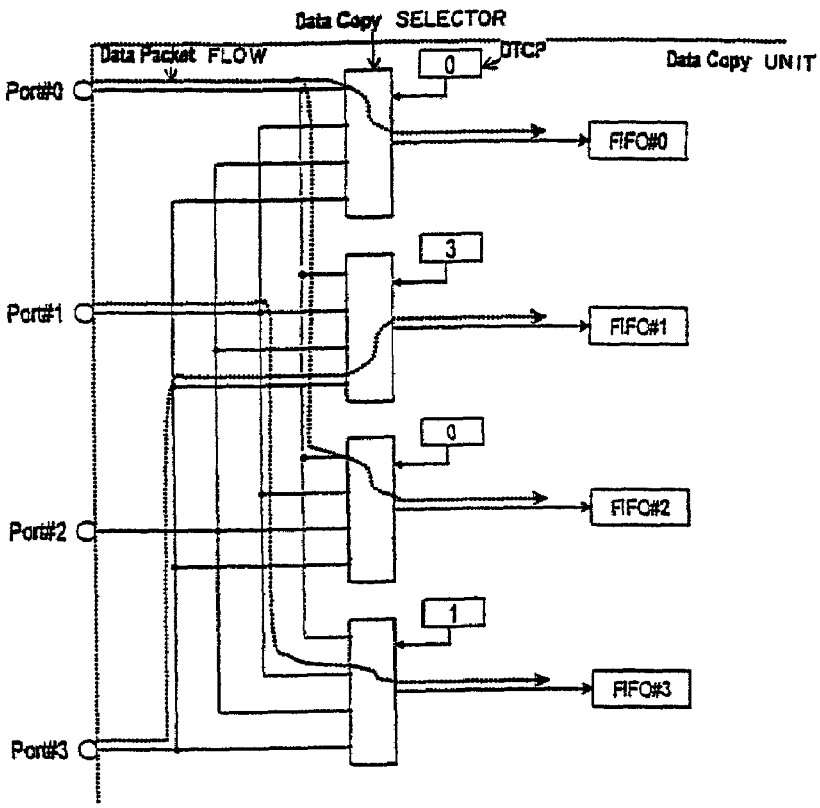
FIG. 48 shows the outline of the operations of the data copying unit.

FIG. 48 shows the outline of the operations of the data copy unit.

In this figure, input ports #0 to #3 are used to simply the illustration.

As shown in FIG. 48, data packets input from the ports #0 through #3 are input to all of data copy selectors. However, only the packet from the port #1 is transferred to FIFOs #0 through #3 according to a value set in a DTCP.

Turning back to FIG. 47.

An HW multiplexing counter provides the operation signals of the FIFOs and the HW multiplexing selector. The count operation varies depending on whether or not the HW multiplexing is applied. (The HW multiplexing setting register is referenced to determine whether or not the HW multiplexing is applied.)

If the HW multiplexing is applied: Low and High are repeatedly output every packet time within the switch LSI based on a frame pulse.

If the HW multiplexing is not applied: Low is continuously output.

The FIFOs are arranged to adopt the HW multiplexing method, and to assign two lines to one terminal of a switch LSI for processing in units of two packets, if a 128×128 switch is provided as a system. To implement this, a 2-to-1 selector for multiplexing 2 HWs as its output is required for a data copy unit, and FIFOs for 2 packets are arranged for waiting at the stage preceding this selector. A pair of FIFOs is assigned for one HW multiplexing selector.

The timing at which a FIFO is read follows the select signal from the HW multiplexing counter, and the read operation varies depending on whether the number of the port accommodating the FIFO is either odd- or even-numbered. even-numbered port: If the select signal is Low, data is read from a FIFO. If the select signal is High, "ALL0" is output. odd-numbered port: If the select signal is High, data is read from a FIFO. If the select signal is low, "ALL0" is output.

As described above, data is alternately read from a pair of FIFOs for a 2-to-1 multiplexing selector in units of packets, if the HW multiplexing method is enabled. If the HW multiplexing method is disabled, data is continuously read from one FIFO for a 2-to-1 multiplexing selector.

The HW multiplexing selector multiplexes 2 HWs when the HW multiplexing is applied.

This 2-to-1 selector operates as follows according to the signal from the HW multiplexing counter.

If the select signal is Low, data from a FIFO of an even-numbered port is selected. If the select signal is High, data from a FIFO of an odd-numbered port is selected.

If the HW multiplexing method is applied, data packets input from two ports are alternately read. If the HW multiplexing method is not applied, an even-numbered port is always selected.

If buffers having different capabilities coexist, and if the switch card is expanded online, data output must be suspended. To suspend a packet data output, a (1-bit) selector Enable setting register (SELEN) is arranged for each of 64 HW multiplexing selectors. When the selector is disabled, setting is made to suspend data packet output. If setting is made to suspend packet data output, data "ALL0" is output.

The process that the data copy unit must perform at the time of APS capability setting is to copy a valid packet of an active line to an inactive line. A controlling system (not shown) assigns the output line number of an active line to a copy destination setting register arranged in a data copy selector of an inactive line having the APS capability, so that this process is implemented.

If the SNOP capability setting is made, the number of the output line to which the SNOP capability is provided is assigned to the copy destination setting register arranged in the data copy selector for a test port.

When a switch card is expanded, the SNOP capability is once suspended and reset upon completion of the expansion. This is because the correspondence between the port number of the data copy selector and an output line may sometimes be changed.

An ACT bit filtering unit discards packets other than ACT packets among HW user packets. At this time, the ACT fields of the HW user packets are referenced, and the packets having the ACT field values other than 1 are discarded in units of packets. Whether the ACT bit filtering unit is either operated or suspended is externally set in a dedicated register. Furthermore, if setting is made to operate the ACT bit filtering unit, a valid packet number counter counts the number of ACT packets according to the register setting.

Since the redundant copy unit and the redundant selector unit do not function in the SW mode, their explanations are omitted here.

Next, a U/D-CNV mode capability acting as a converting unit in the case where the circuit implementing both of the XB-SW unit and the converting unit is adopted as a switch LSI is described.

Figure 49:
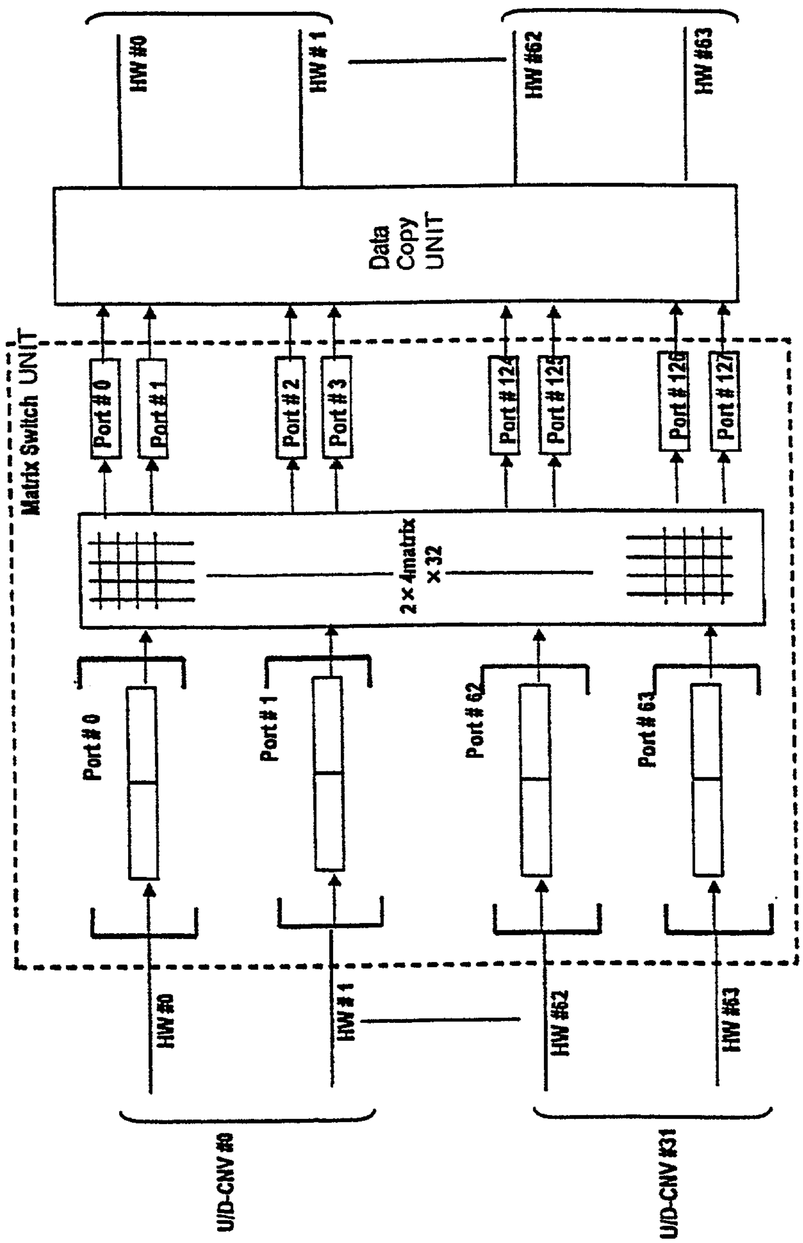
FIG. 49 explains the logical configuration of a U/D-CNV.

FIG. 49 explains the logical configuration of a U/D-CNV. Additionally, FIG. 50 explains the data flow of the U/D-CNV.

Because the operations of the matrix switch unit are the same regardless of whether a CNV is either a U- or a D-CNV, these figures illustrate the matrix switch unit without making a distinction between the U- and D-CNVs .

A switch LSI distributes packets input from a two-input HW interface to two routes according to time slots. The base point of the time slots is a frame pulse received at predetermined time intervals. 32 U/D-CNVs are logically accommodated within one switch LSI. Additionally, since processes are performed in units of two packets, one U/D-CNV includes a 2×4 matrix switch in which one output HW is demultiplexed into two ports. Accordingly, the 64×128 matrix switch within the switch LSI is divided into 32 2×4 matrix switches logically.

Figure 50:
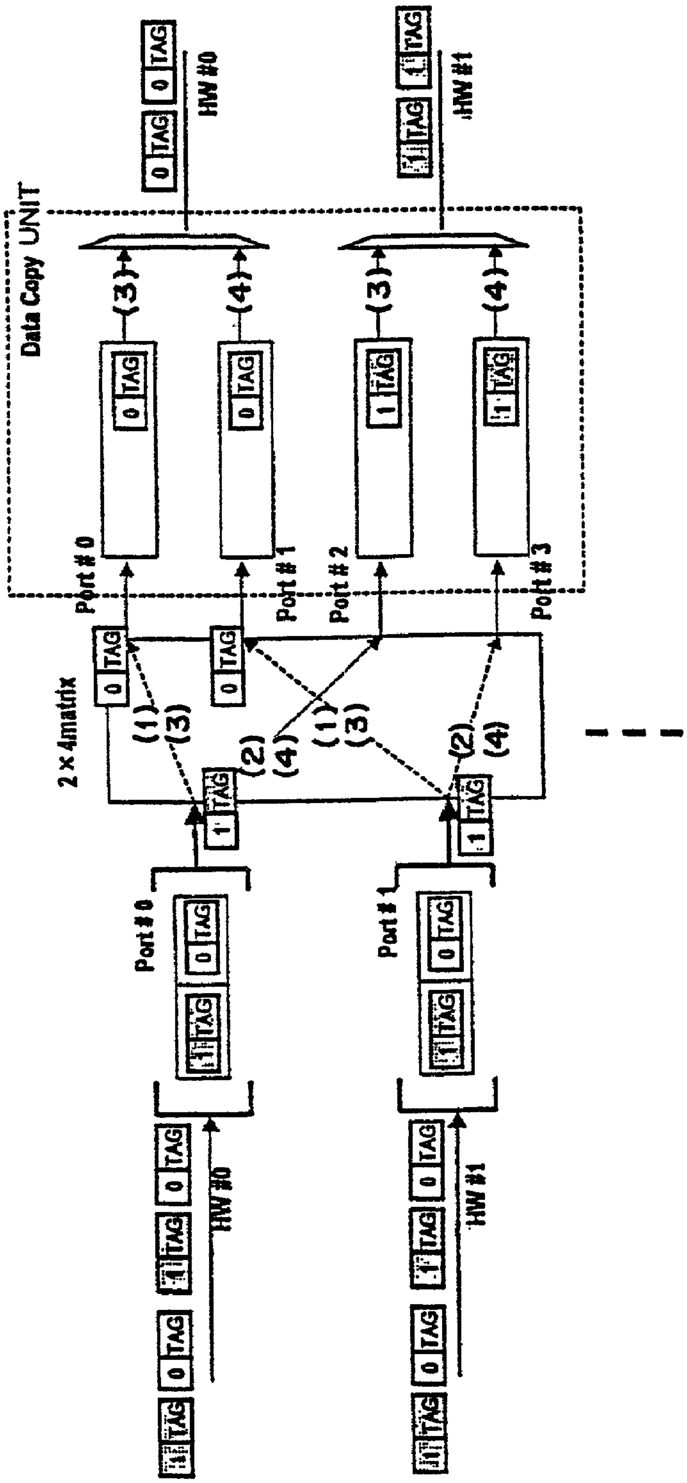
FIG. 50 explains the data flow of a redundant copy unit.

The operations of a U/D-CNV are described in pursuit of FIG. 50. First of all, a packet is transferred from each input port to an output port (1). Next, a packet is transferred from each input port to a predetermined port that is the other output (2). At this time, the input packets are alternately distributed to output HWs based on a frame pulse. Then, the data copy unit outputs the packets to each output HW from a port having a smaller number, and processes the next packet in a similar manner as in (1). Furthermore, the data copy unit outputs he packet from the other port to each output HW, and processes the next packet in a similar manner as in (2) (4).

Here, the configuration of the matrix switch unit for the U/D-CNV is similar to that shown in FIG. 41. The U/D-CNV mode (CNV mode) is therefore described by referencing FIG. 41.

First of all, a tag extracting block transfers a received data packet that is not used in the CNV mode to an input line number assigning unit unchanged.

An HW multiplexing setting register operates in a similar manner as in the above described SW mode. A selector signal counter provides an offset adding unit with fundamental switching information via an SW/CNV mode selector. Its internal configuration and operations are similar to those in the SW mode.

The SW/CNV mode selector selects data by referencing the fundamental switching information. A selector selection is uniquely defined depending on whether the mode is either the SW or the CNV mode. In the CNV mode, a selector signal counter is selected as a reference source. Accordingly, the operation for distributing packets input from one HW to two routes according to time slots is implemented.

The offset adding unit operates in a similar manner as in the SW mode. An input line number assigning (tag converting) unit does not function in the CNV mode. Therefore, the data packet received from the tag extracting block is transferred to the matrix switch unchanged. The matrix switch operates in a similar manner as in the SW mode. However, SNIP setting cannot be made in the CNV mode. Accordingly, the value of an SNIP Enable register is continuously set to "invalid".

The operations of the data copy unit are similar to those in the SW mode. However, the APS and SNOP capabilities cannot be set.

The redundant copy unit provides an N+1 copying capability required to switch between the ACT and SBY of an N+1 redundant configuration. This capability operates only in a CNV mode switch LSI acting as a U-CNV.

Figure 51:
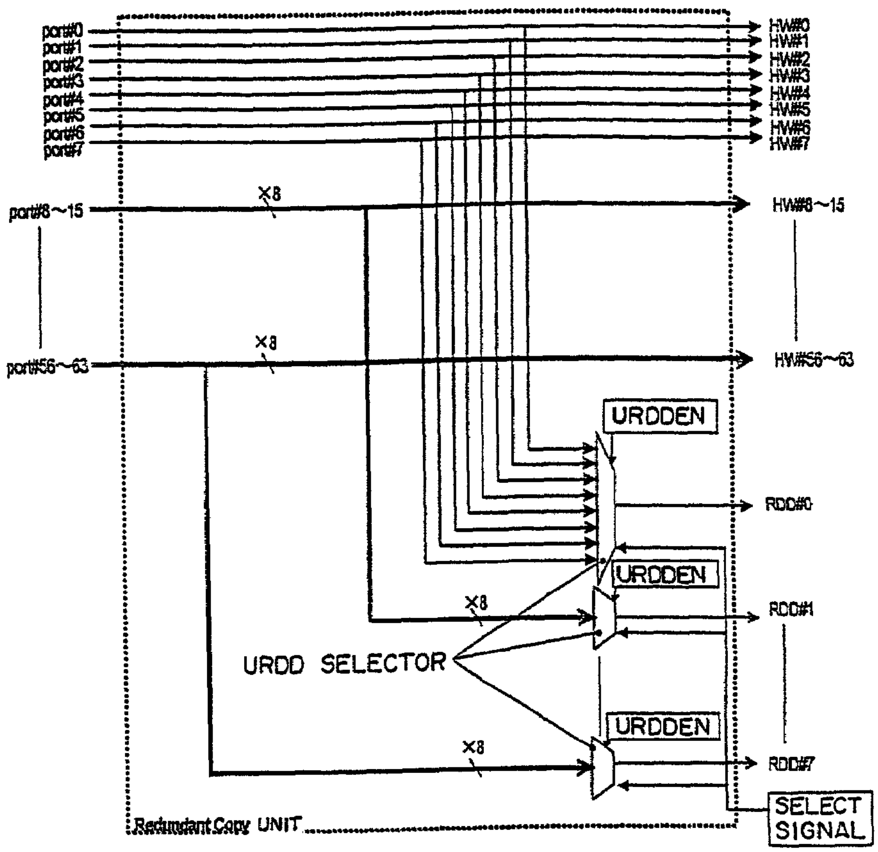
FIG. 51 shows the configuration of the redundant copy unit.

FIG. 51 shows the configuration of the redundant copy unit.

URDD selectors, the number of which is 8, respectively correspond to output HWs #0 to #7/#8 to #15/ . . . /#48 to #55/#56 to #63. Each of the URDD selectors receives data packet from the corresponding 8 input ports, selects one of the packets, and outputs the selected data packet to an output RDD. If an Enable register value is "invalid", "ALL0" is output.

A URDD selector Enable register (URDDEN: 1 bit) is arranged for each URDD selector in order to forcibly suspend the flow of a data packet from an RDD output.

When the N+1 switching of the switch cards is made, the following information is transmitted from a controlling system (not shown).

(1) N+1 switching information enable (1 bit): Indicating validity of information (0: invalid/1: valid)

(2) An SBY system switch card selection instruction (3 bits): Specifying the number of an ACT system switch card switched to an SBY system switch card with 3-bit code (0 to 7).

If (1) is valid, each URDD selector selects the data packet from a corresponding input port by using the information (2) as a select signal. At this time, the URDD selector disabled by the URDD selector Enable register does not operate.

Furthermore, the following status register is arranged to allow the selection state of the N+1 switch cards to be monitored externally.

A faulty switch card number display (3 bits): Displaying the number of the switch card switched to the SBY card with 3-bit code.

An SBY system switch card state display (1 bit) Displaying the state of an SBY system switch card (0: SBY/1: ACT)

Figure 52:
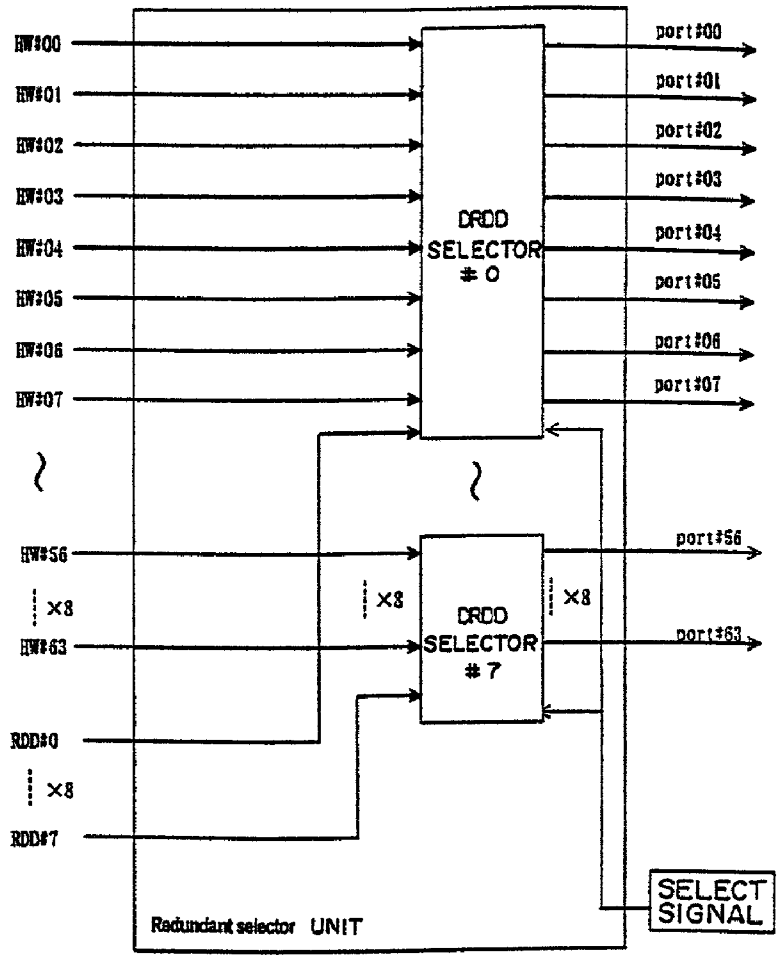
FIG. 52 shows the circuit configuration of a redundant selector unit.

FIG. 52 shows the circuit configuration of the redundant selector unit.

The redundant selector unit provides an N+1 selection capability required to switch between the ACT and the SBY of the N+1 redundant configuration. This capability functions only in a CNV mode switch LSI acting as a D-CNV.

DRDD selectors are arranged respectively for input HWs #0 to #7/#8 to #15/ . . . /#48 to #55/#56 to #63. RDD inputs (#0 to #7) are respectively connected to each of the blocks. Each of the selectors selects one of data received from the 8 HWs according to a select signal, and replaces the data from that of an RDD input.

Figure 53:
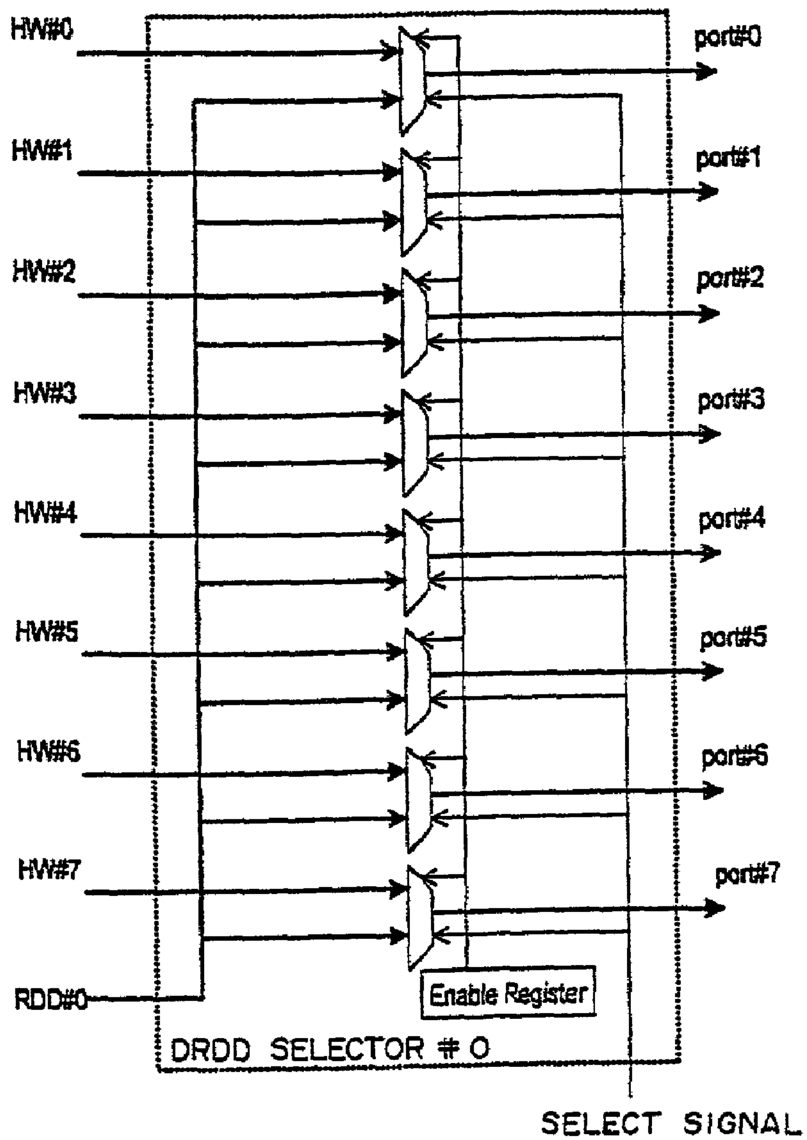
FIG. 53 shows the internal configuration of a DRDD selector.

FIG. 53 shows the internal configuration of the DRDD selector.

Each block includes a 2-to-1 selector for each input HW. Each selector receives data from a corresponding input HW and RDD input, and outputs the data selected according to a select signal to an output port. An Enable register (DRDDEN: 1 bit) is arranged to forcibly suspend the selector operation according to a select signal.

DRDDEN=0: Always selecting an HW not according to a select signal (an RDD is not selected)

DRDDEN=1: Operating according to the following N+1 switching process.

Information listed below are transmitted from a controlling system (not shown) when the N+1 switching of switch cards.

(1) N+1 switching information enable (1 bit): Indicating the validity of information (0: invalid/1: valid)

(2) An SBY system switch card selection instruction (3 bits): Specifying the number of an ACT system switch card switched to an SBY system switch card with 3-bit code (0 to 7).

(3) A switch card switching direction instruction: Instructing the direction of system switching between the ACT system switch card specified with (2) and an SBY system switch card (0: ACT to SBY system/1: SBY to ACT system).

If the information (1) is valid, a corresponding 2-to-1 selector specified with (2) becomes an operation target in each DRDD selector block.

If the information (3) is 0, data received from an RDD input is selected and output. If the information (3) is 1, data received from a corresponding input HW is selected and output.

At this time, the DRDD selector disabled by the DRDD register does not operate.

Furthermore, the ACT bit filtering unit operates in a similar manner as in the SW mode.

FIGS. 54A through 54C explain the switch system configuration allowing the capacity of a switch to be changed in the case where the circuit implementing both of an XB-SW unit and a converting unit.

With the system according to this preferred embodiment, 4 types of a switch card configuration according to a switch capacity, and 4 types of a buffer card according to the number of accommodated lines are implemented.

Furthermore, a CNV mode switch LSI is mounted on all of the types of the buffer card. This is because the data connection difference between a buffer LSI and a switch card is absorbed with the crossconnect capability of the CNV mode.

FIG. 54A shows the switch card configuration types, whereas FIG. 54B shows the buffer card types.

The system according to this preferred embodiment does not allow all of combinations of these switch card configurations and buffer cards. This restriction is imposed due to the scheduling method adopted by this system.

FIG. 54C shows the correspondence between a switch card configuration and a buffer card allowed thereof.

Described below are the setting values for respective registers, which are required to connect cards, when a switch card is increased or decreased or when buffer cards of different types are mixed in one system as described above (only for a main signal system).

Hereinafter, a method connecting LSI external terminals between main signal system buffer CNV switches, which is required to allow buffer cards of different types to be mixed within one system, is described for each buffer card type.

Figure 55:
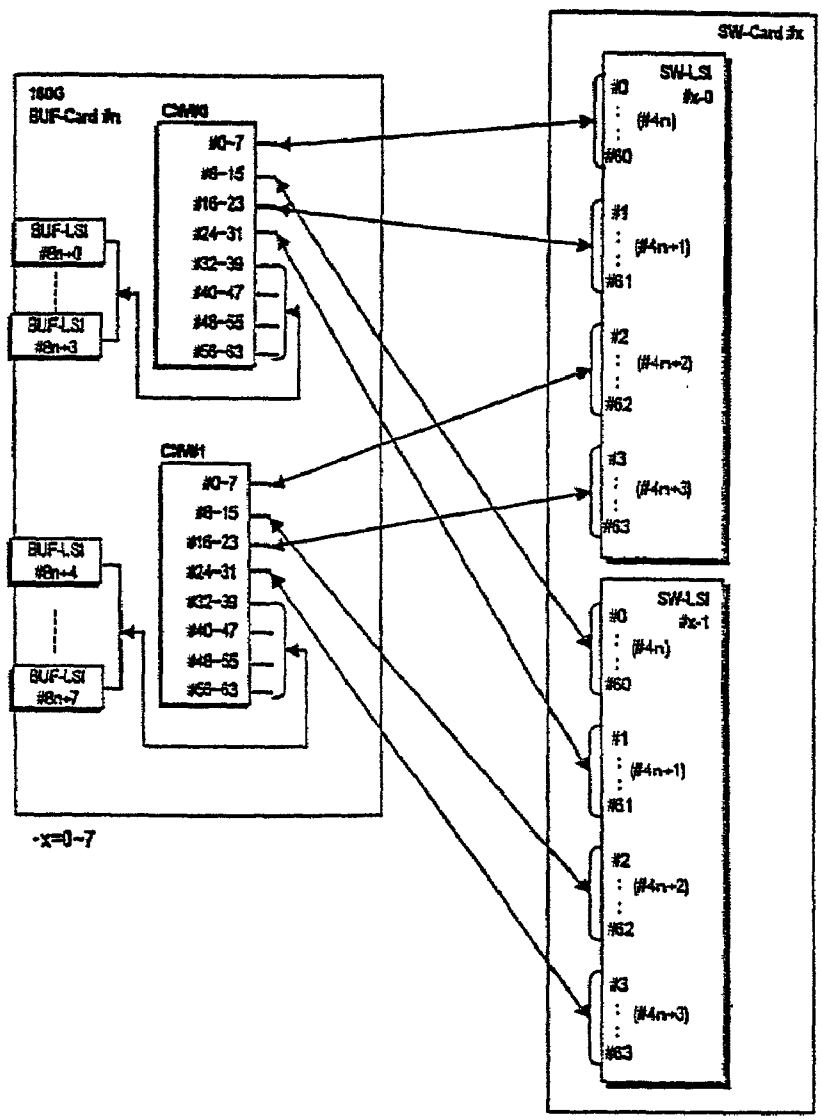
FIG. 55 shows an image of a connection of a 160 G buffer card (No. 1)
Figure 56:
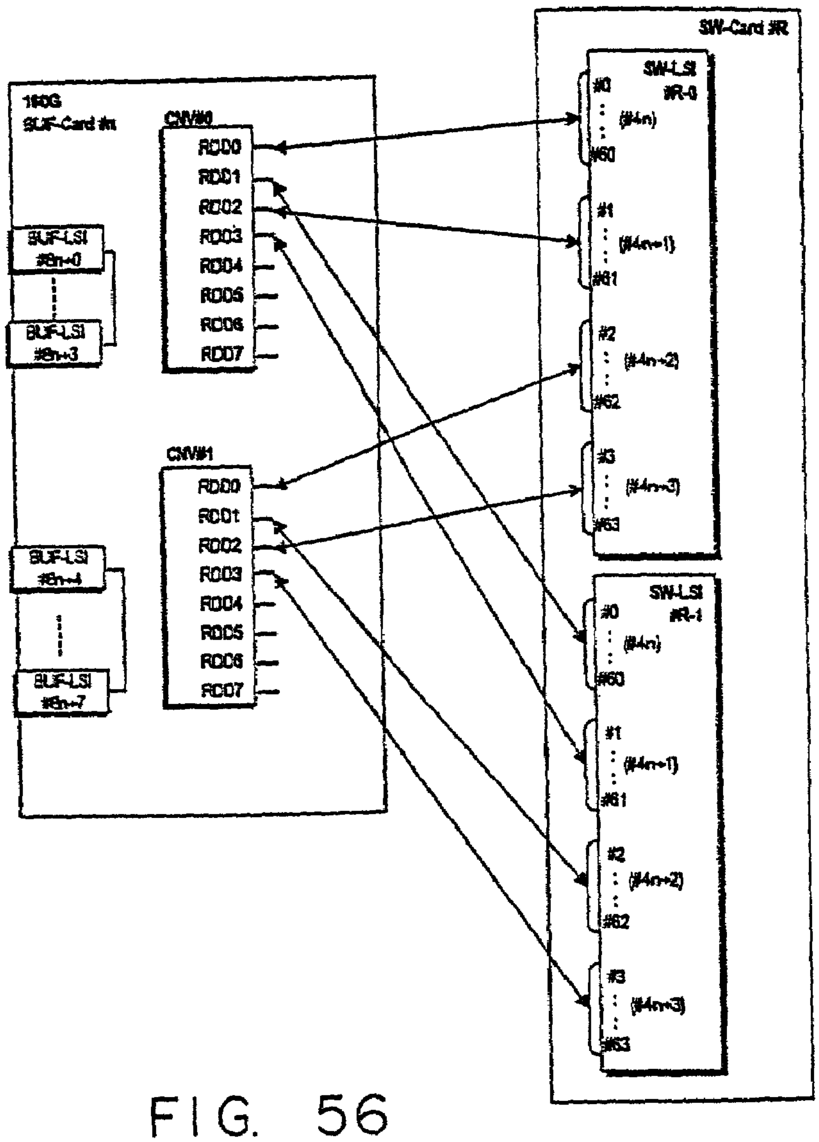
FIG. 56 shows the image of the connection of the 160 G buffer card (No. 2)

FIGS. 55 and 56 shows the connection image of a 160 G buffer card. A table 4 of FIGS. 57 through 59 shows the connection configuration of CNV external terminals. Note that the connection configuration of CNV external terminals is common to inputs and outputs.

The tables shown in FIGS. 57 through 59 are common to CNVs #0 and #1. Values within brackets [ ] correspond to the CNV #1 (entries that do not include [ ] are common to the CNVs #0 and #1).

Figure 60:
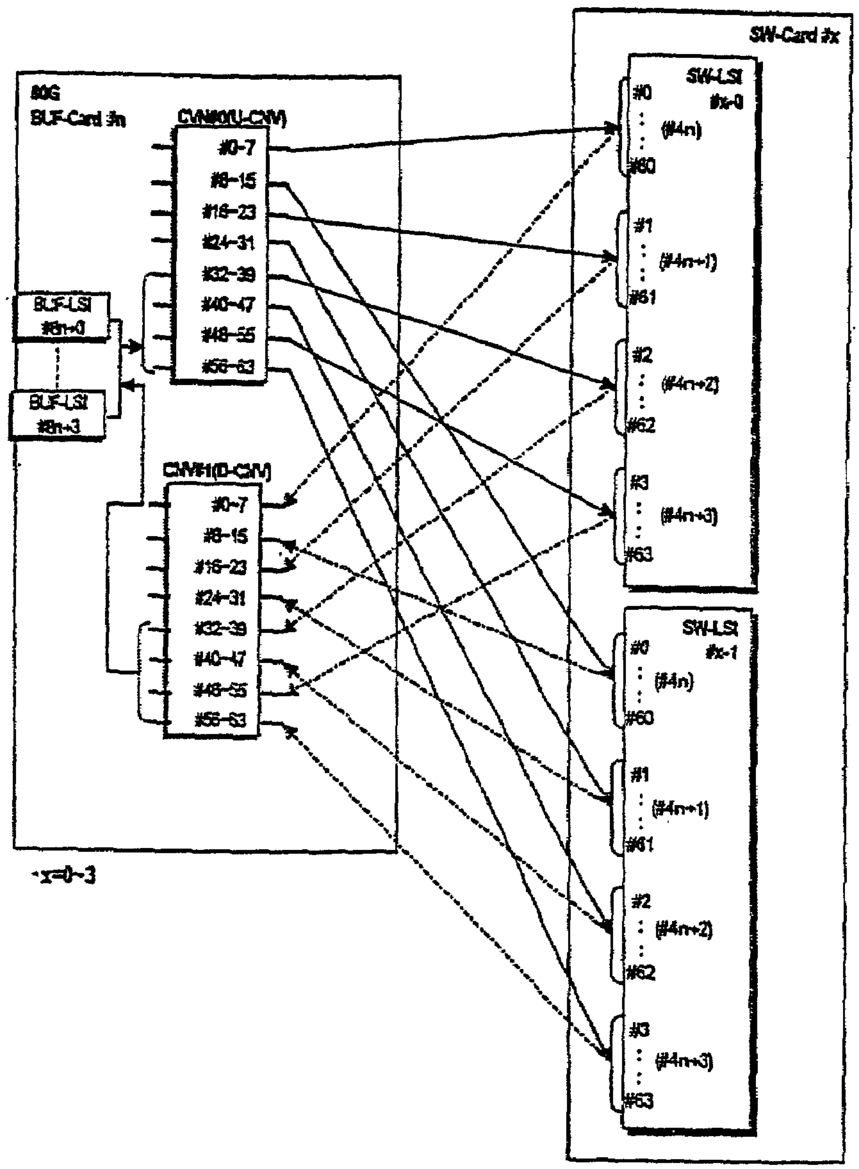
FIG. 60 shows the connection image of an 80 G buffer card (No. 1)
Figure 61:
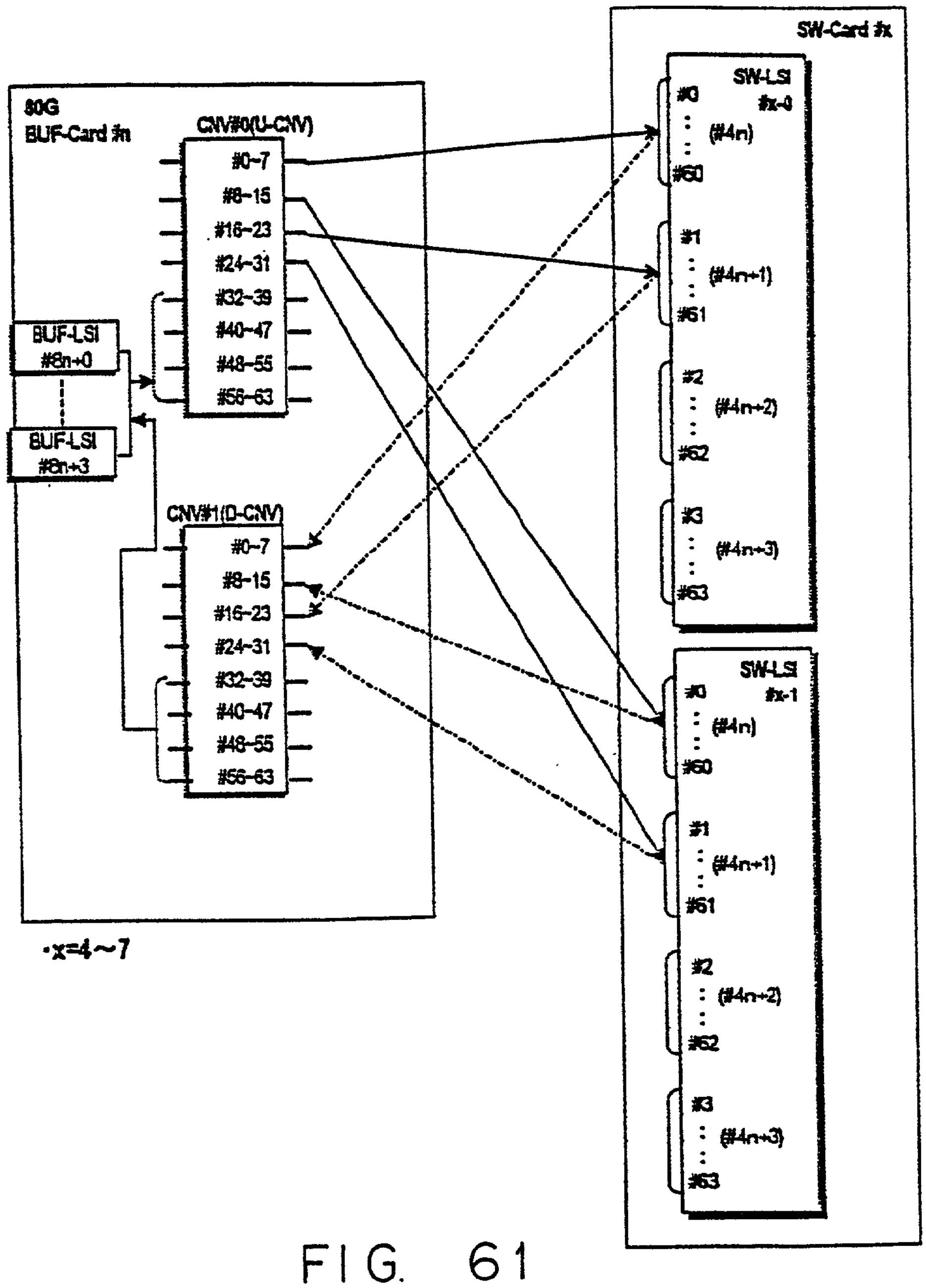
FIG. 61 shows the connection image of the 80 G buffer card (No. 2)
Figure 62:
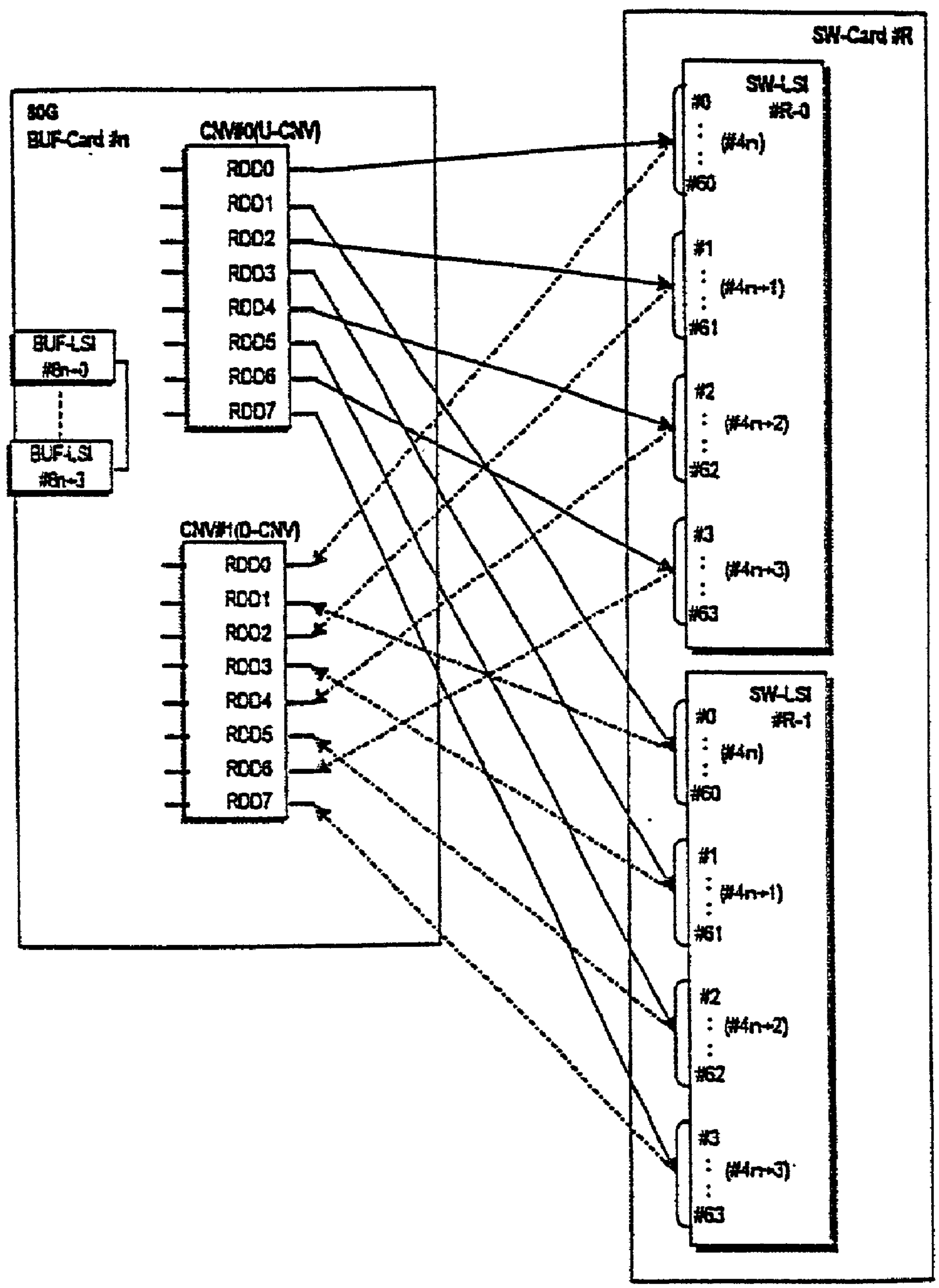
FIG. 62 shows the connection image of the 80 G buffer card (No. 3)

FIGS. 60 through 62 shows the connection image of an 80 G buffer card. FIGS. 63 through 67 show the connection configuration of CNV external terminals.

The connection configuration of CNV external terminals varies depending on inputs and outputs. The inputs and the outputs are distinguished by the orientation of an arrow of a connecting line.

Additionally, in the connection configurations of CNV external terminals in FIGS. 63 through 67, the inputs of the CNV #0 and the outputs of the CNV #1 are common, and the outputs of the CNV#0 and the inputs of the CNV #1 are common. The former and the latter are respectively shown in tables 5 and 6.

Figure 68:
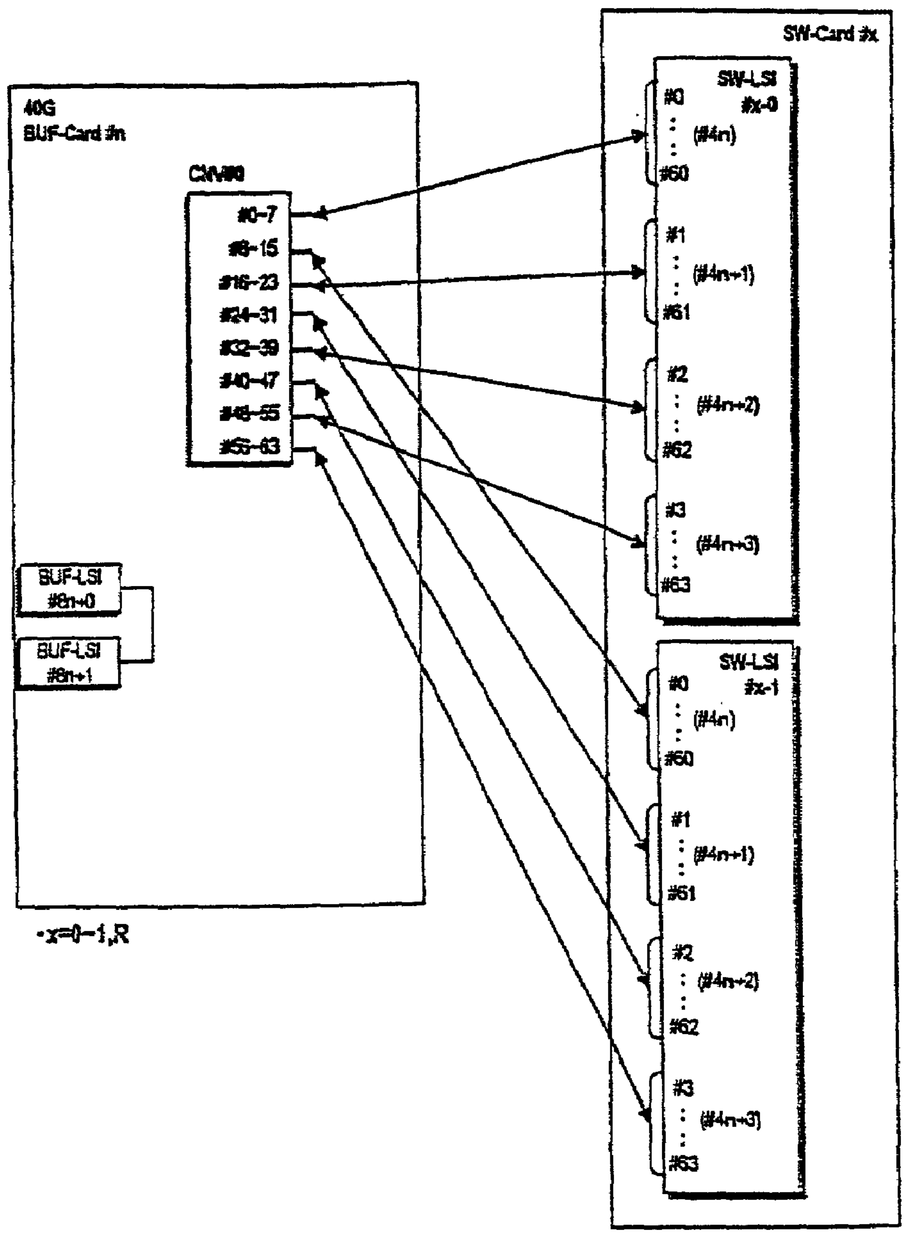
FIG. 68 shows an image of a connection of a 40 G buffer card (No. 1)
Figure 69:
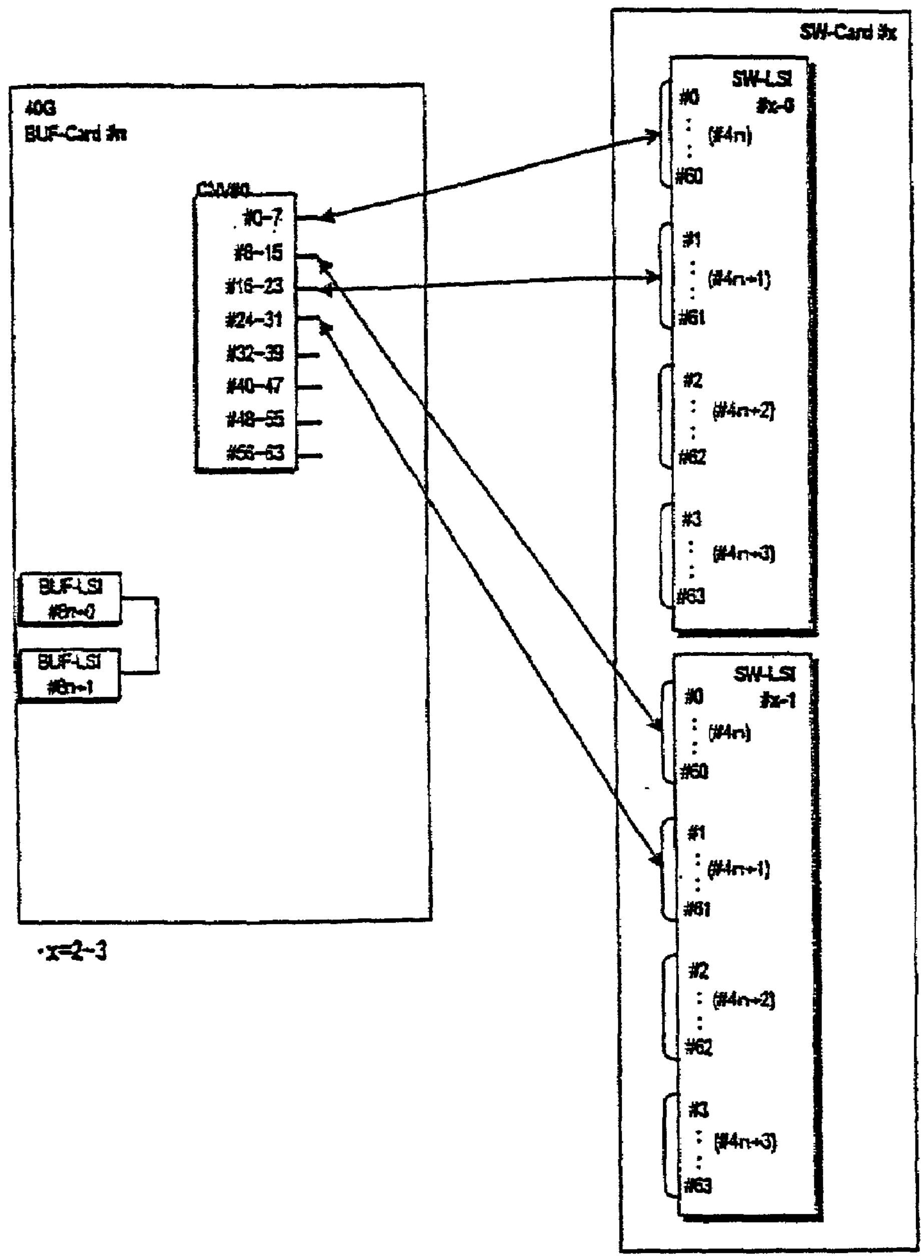
FIG. 69 shows an image of the connection of the 40 G buffer card (No. 2)
Figure 70:
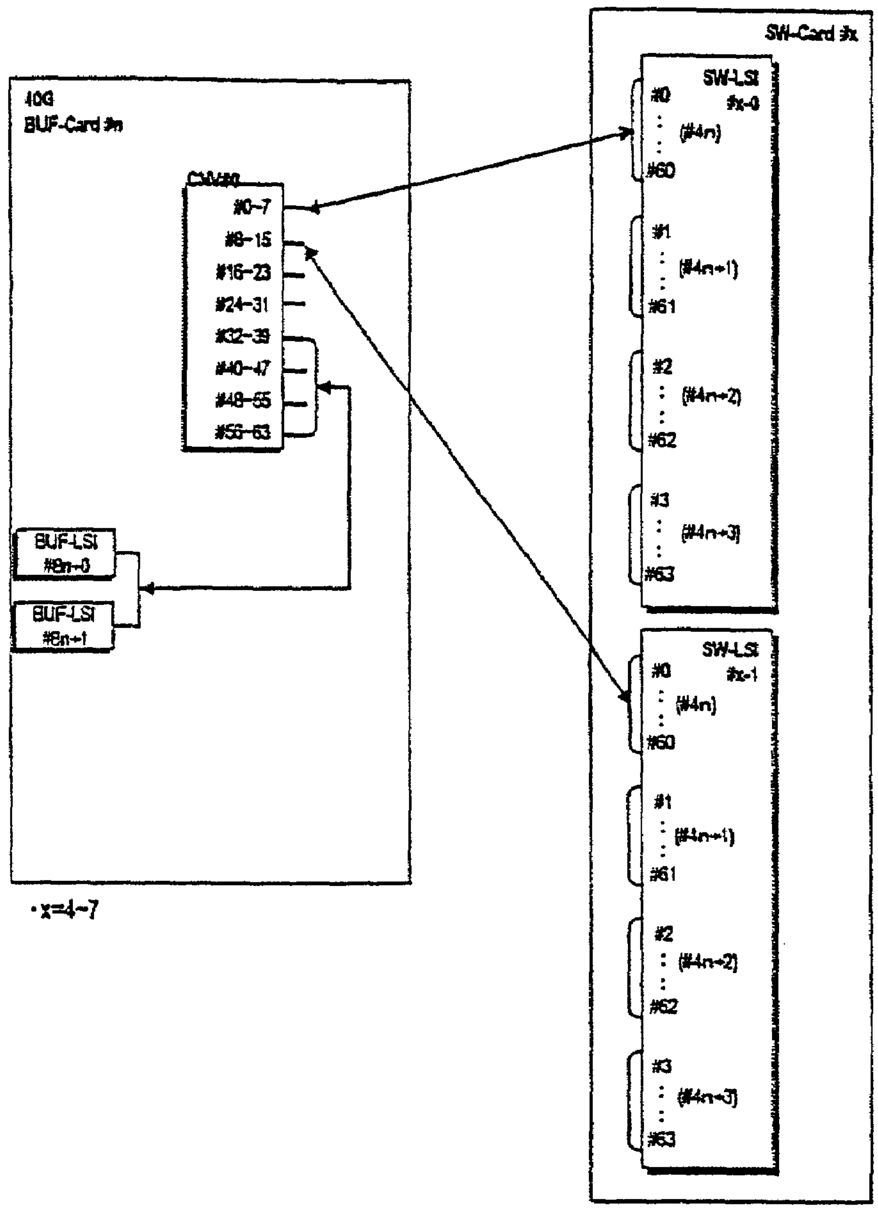
FIG. 70 shows an image of the connection of the 40 G buffer card (No. 3)

FIGS. 68 through 70 show the connection image of a 40 G buffer card, and FIGS. 71 through 73 show the connection configuration of CNV external terminals.

The connection configuration of CNV external terminals is common to inputs and outputs. The connection configuration of external terminals is shown in a table 7 of FIGS. 71 through 73.

Figure 74:
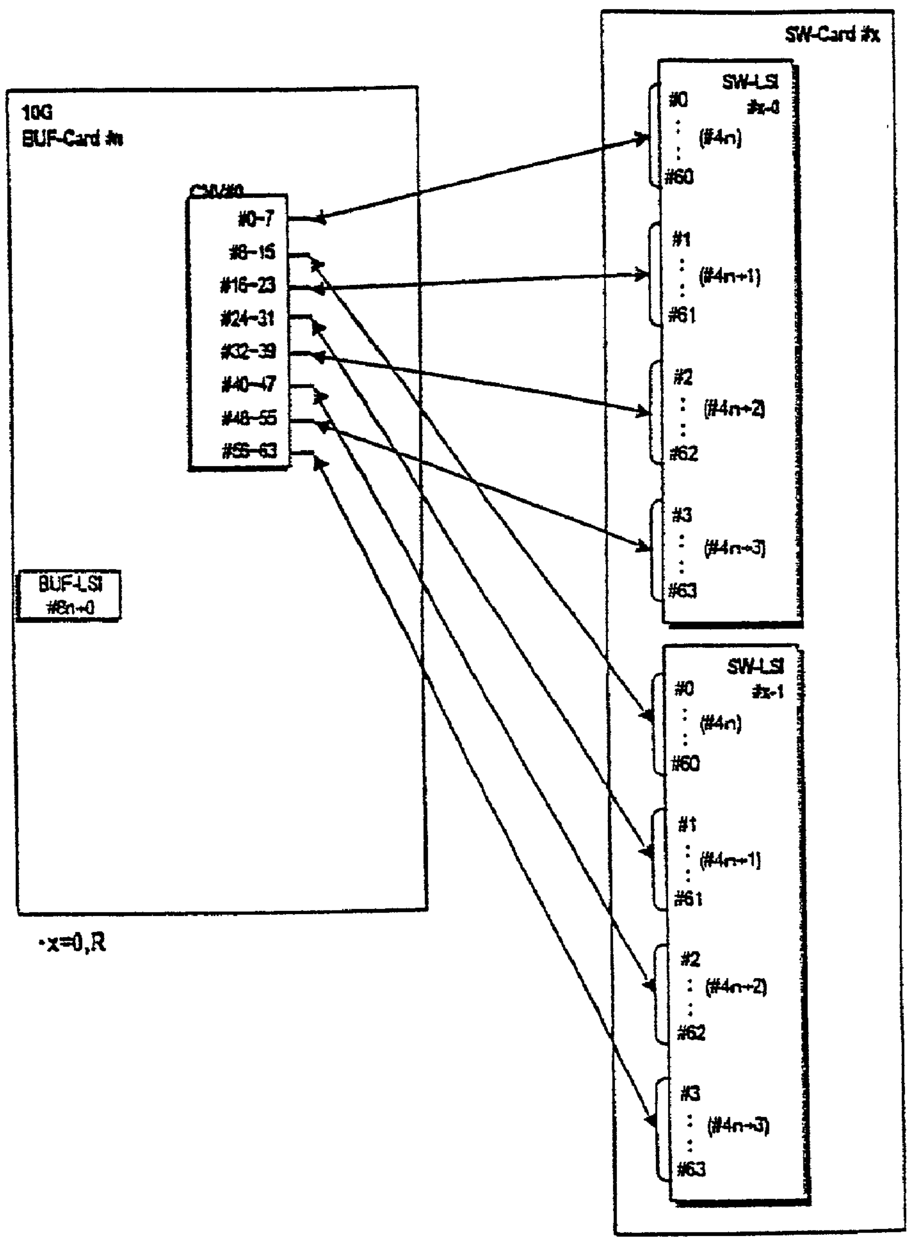
FIG. 74 shows an image of a connection of a 20 G buffer card connection (No. 1)
Figure 75:
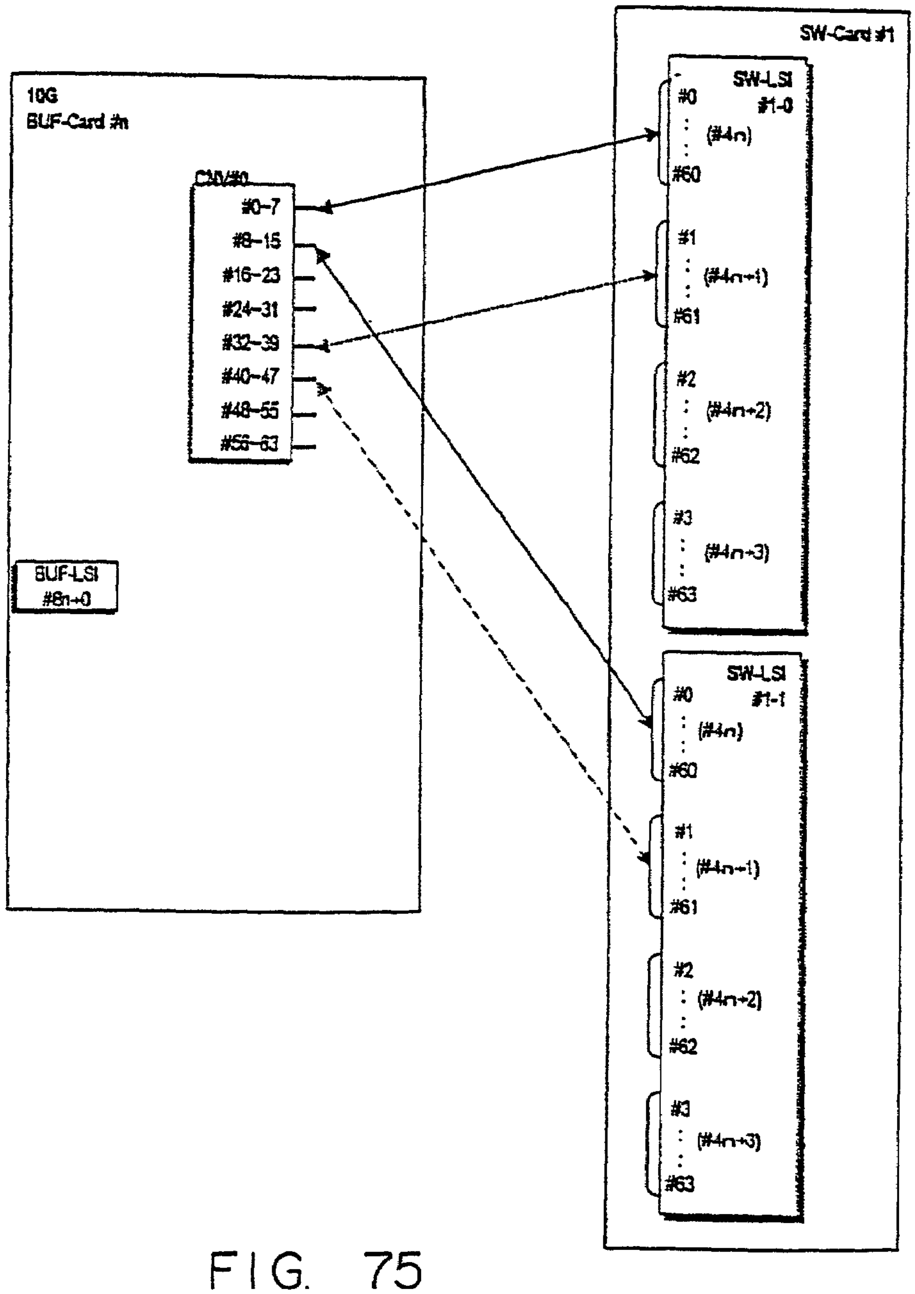
FIG. 75 shows the image of the connection of the 20 G buffer card (No. 2)
Figure 76:
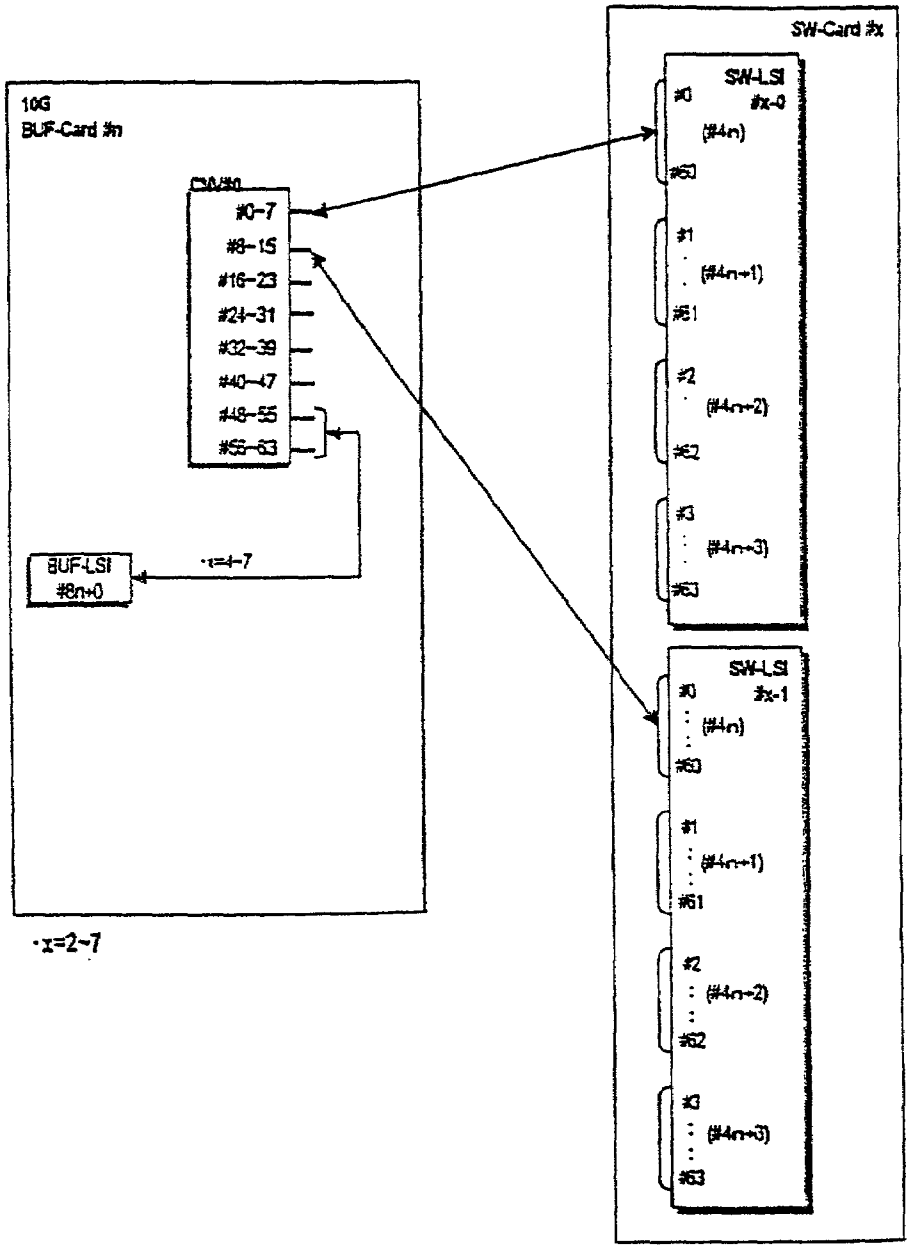
FIG. 76 shows the image of the connection of the 20 G buffer card connection (No. 3)

FIGS. 74 through 76 show the connection image of a 20 G buffer card. A table 8 of FIGS. 77 through 79 shows the connection configuration of CNV external terminals. Note that the connection configuration of CNV external terminals is common to inputs and outputs.

When buffer cards of different types are mixed, or when a switch card is increased/decreased, settings must be changed for the following registers.

offset setting register (OFST)

HW multiplexing setting register (HWMUX)

input line number setting register 0/1 (1HWLN0/1)

selector Enable setting register (SELEN)

copy destination setting register (DTCP)

URDD selector Enable register (UDRREN)

DRDD selector Enable register (DRDDEN)

Setting values for the above described registers are described below.

offset setting register

Different settings are required depending on the type of a card to be mounted or the configuration of a switch card. Setting values for each card are listed below.

In these settings, switch division depending on a switch card configuration is as follows.

Switch Card Configuration 8 cards (2.56 T bits): A switch is not divided.

4 cards (1.28 T bits): A switch is not divided.

2 cards (640 G bits): A switch is divided into two.
  port numbers=4n, 4n+1 (OFST[0])
  port numbers=4n+2, 4n+3 (OFST[2])

1 card (320 G bits): A switch is divided into four.
  port number=4n (OFST[0])
  port number=4n+1 (OFST[1])
  port number=4n+2 (OFST[2])
  port number=4n+3 (OFST[3])

FIG. 80 shows a table 9 that represents the setting values of the offset setting register.

Similarly, the setting values of the offset setting register for a 160 G buffer card, an 80 G buffer card, a 40 G buffer card, and a 20 G buffer card are respectively shown in tables 10 through 14 of FIGS. 81 through 85.

Common settings are made for the HW multiplexing setting register regardless of the type of a card to be mounted or an operation mode (the SW or the CNV mode) switch card configuration: 8 cards (2.56 T bits): Setting [1].

other configurations: Setting [0].

input line number setting register-0/1

Settings for this register must be made only for a switch LSI (SW mode) mounted on a switch card (settings are not required in the CNV mode)

The settings are as follows.

input line number setting register 0

Assuming that the value of a port number is [N], setting values are those shown in FIG. 86.

input line number setting register-1

HW multiplexing register=1: Setting the value obtained by adding 1 to the input line number setting register-0.

HW multiplexing register=0: No setting is required. selector Enable setting register Different settings are required depending on the type of a card to be mounted or a switch card configuration.

Always setting "ALL1" for a switch card.

Setting values of the selector Enable setting register in the case where a 160 G buffer card is mounted are those shown in a table 15 of FIG. 87.

Similarly, the setting values of the selector Enable setting register for the 80 G buffer card, the 40 G buffer card, and the 20 G buffer card are respectively shown in tables 16 through 19 of FIGS. 88 through 91.

For the copy destination setting register:

a default value is set in the CNV mode, or the following settings must be made in the SW mode depending on whether or not the HW multiplexing method is applied.

If the HW multiplexing register=1, a default value is set.

If the HW multiplexing register=0, the following settings must be made.
  port number=8n or 8n+1; setting value [8n]
  port number=8n+2 or 8n+3; setting value [8n+1]
  port number=8n+4 or 8n+5; setting value [8n+2]
  port number=8n+6 or 8n+7; setting value [8n+3]
  (n=0 to 16)

Additionally, settings of the URDD selector and the DRDD selector Enable register are common.

Namely,

In the SW mode: "ALL1" is always set.

In the CNV mode: Settings shown in the tables of FIGS. 92 and 93 are made depending on the type of a buffer card to be mounted.

Next, a switch card online expansion capability in the case where the circuit implementing both of an XB-SW unit and a converting unit is used as a switch LSI.

When the configuration of a switch card is changed, the above described setting values of the registers must be altered. Furthermore, if a switch card is expanded online, it is necessary to instantaneously change the setting values. Accordingly, an online expansion setting unit making these settings in a hardware manner is arranged to cope with the online expansion of a switch card.

The online expansion setting unit is composed of the following blocks.

number register

Holding the value of a signal indicating the number of switch cards to be changed (3-bit code), which is externally provided.

OFST setting changing block

Including 4 registers for an offset reference. Values corresponding to the above described card types are preset in these registers.

At the time of online expansion, one of the four registers is selected according to the value of the number register, and the offset value is changed.

IHWLN setting changing block

Referencing the value of the number register at the time of online expansion, calculating the above described IHWLN setting value, and changing the value of the IHWLN.

DTCP setting changing block

Including 2 registers for a DTCP reference. Register values corresponding to the above described card types are preset.

At the time of online expansion, one of the 2 registers is selected according to the value of the number register, and the value of a DTCP is changed.

SELEN setting changing block

Including 4 registers for an SELEN reference. Register values corresponding to the above described card types are preset.

At the time of online expansion, one of the 4 registers is selected according to the value of the number register, and the value of an SELEN is changed.

RDDEN setting changing block

Including 4 registers for a U/DRDDEN reference. Register values corresponding to the above described card types are preset.

At the time of online expansion, one of the 4 registers is selected according to the value of the number register, and the values of URDDEN and DRDDEN are changed.

According to the present invention, a large-scale packet switch device that can prevent a process overhead from being increased while preventing an increase in hardware amount when the capacity of the packet switch is expanded, can be provided.

What is claimed is:

1. A packet switch device switching input packets destined for a plurality of destinations, which packets are scheduled, comprising:

a distributing unit for sequentially distributing the input packets to a plurality of paths in an arrival order, independent of destination, in units of packets;

a switch unit for switching the packets input from said distributing unit via the plurality of paths without buffers for avoiding packet confliction to the same destination, and outputting the packets in an arrival order; and a multiplexing unit for multiplexing the packets output from said switch unit by performing a process inverse to the packet distribution process performed by said distributing unit, wherein switching of input packets is performed by a distribution means constituted from one or more of said distribution unit for distributing packets received at input ports in the arrival order of the packets, irrespective of destinations, to paths sequentially, a switching means constituted from one or more of said switch unit for switching the packets to the plurality of destinations of the packets, and a multiplexing means constituted from one or more of said multiplexing unit for multiplexing the packets according to their destinations for outputting multiplexed packets to output ports.

2. The packet switch device according to claim 1, wherein at least one switching means is arranged, and each switching means is logically divided into a plurality of switch units, so that packets are switched.

3. A packet switch device switching input packets, which packets are scheduled, comprising:

a distributing unit for sequentially distributing the input packets to a plurality of paths in an arrival order, independent of destination, in units of packets;

a switch unit for switching the packets input from said distributing unit via the plurality of paths without buffers for avoiding packet confliction to the same destination, and outputting the packets in an arrival order; and a multiplexing unit for multiplexing the packets output from said switch unit by performing a process inverse to the packet distribution process performed by said distributing unit, wherein:

said distributing unit multiplexes a plurality of input highway packets on a same path by assigning fixed-order time slots to the plurality of input highway packets;

said switch unit switches the plurality of packets on the same path after demultiplexing the packets for each input highway; and said multiplexing unit multiplexes a plurality of output highway packets on a same path.

4. A packet switch device switching input packets, which packets are scheduled, comprising:

a distributing unit for sequentially distributing the input packets to a plurality of paths in an arrival order, independent of destination, in units of packets;

a switch unit for switching the packets input from said distributing unit via the plurality of paths without buffers for avoiding packet confliction to the same destination, and outputting the packets in an arrival order; and a multiplexing unit for multiplexing the packets output from said switch unit by performing a process inverse to the packet distribution process performed by said distributing unit, wherein:

said distributing unit, said switch unit, and said multiplexing unit are prepared respectively for a plurality of lines;

when a distributing unit and a multiplexing unit, which have different numbers of accommodated lines, are arranged, a number of switch units to be multiplexed, a number of switches into which said switch unit is divided, a number of switch units to be arranged are made to match numbers required by a distributing unit and a multiplexing unit, which have a maximum number of accommodated lines, so that the distributing unit and the multiplexing unit, which have different number of accommodated lines, can be arranged.

5. A packet switch device switching input packets, which packets are scheduled, comprising:

a distributing unit for sequentially distributing the input packets to a plurality of paths in an arrival order in packet units;

a switch unit for switching the packets input from said distributing unit via the plurality of paths, and outputting the packets;

a multiplexing unit for multiplexing the packets output from said switch unit by performing a process inverse to the packet distribution process performed by said distributing unit; wherein said distributing unit, said switch unit, and said multiplexing unit include an offset adding unit adding a predetermined different value for each input highway in sequential order to a tag which indicates an output route and is possessed by an input packet, a switch unit outputting the packet to a corresponding switch port according to the tag to which an offset value is added, a selector unit making a correspondence between a switch port to an arbitrary highway, and a highway multiplexing unit multiplexing a plurality of highways for one output port.

6. A packet switch device switching input packets, which packets are scheduled comprising:

a distributing unit for sequentially distributing the input packets to a plurality of paths in an arrival order in units of packets;

a switch unit for switching the packets input from said distributing unit via the plurality of paths, and outputting the packets;

a multiplexing unit for multiplexing the packets output from said switch unit by performing a process inverse to the packet distribution process performed by said distributing unit; and an input buffer unit temporarily storing a packet on an input side of the packet switch, wherein when said switch unit is expanded, said distributing unit, said multiplexing unit, and said switch unit are expanded, and operations of said distributing unit, said multiplexing unit, and said switch unit are changed after a packet output of said input buffer unit is once suspended, and the packet output of said input buffer unit is resumed, so that the switch unit can be expanded online.

7. The packet switch device according to claim 6, wherein whether a packet is either discarded or buffered in said input buffer unit can be selected depending on a characteristic of the packet that arrives while the packet output of said input buffer is suspended.

8. The packet switch device according to claim 6, wherein:

said distributing unit, said multiplexing unit, and said switch unit comprise a register unit for setting an output route of a packet; and said register unit comprises a plurality of registers holding values that are possibly used.

9. The packet switch device according to claim 6, wherein:

said distributing unit, said multiplexing unit, and said switch unit comprise a register unit for setting an output route of a packet; and said register unit comprises a first register holding a currently used value, and a second register for setting a value used after an operation change is set.

10. A switch in a packet switch device making switching in units of packets, comprising:

an offset adding unit for adding a predetermined different value for each input highway in sequential order to a tag which indicates an output route and is possessed by an input packet;

a switch unit for outputting the packet to a corresponding switch port according to the tag to which an offset value is added;

a selector unit for making a correspondence between a switch port to an arbitrary highway; and a highway multiplexing unit for multiplexing a plurality of highways for one output port.

11. A packet switching method switching input packets destined for a plurality of destinations, which packets are scheduled comprising:

sequentially distributing the input packets to a plurality of paths in an arrival order, independent of destination in units of packets;

switching the packets input in the distributing step via the plurality of paths without buffers for avoiding packet confliction to the same destination, and outputting the packets in an arrival order; and multiplexing the packets output in the switching step by performing a process inverse to the packet distribution process in the distributing step, wherein switching of input packets is performed by distributing packets received at input ports in the arrival order of the packets, irrespective of destinations, to paths sequentially, switching the packets to the plurality of destinations of the packets, and multiplexing the packets according to their destinations for outputting multiplexed packets to output ports.

12. The packet switching method according to claim 11, further comprising providing an input buffer once storing a packet before a packet is processed in the distributing step.

13. The packet switching method according to claim 12, wherein after a packet output in the input buffer step is suspended, units used in the distributing step, the switch step, and the multiplexing step are expanded, and the packet output in the input buffer step is resumed upon completion of expansion.

14. The packet switching method according to claim 13, wherein whether a packet is either discarded or buffered in the input buffer step can be selected depending on a characteristic of the packet that arrives while the packet output in the input buffer step is suspended.

15. A packet switching method switching input packets, which packets are scheduled comprising:

sequentially distributing the input packets to a plurality of paths in an arrival order, independent of destination in units of packets;

switching the packets input in the distributing step via the plurality of paths without buffers for avoiding packet confliction to the same destination, and outputting the packets in an arrival order; and multiplexing the packets output in the switching step by performing a process inverse to the packet distribution process in the distributing step, wherein:

the distributing step multiplexes a plurality of input highway packets on a same path by assigning fixed-order time slots to a plurality of input highway packets;

the switch step switches the plurality of packets on the same path after demultiplexing the plurality of packets on the same path; and the multiplexing step multiplexes a plurality of output highway packets on a same path.

16. A packet switching method switching input packets, which packets are scheduled comprising the steps of:

sequentially distributing the input packets to a plurality of paths in an arrival order in units of packets;

switching the packets input in the distributing step via the plurality of paths, and outputting the packets;

multiplexing the packets output in the switching step by performing a process inverse to the packet distribution process in the distributing step;

adding a predetermined different value for each input highway in sequential order to a tag which indicates an output route and is possessed by an input packet, outputting the packet to a corresponding switch port according to the tag to which an offset value is added, making a correspondence between a switch port to an arbitrary highway, and multiplexing a plurality of highways for one output port.

17. A switching method for use in a packet switch device making switching in units of packets, comprising:

adding a predetermined different value for each input highway in sequential order to a tag which indicates an output route and is possessed by an input packet;

outputting the packet to a corresponding switch port according to the tag to which an offset value is added;

making a correspondence between a switch port to an arbitrary highway; and multiplexing a plurality of highways for one output port.

* * * * *